US010635690B1

(12) United States Patent
Blackwell, Jr. et al.

(10) Patent No.: US 10,635,690 B1
(45) Date of Patent: Apr. 28, 2020

(54) BITWISE DATA COMPARISON UTILIZING DYNAMIC TEMPORAL SEGMENTATION

(71) Applicant: Allscripts Software, LLC, Chicago, IL (US)

(72) Inventors: Gordon Lyles Blackwell, Jr., Raleigh, NC (US); Brent Arasimowicz, Billerica, MA (US); William Roger Waugh, II, Wake Forest, NC (US); Michael John Pastrone, Weston, MA (US)

(73) Assignee: ALLSCRIPTS SOFTWARE, LLC, Raleigh, NC (US)

( * ) Notice: Subject to any disclaimer, the term of this patent is extended or adjusted under 35 U.S.C. 154(b) by 786 days.

(21) Appl. No.: 15/396,658

(22) Filed: Dec. 31, 2016

(51) Int. Cl.
*G06F 16/27* (2019.01)
*G06F 16/178* (2019.01)

(52) U.S. Cl.
CPC ............ *G06F 16/27* (2019.01); *G06F 16/178* (2019.01)

(58) Field of Classification Search
CPC ................................ G06F 16/27; G06F 16/178
USPC .......................................................... 707/610
See application file for complete search history.

(56) References Cited

U.S. PATENT DOCUMENTS

| | | | | |
|---|---|---|---|---|
| 6,104,325 A * | 8/2000 | Liaw | ...................... | G06F 3/0481 341/63 |
| 8,635,266 B2 * | 1/2014 | Kang | ...................... | G06F 16/275 709/203 |
| 8,930,306 B1 * | 1/2015 | Ngo | ..................... | H04L 67/1097 707/610 |
| 9,053,107 B1 * | 6/2015 | Le | ............................ | G06F 16/10 |
| 2007/0143369 A1 * | 6/2007 | Uppala | ................... | G06F 16/22 |
| 2008/0109904 A1 * | 5/2008 | In | ............................ | G06F 21/57 726/22 |
| 2008/0224902 A1 * | 9/2008 | Samuels | ............. | H03M 7/3084 341/51 |
| 2012/0089579 A1 * | 4/2012 | Ranade | ............... | G06F 16/1744 707/693 |
| 2016/0173594 A1 * | 6/2016 | Nelson | .................. | G06F 16/178 709/205 |

OTHER PUBLICATIONS

Wu, Kesheng, et al. "Using bitmap index for interactive exploration of large datasets." 15th International Conference on Scientific and Statistical Database Management, 2003 . . . IEEE, 2003. (Year: 2003).*
Chan, Chee-Yong, and Yannis E. Ioannidis. "Bitmap index design and evaluation." ACM SIGMOD Record. vol. 27. No. 2. ACM, 1998. (Year: 1998).*

(Continued)

*Primary Examiner* — Mohsen Almani
(74) *Attorney, Agent, or Firm* — Medley, Behrens & Lewis, LLC

(57) ABSTRACT

A method for synchronizing records stored at a first data storage location with records stored at a second, remote data storage location utilizes bitwise fingerprints and bitwise operations to determine records that exist in a first data set but not a second data set. A method for synchronizing records stored at a first data storage location with records stored at a second, remote data storage location utilizes bitwise fingerprints, and bitwise operations, and dynamic temporal segmentation to compare the timeliness of records in the first and second data sets.

20 Claims, 65 Drawing Sheets

| Unique ID | 01 | 02 | 03 | 04 | 05 | 06 | 07 | 08 | 09 | 10 | 11 | 12 | 13 | 14 | 15 | 16 | 17 | 18 | 19 | 20 | 21 | 22 | 23 | 24 | 25 | 26 | 27 | 28 |
|---|---|---|---|---|---|---|---|---|---|---|---|---|---|---|---|---|---|---|---|---|---|---|---|---|---|---|---|---|
| | Block 1 | | | | | | | Block 2 | | | | | | | Block 3 | | | | | | | Block 4 | | | | | | |

| Binary Digit Pos. | $2^0$ | $2^1$ | $2^2$ | $2^3$ | $2^4$ | $2^5$ | $2^6$ |
|---|---|---|---|---|---|---|---|
| Decimal Equiv. | 1 | 2 | 4 | 8 | 16 | 32 | 64 |

| Exists in First DB? | 1 | 1 | 1 | 0 | 0 | 1 | 0 | = 0100111 (binary) |
|---|---|---|---|---|---|---|---|---|

| Binary Fingerprint | 0100111 |
|---|---|

| Dec. Fingerprint | 39 |
|---|---|

0100111 (binary) = $(1 * 2^0) + (1 * 2^1) + (1 * 2^2) + (1 * 2^3) + (1 * 2^4) + (1 * 2^5) + (1 * 2^6)$ = 39 (decimal)

(56) References Cited

OTHER PUBLICATIONS

Suel, Torsten, Patrick Noel, and Dimitre Trendafilov. "Improved file synchronization techniques for maintaining large replicated collections over slow networks." Proceedings. 20th International Conference on Data Engineering. IEEE, 2004. (Year: 2004).*

McCamish, Ben, et al. "Managing pmu data sets with bitmap indexes." 2014 IEEE Conference on Technologies for Sustainability (SusTech). IEEE, 2014. (Year: 2014).*

\* cited by examiner

| Unique ID | 01 | 02 | 03 | 04 | 05 | 06 | 07 | 08 | 09 | 10 | 11 | 12 | 13 | 14 | 15 | 16 | 17 | 18 | 19 | 20 | 21 | 22 | 23 | 24 | 25 | 26 | 27 | 28 |
|---|---|---|---|---|---|---|---|---|---|---|---|---|---|---|---|---|---|---|---|---|---|---|---|---|---|---|---|---|
| | Block 1 | | | | | | | Block 2 | | | | | | | Block 3 | | | | | | | Block 4 | | | | | | |

*FIG. 7*

| Unique ID | 01 | 02 | 03 | 04 | 05 | 06 | 07 | 08 | 09 | 10 | 11 | 12 | 13 | 14 | 15 | 16 | 17 | 18 | 19 | 20 | 21 | 22 | 23 | 24 | 25 | 26 | 27 | 28 |
|---|---|---|---|---|---|---|---|---|---|---|---|---|---|---|---|---|---|---|---|---|---|---|---|---|---|---|---|---|
| | Block 1 | | | | | | | Block 2 | | | | | | | Block 3 | | | | | | | Block 4 | | | | | | |

| Exists in First DB? | 1 | 1 | 1 | 0 | 0 | 1 | 0 |
|---|---|---|---|---|---|---|---|

= 0100111 (binary)

*FIG. 9*

| Unique ID | 01 | 02 | 03 | 04 | 05 | 06 | 07 | 08 | 09 | 10 | 11 | 12 | 13 | 14 | 15 | 16 | 17 | 18 | 19 | 20 | 21 | 22 | 23 | 24 | 25 | 26 | 27 | 28 |
|---|---|---|---|---|---|---|---|---|---|---|---|---|---|---|---|---|---|---|---|---|---|---|---|---|---|---|---|---|
| | Block 1 | | | | | | | Block 2 | | | | | | | Block 3 | | | | | | | Block 4 | | | | | | |

| Binary Digit Pos. | $2^0$ | $2^1$ | $2^2$ | $2^3$ | $2^4$ | $2^5$ | $2^6$ |
|---|---|---|---|---|---|---|---|
| Decimal Equiv. | 1 | 2 | 4 | 8 | 16 | 32 | 64 |

| Exists in First DB? | 1 | 1 | 1 | 0 | 0 | 1 | 0 |
|---|---|---|---|---|---|---|---|

| Binary Fingerprint | 0100111 |
|---|---|

| Dec. Fingerprint | 39 |
|---|---|

0100111 (binary) = $(1 * 2^0) + (1 * 2^1) + (1 * 2^2) + (1 * 2^3) + (1 * 2^4) + (1 * 2^5) + (1 * 2^6) = 39$ (decimal)

= 0100111 (binary)

*FIG. 10*

| Unique ID | 01 | 02 | 03 | 04 | 05 | 06 | 07 | 08 | 09 | 10 | 11 | 12 | 13 | 14 | 15 | 16 | 17 | 18 | 19 | 20 | 21 | 22 | 23 | 24 | 25 | 26 | 27 | 28 |
|---|---|---|---|---|---|---|---|---|---|---|---|---|---|---|---|---|---|---|---|---|---|---|---|---|---|---|---|---|
| | Block 1 | | | | | | | Block 2 | | | | | | | | Block 3 | | | | | | | | Block 4 | | | | |
| Binary Digit Pos. | $2^0$ | $2^1$ | $2^2$ | $2^3$ | $2^4$ | $2^5$ | $2^6$ | $2^0$ | $2^1$ | $2^2$ | $2^3$ | $2^4$ | $2^5$ | $2^6$ | $2^0$ | $2^1$ | $2^2$ | $2^3$ | $2^4$ | $2^5$ | $2^6$ | $2^0$ | $2^1$ | $2^2$ | $2^3$ | $2^4$ | $2^5$ | $2^6$ |
| Decimal Equiv. | 1 | 2 | 4 | 8 | 16 | 32 | 64 | 1 | 2 | 4 | 8 | 16 | 32 | 64 | 1 | 2 | 4 | 8 | 16 | 32 | 64 | 1 | 2 | 4 | 8 | 16 | 32 | 64 |
| Exists in First DB? | 1 | 1 | 1 | 0 | 0 | 1 | 0 | 1 | 1 | 1 | 0 | 0 | 0 | 0 | 0 | 1 | 0 | 1 | 1 | 1 | 1 | 0 | 0 | 0 | 1 | 0 | 0 | 0 |
| Binary Fingerprint | 0100111 | | | | | | | 0000111 | | | | | | | 1111010 | | | | | | | 0001000 | | | | | | |
| Dec. Fingerprint | 39 | | | | | | | 7 | | | | | | | 122 | | | | | | | 8 | | | | | | |

*FIG. 11*

| Unique ID | 01 | 02 | 03 | 04 | 05 | 06 | 07 | 08 | 09 | 10 | 11 | 12 | 13 | 14 | 15 | 16 | 17 | 18 | 19 | 20 | 21 | 22 | 23 | 24 | 25 | 26 | 27 | 28 |
|---|---|---|---|---|---|---|---|---|---|---|---|---|---|---|---|---|---|---|---|---|---|---|---|---|---|---|---|---|
| | Block 1 | | | | | | | Block 2 | | | | | | | Block 3 | | | | | | | Block 4 | | | | | | |
| Binary Digit Pos. | $2^0$ | $2^1$ | $2^2$ | $2^3$ | $2^4$ | $2^5$ | $2^6$ | $2^0$ | $2^1$ | $2^2$ | $2^3$ | $2^4$ | $2^5$ | $2^6$ | $2^0$ | $2^1$ | $2^2$ | $2^3$ | $2^4$ | $2^5$ | $2^6$ | $2^0$ | $2^1$ | $2^2$ | $2^3$ | $2^4$ | $2^5$ | $2^6$ |
| Decimal Equiv. | 1 | 2 | 4 | 8 | 16 | 32 | 64 | 1 | 2 | 4 | 8 | 16 | 32 | 64 | 1 | 2 | 4 | 8 | 16 | 32 | 64 | 1 | 2 | 4 | 8 | 16 | 32 | 64 |
| Exists in First DB? | 1 | 1 | 1 | 0 | 0 | 1 | 0 | 1 | 1 | 1 | 0 | 0 | 0 | 0 | 0 | 1 | 0 | 1 | 1 | 1 | 1 | 0 | 0 | 0 | 1 | 0 | 0 | 0 |
| First DB Binary Fingerprint | 0100111 | | | | | | | 0000111 | | | | | | | 1111010 | | | | | | | 0001000 | | | | | | |
| First DB Decimal Fingerprint | 39 | | | | | | | 7 | | | | | | | 122 | | | | | | | 8 | | | | | | |
| Exists in Second DB? | 0 | 1 | 1 | 0 | 0 | 1 | 0 | 1 | 1 | 1 | 0 | 0 | 0 | 0 | 1 | 1 | 0 | 1 | 1 | 1 | 0 | 0 | 0 | 0 | 1 | 0 | 0 | 0 |
| Second DB Binary Fingerprint | 0100110 | | | | | | | 0000111 | | | | | | | 0111011 | | | | | | | 0001000 | | | | | | |
| Second DB Decimal Fingerprint | 38 | | | | | | | 7 | | | | | | | 59 | | | | | | | 8 | | | | | | |

FIG. 12

| Unique ID | 01 | 02 | 03 | 04 | 05 | 06 | 07 | 08 | 09 | 10 | 11 | 12 | 13 | 14 | 15 | 16 | 17 | 18 | 19 | 20 | 21 | 22 | 23 | 24 | 25 | 26 | 27 | 28 |
|---|---|---|---|---|---|---|---|---|---|---|---|---|---|---|---|---|---|---|---|---|---|---|---|---|---|---|---|---|
| | Block 1 | | | | | | | Block 2 | | | | | | | Block 3 | | | | | | | Block 4 | | | | | | |

| Binary Digit Pos. | $2^0$ | $2^1$ | $2^2$ | $2^3$ | $2^4$ | $2^5$ | $2^6$ | $2^0$ | $2^1$ | $2^2$ | $2^3$ | $2^4$ | $2^5$ | $2^6$ | $2^0$ | $2^1$ | $2^2$ | $2^3$ | $2^4$ | $2^5$ | $2^6$ | $2^0$ | $2^1$ | $2^2$ | $2^3$ | $2^4$ | $2^5$ | $2^6$ |
|---|---|---|---|---|---|---|---|---|---|---|---|---|---|---|---|---|---|---|---|---|---|---|---|---|---|---|---|---|
| Decimal Equiv. | 1 | 2 | 4 | 8 | 16 | 32 | 64 | 1 | 2 | 4 | 8 | 16 | 32 | 64 | 1 | 2 | 4 | 8 | 16 | 32 | 64 | 1 | 2 | 4 | 8 | 16 | 32 | 64 |

| First DB Binary Fingerprint | 0100111 | 0000111 | 1111010 | 0001000 |
|---|---|---|---|---|
| Second DB Binary Fingerprint | 0100110 | 0000111 | 0111011 | 0001000 |
| Operation | 0100111 AND 0100110 | 0000111 AND 0000111 | 1111010 AND 0111011 | 0001000 AND 0001000 |
| AND Binary Fingerprint | 0100110 | 0000111 | 0111010 | 0001000 |

*FIG. 13*

| Unique ID | 01 | 02 | 03 | 04 | 05 | 06 | 07 | 08 | 09 | 10 | 11 | 12 | 13 | 14 | 15 | 16 | 17 | 18 | 19 | 20 | 21 | 22 | 23 | 24 | 25 | 26 | 27 | 28 |
|---|---|---|---|---|---|---|---|---|---|---|---|---|---|---|---|---|---|---|---|---|---|---|---|---|---|---|---|---|
| | Block 1 | | | | | | | Block 2 | | | | | | | Block 3 | | | | | | | Block 4 | | | | | | |

| Binary Digit Pos. | $2^0$ | $2^1$ | $2^2$ | $2^3$ | $2^4$ | $2^5$ | $2^6$ | $2^0$ | $2^1$ | $2^2$ | $2^3$ | $2^4$ | $2^5$ | $2^6$ | $2^0$ | $2^1$ | $2^2$ | $2^3$ | $2^4$ | $2^5$ | $2^6$ | $2^0$ | $2^1$ | $2^2$ | $2^3$ | $2^4$ | $2^5$ | $2^6$ |
|---|---|---|---|---|---|---|---|---|---|---|---|---|---|---|---|---|---|---|---|---|---|---|---|---|---|---|---|---|
| Decimal Equiv. | 1 | 2 | 4 | 8 | 16 | 32 | 64 | 1 | 2 | 4 | 8 | 16 | 32 | 64 | 1 | 2 | 4 | 8 | 16 | 32 | 64 | 1 | 2 | 4 | 8 | 16 | 32 | 64 |

| | Block 1 | | | | | | | Block 2 | | | | | | | Block 3 | | | | | | | Block 4 | | | | | | |
|---|---|---|---|---|---|---|---|---|---|---|---|---|---|---|---|---|---|---|---|---|---|---|---|---|---|---|---|---|
| Exists in First DB? | 1 | 1 | 1 | 0 | 0 | 1 | 0 | 1 | 1 | 1 | 0 | 0 | 0 | 0 | 0 | 1 | 0 | 1 | 1 | 1 | 1 | 0 | 0 | 0 | 1 | 0 | 0 | 0 |
| Exists in Second DB? | 0 | 1 | 1 | 0 | 0 | 0 | 0 | 1 | 1 | 1 | 0 | 0 | 0 | 0 | 1 | 1 | 0 | 1 | 1 | 1 | 0 | 0 | 0 | 0 | 1 | 0 | 0 | 0 |
| Result of AND Operation | 0 | 1 | 1 | 0 | 0 | 0 | 0 | 1 | 1 | 1 | 0 | 0 | 0 | 0 | 0 | 1 | 0 | 1 | 1 | 1 | 0 | 0 | 0 | 0 | 1 | 0 | 0 | 0 |

| AND Binary Fingerprint | 0100110 | | | | | | | 0000111 | | | | | | | 0111010 | | | | | | | 0001000 | | | | | | |
|---|---|---|---|---|---|---|---|---|---|---|---|---|---|---|---|---|---|---|---|---|---|---|---|---|---|---|---|---|

*FIG. 14*

| Unique ID | 01 | 02 | 03 | 04 | 05 | 06 | 07 | 08 | 09 | 10 | 11 | 12 | 13 | 14 | 15 | 16 | 17 | 18 | 19 | 20 | 21 | 22 | 23 | 24 | 25 | 26 | 27 | 28 |
|---|---|---|---|---|---|---|---|---|---|---|---|---|---|---|---|---|---|---|---|---|---|---|---|---|---|---|---|---|
| | Block 1 | | | | | | | Block 2 | | | | | | | Block 3 | | | | | | | Block 4 | | | | | | |

| Binary Digit Pos. | $2^0$ | $2^1$ | $2^2$ | $2^3$ | $2^4$ | $2^5$ | $2^6$ | $2^0$ | $2^1$ | $2^2$ | $2^3$ | $2^4$ | $2^5$ | $2^6$ | $2^0$ | $2^1$ | $2^2$ | $2^3$ | $2^4$ | $2^5$ | $2^6$ | $2^0$ | $2^1$ | $2^2$ | $2^3$ | $2^4$ | $2^5$ | $2^6$ |
|---|---|---|---|---|---|---|---|---|---|---|---|---|---|---|---|---|---|---|---|---|---|---|---|---|---|---|---|---|
| Decimal Equiv. | 1 | 2 | 4 | 8 | 16 | 32 | 64 | 1 | 2 | 4 | 8 | 16 | 32 | 64 | 1 | 2 | 4 | 8 | 16 | 32 | 64 | 1 | 2 | 4 | 8 | 16 | 32 | 64 |

| First DB Binary Fingerprint | 0100111 | 0000111 | 1111010 | 0001000 |
|---|---|---|---|---|
| AND Binary Fingerprint | 0100110 | 0000111 | 0111010 | 0001000 |
| Operation | 0100111 XOR 0100110 | 0000111 XOR 0000111 | 1111010 XOR 0111010 | 0001000 XOR 0001000 |
| XOR Binary Fingerprint for First Database | 0000001 | 0000000 | 1000000 | 0000000 |

| Unique ID | 01 | 02 | 03 | 04 | 05 | 06 | 07 | 08 | 09 | 10 | 11 | 12 | 13 | 14 | 15 | 16 | 17 | 18 | 19 | 20 | 21 | 22 | 23 | 24 | 25 | 26 | 27 | 28 |
|---|---|---|---|---|---|---|---|---|---|---|---|---|---|---|---|---|---|---|---|---|---|---|---|---|---|---|---|---|
| | Block 1 | | | | | | | Block 2 | | | | | | | Block 3 | | | | | | | Block 4 | | | | | | |
| Binary Digit Pos. | $2^0$ | $2^1$ | $2^2$ | $2^3$ | $2^4$ | $2^5$ | $2^6$ | $2^0$ | $2^1$ | $2^2$ | $2^3$ | $2^4$ | $2^5$ | $2^6$ | $2^0$ | $2^1$ | $2^2$ | $2^3$ | $2^4$ | $2^5$ | $2^6$ | $2^0$ | $2^1$ | $2^2$ | $2^3$ | $2^4$ | $2^5$ | $2^6$ |
| Decimal Equiv. | 1 | 2 | 4 | 8 | 16 | 32 | 64 | 1 | 2 | 4 | 8 | 16 | 32 | 64 | 1 | 2 | 4 | 8 | 16 | 32 | 64 | 1 | 2 | 4 | 8 | 16 | 32 | 64 |

| Second DB Binary Fingerprint | 0100110 | 0000111 | 0111011 | 0001000 |
|---|---|---|---|---|
| AND Binary Fingerprint | 0100110 | 0000111 | 0111010 | 0001000 |
| Operation | 0100110 XOR 0100110 | 0000111 XOR 0000111 | 0111011 XOR 0111010 | 0001000 XOR 0001000 |
| XOR Binary Fingerprint for Second DB | 0000000 | 0000000 | 0000001 | 0000000 |

FIG. 19

| Unique ID | 01 | 02 | 03 | 04 | 05 | 06 | 07 | 08 | 09 | 10 | 11 | 12 | 13 | 14 | 15 | 16 | 17 | 18 | 19 | 20 | 21 | 22 | 23 | 24 | 25 | 26 | 27 | 28 |
|---|---|---|---|---|---|---|---|---|---|---|---|---|---|---|---|---|---|---|---|---|---|---|---|---|---|---|---|---|
| | Block 1 | | | | | | | Block 2 | | | | | | | Block 3 | | | | | | | Block 4 | | | | | | |

| Binary Digit Pos. | $2^0$ | $2^1$ | $2^2$ | $2^3$ | $2^4$ | $2^5$ | $2^6$ | $2^0$ | $2^1$ | $2^2$ | $2^3$ | $2^4$ | $2^5$ | $2^6$ | $2^0$ | $2^1$ | $2^2$ | $2^3$ | $2^4$ | $2^5$ | $2^6$ | $2^0$ | $2^1$ | $2^2$ | $2^3$ | $2^4$ | $2^5$ | $2^6$ |
|---|---|---|---|---|---|---|---|---|---|---|---|---|---|---|---|---|---|---|---|---|---|---|---|---|---|---|---|---|
| Decimal Equiv. | 1 | 2 | 4 | 8 | 16 | 32 | 64 | 1 | 2 | 4 | 8 | 16 | 32 | 64 | 1 | 2 | 4 | 8 | 16 | 32 | 64 | 1 | 2 | 4 | 8 | 16 | 32 | 64 |

| | 01 | 02 | 03 | 04 | 05 | 06 | 07 | 08 | 09 | 10 | 11 | 12 | 13 | 14 | 15 | 16 | 17 | 18 | 19 | 20 | 21 | 22 | 23 | 24 | 25 | 26 | 27 | 28 |
|---|---|---|---|---|---|---|---|---|---|---|---|---|---|---|---|---|---|---|---|---|---|---|---|---|---|---|---|---|
| | Block 1 | | | | | | | Block 2 | | | | | | | Block 3 | | | | | | | Block 4 | | | | | | |
| Exists in Second DB? | 0 | 1 | 0 | 0 | 0 | 1 | 0 | 1 | 1 | 1 | 0 | 0 | 0 | 0 | 1 | 1 | 0 | 1 | 1 | 1 | 0 | 0 | 0 | 0 | 1 | 0 | 0 | 0 |
| Result of AND Operation | 0 | 1 | 0 | 0 | 0 | 1 | 0 | 1 | 1 | 1 | 0 | 0 | 0 | 0 | 0 | 1 | 0 | 1 | 1 | 1 | 0 | 0 | 0 | 0 | 1 | 0 | 0 | 0 |
| Result of XOR Operation for Second DB | 0 | 0 | 0 | 0 | 0 | 0 | 0 | 0 | 0 | 0 | 0 | 0 | 0 | 0 | 1 | 0 | 0 | 0 | 0 | 0 | 0 | 0 | 0 | 0 | 0 | 0 | 0 | 0 |

| XOR Binary Fingerprint for Second DB | 0000000 | 0000000 | 0000001 | 0000000 |
|---|---|---|---|---|

*FIG. 20*

| Records in the First DB that aren't in the Second DB | | | |
|---|---|---|---|
| Unique ID | Block | First DB Fingerprint | Second DB Fingerprint | XOR Fingerprint for First DB |
| 01 | 1 | 0100111 | 0100110 | 0000001 |
| 21 | 3 | 1111010 | 0111011 | 1000000 |

| Records in the Second DB that aren't in the First DB | | | |
|---|---|---|---|
| Unique ID | Block | First DB Fingerprint | Second DB Fingerprint | XOR Fingerprint for Second DB |
| 15 | 3 | 1111010 | 0111011 | 0000001 |

*FIG. 24*

Records in the First DB that aren't in the Second DB

| Unique ID | Block | SRC | DEST | MISSING |
|---|---|---|---|---|
| 01 | 1 | 39 | 38 | 1 |
| 21 | 3 | 122 | 59 | 64 |

Records in the Second DB that aren't in the First DB

| Unique ID | Block | SRC | DEST | EXTRA |
|---|---|---|---|---|
| 15 | 3 | 122 | 59 | 1 |

*FIG. 25*

| Unique ID | 29 | 30 | 31 | 32 | 33 | 34 | 35 |
|---|---|---|---|---|---|---|---|
| | | | | Block 5 | | | |

| Binary Digit Pos. | $2^0$ | $2^1$ | $2^2$ | $2^3$ | $2^4$ | $2^5$ | $2^6$ |
|---|---|---|---|---|---|---|---|
| Decimal Equiv. | 1 | 2 | 4 | 8 | 16 | 32 | 64 |

| Update date in First DB of January 30, 2016? | 1 | 1 | 1 | 0 | 0 | 1 | 0 | = 0100111 (binary) |
|---|---|---|---|---|---|---|---|---|

| 2016Day30-Block5 Binary Fingerprint for First DB | 0100111 |
|---|---|

| 2016Day30-Block5 Dec. Fingerprint. for First DB | 39 |
|---|---|

*FIG. 26*

| Unique ID | 29 | 30 | 31 | 32 | 33 | 34 | 35 |
|---|---|---|---|---|---|---|---|
| | | | | Block 5 | | | |

| Binary Digit Pos. | $2^0$ | $2^1$ | $2^2$ | $2^3$ | $2^4$ | $2^5$ | $2^6$ |
|---|---|---|---|---|---|---|---|
| Decimal Equiv. | 1 | 2 | 4 | 8 | 16 | 32 | 64 |

| Update date in First DB of January 30, 2016? | 1 | 1 | 1 | 0 | 0 | 1 | 0 |
|---|---|---|---|---|---|---|---|

| 2016Day30-Block5 Binary Fingerprint for First DB | 0100111 |
|---|---|

| 2016Day30-Block5 Dec. Fingerprint. for First DB | 39 |
|---|---|

| Update date in Second DB of January 30, 2016? | 0 | 1 | 1 | 0 | 0 | 1 | 0 |
|---|---|---|---|---|---|---|---|

| 2016Day30-Block5 Binary Fingerprint for Second DB | 0100110 |
|---|---|

| 2016Day30-Block5 Dec. Fingerprint. for Second DB | 38 |
|---|---|

*FIG. 27*

| Unique ID | 29 | 30 | 31 | 32 | 33 | 34 | 35 |
|---|---|---|---|---|---|---|---|
| | | | | Block 5 | | | |

| Binary Digit Pos. | $2^0$ | $2^1$ | $2^2$ | $2^3$ | $2^4$ | $2^5$ | $2^6$ |
|---|---|---|---|---|---|---|---|
| Decimal Equiv. | 1 | 2 | 4 | 8 | 16 | 32 | 64 |

| Update date in First DB of January 30, 2016? | 1 | 1 | 1 | 0 | 0 | 1 | 0 |
|---|---|---|---|---|---|---|---|
| Update date in Second DB of January 30, 2016? | 0 | 1 | 1 | 0 | 0 | 1 | 0 |
| Result of AND Operation | 0 | 1 | 1 | 0 | 0 | 1 | 0 |

| 2016Day30-Block5 Binary Fingerprint for First DB | 0100111 |
|---|---|
| 2016Day30-Block5 Binary Fingerprint for Second DB | 0100110 |

| 2016Day30-Block5 AND Binary Fingerprint | 0100110 |
|---|---|

*FIG. 28*

| Unique ID | 29 | 30 | 31 | 32 | 33 | 34 | 35 |
|---|---|---|---|---|---|---|---|
| | | | | Block 5 | | | |

| Binary Digit Pos. | $2^0$ | $2^1$ | $2^2$ | $2^3$ | $2^4$ | $2^5$ | $2^6$ |
|---|---|---|---|---|---|---|---|
| Decimal Equiv. | 1 | 2 | 4 | 8 | 16 | 32 | 64 |

| Update date in First DB of January 30, 2016? | 1 | 1 | 1 | 0 | 0 | 1 | 0 |
|---|---|---|---|---|---|---|---|
| Result of AND Operation | 0 | 1 | 1 | 0 | 0 | 1 | 0 |
| Result of XOR Operation for First DB | 1 | 0 | 0 | 0 | 0 | 0 | 0 |

| 2016Day30-Block5 Binary Fingerprint for First DB |
|---|
| 0100111 |

| 2016Day30-Block5 AND Binary Fingerprint |
|---|
| 0100110 |

| 2016Day30-Block5 XOR Binary Fingerprint for First DB |
|---|
| 0000001 |

*FIG. 29*

| Unique ID | 29 | 30 | 31 | 32 | 33 | 34 | 35 |
|---|---|---|---|---|---|---|---|
| | | | | Block 5 | | | |

| Binary Digit Pos. | $2^0$ | $2^1$ | $2^2$ | $2^3$ | $2^4$ | $2^5$ | $2^6$ |
|---|---|---|---|---|---|---|---|
| Decimal Equiv. | 1 | 2 | 4 | 8 | 16 | 32 | 64 |

| Update date in Second DB of January 30, 2016? | 0 | 1 | 1 | 0 | 0 | 1 | 0 |
|---|---|---|---|---|---|---|---|
| Result of AND Operation | 0 | 1 | 1 | 0 | 0 | 1 | 0 |
| Result of XOR Operation for Second DB | 0 | 0 | 0 | 0 | 0 | 0 | 0 |

| 2016Day30-Block5 Binary Fingerprint for Second DB | 0100110 |
|---|---|
| 2016Day30-Block5 AND Binary Fingerprint | 0100110 |
| 2016Day30-Block5 XOR Binary Fingerprint for First DB | 0000000 |

Absence of any "1" digit in the XOR Binary Fingerprint indicates there are no records in Block 5 having an update date of January 30, 2016 in the Second DB but not in the First DB.

*FIG. 31*

| Unique ID | 2016Day30-Block5 | | | | | | | 2016Day45-Block5 | | | | | | | 2016Day49-Block5 | | | | | | |
|---|---|---|---|---|---|---|---|---|---|---|---|---|---|---|---|---|---|---|---|---|---|
| | 29 | 30 | 31 | 32 | 33 | 34 | 35 | 29 | 30 | 31 | 32 | 33 | 34 | 35 | 29 | 30 | 31 | 32 | 33 | 34 | 35 |
| Binary Digit Pos. | $2^0$ | $2^1$ | $2^2$ | $2^3$ | $2^4$ | $2^5$ | $2^6$ | $2^0$ | $2^1$ | $2^2$ | $2^3$ | $2^4$ | $2^5$ | $2^6$ | $2^0$ | $2^1$ | $2^2$ | $2^3$ | $2^4$ | $2^5$ | $2^6$ |
| Decimal Equiv. | 1 | 2 | 4 | 8 | 16 | 32 | 64 | 1 | 2 | 4 | 8 | 16 | 32 | 64 | 1 | 2 | 4 | 8 | 16 | 32 | 64 |
| Update date in First DB match corresponding day? | 1 | 1 | 1 | 0 | 0 | 1 | 0 | 1 | 0 | 1 | 0 | 0 | 1 | 1 | 0 | 1 | 1 | 0 | 0 | 1 | 0 |
| Binary Fingerprint for First DB | 0100111 | | | | | | | 1100101 | | | | | | | 0100110 | | | | | | |
| Update date in Second DB match corresponding day? | 0 | 1 | 1 | 0 | 0 | 1 | 0 | 1 | 1 | 1 | 0 | 0 | 1 | 0 | 0 | 1 | 1 | 0 | 0 | 1 | 1 |
| Binary Fingerprint for Second DB | 0100110 | | | | | | | 0100111 | | | | | | | 1100110 | | | | | | |

*FIG. 32*

| Unique ID | 2016M1-Block9 | | | | | | | 2016M2-Block9 | | | | | | | 2016M3-Block9 | | | | | | |
|---|---|---|---|---|---|---|---|---|---|---|---|---|---|---|---|---|---|---|---|---|---|
| | 57 | 58 | 59 | 60 | 61 | 62 | 63 | 57 | 58 | 59 | 60 | 61 | 62 | 63 | 57 | 58 | 59 | 60 | 61 | 62 | 63 |
| Binary Digit Pos. | $2^0$ | $2^1$ | $2^2$ | $2^3$ | $2^4$ | $2^5$ | $2^6$ | $2^0$ | $2^1$ | $2^2$ | $2^3$ | $2^4$ | $2^5$ | $2^6$ | $2^0$ | $2^1$ | $2^2$ | $2^3$ | $2^4$ | $2^5$ | $2^6$ |
| Decimal Equiv. | 1 | 2 | 4 | 8 | 16 | 32 | 64 | 1 | 2 | 4 | 8 | 16 | 32 | 64 | 1 | 2 | 4 | 8 | 16 | 32 | 64 |
| Update date in First DB during corresponding month? | 1 | 1 | 1 | 0 | 0 | 1 | 0 | 1 | 0 | 1 | 0 | 0 | 1 | 0 | 1 | 0 | 0 | 1 | 0 | 0 | 0 |
| Binary Fingerprint for First DB | 0100111 | | | | | | | 0100111 | | | | | | | 0100111 | | | | | | |
| Update date in Second DB during corresponding month? | 0 | 1 | 1 | 0 | 0 | 1 | 0 | 0 | 1 | 1 | 0 | 0 | 1 | 0 | 0 | 1 | 1 | 0 | 0 | 1 | 0 |
| Binary Fingerprint for Second DB | 0100110 | | | | | | | 0100110 | | | | | | | 0100110 | | | | | | |

*FIG. 33*

| Block 10 | | | | | | |
|---|---|---|---|---|---|---|
| Unique ID | 64 | 65 | 66 | 67 | 68 | 69 | 70 |

| Binary Digit Pos. | $2^0$ | $2^1$ | $2^2$ | $2^3$ | $2^4$ | $2^5$ | $2^6$ |
|---|---|---|---|---|---|---|---|
| Decimal Equiv. | 1 | 2 | 4 | 8 | 16 | 32 | 64 |

Update Dates in First DB

| 01/07/2015 | 01/12/2015 | 01/27/2015 | 01/27/2015 | 01/27/2015 | 02/05/2015 | 02/01/2015 |
|---|---|---|---|---|---|---|
| 02/09/2015 | 02/23/2015 | 02/13/2015 | 02/09/2015 | 01/31/2015 | | |
| | | | 02/11/2015 | 02/04/2015 | | |

Update Dates in Second DB

| 01/07/2015 | 01/12/2015 | 01/27/2015 | 01/27/2015 | 01/27/2015 | 02/05/2015 | 02/01/2015 |
|---|---|---|---|---|---|---|
| 02/09/2015 | 02/23/2015 | 02/13/2015 | 02/09/2015 | 01/31/2015 | | |
| | | | | 02/04/2015 | | |

Required Temporal Blocks for Day Segmentation: 2015D7, 2015D12, 2015D27, 2015D31, 2015D32, 2015D35, 2015D36, 2015D40, 2015D42, 2015D44, 2015D54

Required Temporal Blocks for Month Segmentation: 2015M1, 2015M2

*FIG. 34*

| | | | Block 10 | | | |
|---|---|---|---|---|---|---|
| Unique ID | 64 | 65 | 66 | 67 | 68 | 69 | 70 |

| Binary Digit Pos. | $2^0$ | $2^1$ | $2^2$ | $2^3$ | $2^4$ | $2^5$ | $2^6$ |
|---|---|---|---|---|---|---|---|
| Decimal Equiv. | 1 | 2 | 4 | 8 | 16 | 32 | 64 |

| Updates in First DB | 01/07/2015 | 01/12/2015 | 01/27/2015 | 01/27/2015 | 01/27/2015 | 02/05/2015 | 02/01/2015 |
|---|---|---|---|---|---|---|---|
| | 02/09/2015 | 02/23/2015 | 02/13/2015 | 02/09/2015 | 01/31/2015 | | |
| | | | | 02/11/2015 | 02/04/2015 | | |

| Last Update Date in First DB | 02/09/2015 | 02/23/2015 | 02/13/2015 | 02/11/2015 | 02/04/2015 | 02/05/2015 | 02/01/2015 |
|---|---|---|---|---|---|---|---|

| Updates in Second DB | 01/07/2015 | 01/12/2015 | 01/27/2015 | 01/27/2015 | 01/27/2015 | 02/05/2015 | 01/07/2015 |
|---|---|---|---|---|---|---|---|
| | 02/09/2015 | 02/23/2015 | 02/13/2015 | 02/09/2015 | 01/31/2015 | | 02/01/2015 |
| | | | | | 02/04/2015 | | |

| Last Update Date in Second DB | 02/09/2015 | 02/23/2015 | 02/13/2015 | 02/09/2015 | 02/04/2015 | 02/05/2015 | 02/01/2015 |
|---|---|---|---|---|---|---|---|

| Required Temporal Blocks for Day Segmentation | 2015D32, 2015D35, 2015D36, 2015D40, 2015D42, 2015D44, 2015D54 |
|---|---|

| Required Temporal Blocks for Month Segmentation | 2015M2 |
|---|---|

*FIG. 35*

| Unique ID | Block 7 | | | | | | |
|---|---|---|---|---|---|---|---|
| | 43 | 44 | 45 | 46 | 47 | 48 | 49 |

| Binary Digit Pos. | $2^0$ | $2^1$ | $2^2$ | $2^3$ | $2^4$ | $2^5$ | $2^6$ |
|---|---|---|---|---|---|---|---|
| Decimal Equiv. | 1 | 2 | 4 | 8 | 16 | 32 | 64 |

| Update Dates in First DB | | | | | | |
|---|---|---|---|---|---|---|
| 01/07/2015 | 01/12/2015 | 01/27/2015 | 01/27/2015 | 01/27/2015 | 05/04/2015 | 03/01/2016 |
| 01/09/2015 | 01/23/2015 | 02/09/2015 | 02/09/2015 | 02/09/2015 | | |
| | | | 04/10/2015 | 01/06/2016 | | |

| January 2015 | | | | | | | | | | | | | | | | | | | | | | | | | | | | | | |
|---|---|---|---|---|---|---|---|---|---|---|---|---|---|---|---|---|---|---|---|---|---|---|---|---|---|---|---|---|---|---|
| Week 1 | | | | | Week 2 | | | | | | | Week 3 | | | | | | | Week 4 | | | | | | | Week 5 | | | | |
| 01 | 02 | 03 | 04 | 05 | 06 | 07 | 08 | 09 | 10 | 11 | 12 | 13 | 14 | 15 | 16 | 17 | 18 | 19 | 20 | 21 | 22 | 23 | 24 | 25 | 26 | 27 | 28 | 29 | 30 | 31 |

There exist updates to record 43 on both 01/07/2015 and 01/09/2015, so the most recent update cannot be uniquely described by the year "2015Y", the quarter "2015Q1", the month "2015M1", or the week "2015W2", thus requiring a last update date of "2015D9" to uniquely identify the last update.

| February 2015 | | | | | | | | | | | | | | | | | | | | | | | | | | | | |
|---|---|---|---|---|---|---|---|---|---|---|---|---|---|---|---|---|---|---|---|---|---|---|---|---|---|---|---|---|
| Week 6 | | | | | Week 7 | | | | | | | Week 8 | | | | | | | Week 9 | | | | | | | | | |
| 01 | 02 | 03 | 04 | 05 | 06 | 07 | 08 | 09 | 10 | 11 | 12 | 13 | 14 | 15 | 16 | 17 | 18 | 19 | 20 | 21 | 22 | 23 | 24 | 25 | 26 | 27 | 28 | |

*FIG. 38*

| Week 1 | | | | | Week 2 | | | | | Week 3 | | | | | | | Week 4 | | | | | | | Week 5 | | | | |
|--|--|--|--|--|--|--|--|--|--|--|--|--|--|--|--|--|--|--|--|--|--|--|--|--|--|--|--|--|
| 01 | 02 | 03 | 04 | 05 | 06 | 07 | 08 | 09 | 10 | 11 | 12 | 13 | 14 | 15 | 16 | 17 | 18 | 19 | 20 | 21 | 22 | 23 | 24 | 25 | 26 | 27 | 28 | 29 | 30 | 31 |

January 2015

There exist multiple updates to record 45 in Q1 of 2015, but the most recent update is the only update in February of 2015, thus allowing for use of a last update date of "2015M2" to uniquely identify the last update.

| Week 6 | | | | | | | Week 7 | | | | | | | Week 8 | | | | | | | Week 9 | | | | |
|--|--|--|--|--|--|--|--|--|--|--|--|--|--|--|--|--|--|--|--|--|--|--|--|--|--|--|--|
| 01 | 02 | 03 | 04 | 05 | 06 | 07 | 08 | 09 | 10 | 11 | 12 | 13 | 14 | 15 | 16 | 17 | 18 | 19 | 20 | 21 | 22 | 23 | 24 | 25 | 26 | 27 | 28 |

February 2015

*FIG. 40*

| Unique ID | Block 7 | | | | | | |
|---|---|---|---|---|---|---|---|
| | 43 | 44 | 45 | 46 | 47 | 48 | 49 |

| Binary Digit Pos. | $2^0$ | $2^1$ | $2^2$ | $2^3$ | $2^4$ | $2^5$ | $2^6$ |
|---|---|---|---|---|---|---|---|
| Decimal Equiv. | 1 | 2 | 4 | 8 | 16 | 32 | 64 |

| Update Dates in First DB | | | | | | |
|---|---|---|---|---|---|---|
| 01/07/2015 | 01/12/2015 | 01/27/2015 | 01/27/2015 | 01/27/2015 | 05/04/2015 | 03/01/2015 |
| 01/09/2015 | 01/23/2015 | 02/09/2015 | 02/09/2015 | 02/09/2015 | | |
| | | | 04/10/2015 | 02/11/2015 | | |

| Dynamic Temporal Segmentation Last Update Date | | | | | | |
|---|---|---|---|---|---|---|
| 2015D9 | 2015W4 | 2015M2 | 2015Q2 | 2015D42 | 2015Y | 2015Y |

FIG. 43

January 2015

| Week 1 | | | | | | | Week 2 | | | | | | | Week 3 | | | | | | | Week 4 | | | | | | | Week 5 | | | |
|---|---|---|---|---|---|---|---|---|---|---|---|---|---|---|---|---|---|---|---|---|---|---|---|---|---|---|---|---|---|---|---|
| 01 | 02 | 03 | 04 | 05 | 06 | 07 | 08 | 09 | 10 | 11 | 12 | 13 | 14 | 15 | 16 | 17 | 18 | 19 | 20 | 21 | 22 | 23 | 24 | 25 | 26 | 27 | 28 | 29 | 30 | 31 |

Not needed for the determination.

There exist updates to record 46 on both 02/09/2015 and 02/11/2015, so the most recent update cannot be uniquely described by the year "2015Y", the quarter "2015Q1", the month "2015M2", or the week "2015W7", thus requiring a last update date of "2015D42" to uniquely identify the last update.

February 2015

| Day in Feb. | Week 6 | | | | | | | Week 7 | | | | | | | Week 8 | | | | | | | Week 9 | | | | | | |
|---|---|---|---|---|---|---|---|---|---|---|---|---|---|---|---|---|---|---|---|---|---|---|---|---|---|---|---|---|
| | 01 | 02 | 03 | 04 | 05 | 06 | 07 | 08 | 09 | 10 | 11 | 12 | 13 | 14 | 15 | 16 | 17 | 18 | 19 | 20 | 21 | 22 | 23 | 24 | 25 | 26 | 27 | 28 |
| Day of 2015 | 32 | 33 | 34 | 35 | 36 | 37 | 38 | 39 | 40 | 41 | 42 | 43 | 44 | 45 | 46 | 47 | 48 | 49 | 50 | 51 | 52 | 53 | 54 | 55 | 56 | 57 | 58 | 59 |

*FIG. 44*

| Unique ID | 2015D9-Block7 | | | | | | | 2015W4-Block7 | | | | | | | 2015M2-Block7 | | | | | | | 2015D42-Block7 | | | | | | |
|---|---|---|---|---|---|---|---|---|---|---|---|---|---|---|---|---|---|---|---|---|---|---|---|---|---|---|---|---|
| | 43 | 44 | 45 | 46 | 47 | 48 | 49 | 43 | 44 | 45 | 46 | 47 | 48 | 49 | 43 | 44 | 45 | 46 | 47 | 48 | 49 | 43 | 44 | 45 | 46 | 47 | 48 | 49 |
| Binary Digit Pos. | $2^0$ | $2^1$ | $2^2$ | $2^3$ | $2^4$ | $2^5$ | $2^6$ | $2^0$ | $2^1$ | $2^2$ | $2^3$ | $2^4$ | $2^5$ | $2^6$ | $2^0$ | $2^1$ | $2^2$ | $2^3$ | $2^4$ | $2^5$ | $2^6$ | $2^0$ | $2^1$ | $2^2$ | $2^3$ | $2^4$ | $2^5$ | $2^6$ |
| Decimal Equiv. | 1 | 2 | 4 | 8 | 16 | 32 | 64 | 1 | 2 | 4 | 8 | 16 | 32 | 64 | 1 | 2 | 4 | 8 | 16 | 32 | 64 | 1 | 2 | 4 | 8 | 16 | 32 | 64 |
| First DB Last Update Date? | 1 | 0 | 0 | 0 | 0 | 0 | 0 | 0 | 1 | 0 | 0 | 0 | 0 | 0 | 0 | 0 | 1 | 0 | 0 | 0 | 0 | 0 | 0 | 0 | 0 | 1 | 0 | 0 |
| First DB Binary Fingerprint | 0000001 | | | | | | | 0000010 | | | | | | | 0000100 | | | | | | | 0010000 | | | | | | |

*FIG. 45*

| Unique ID | 2015Q2-Block7 | | | | | | | 2015Y-Block7 | | | | | | |
|---|---|---|---|---|---|---|---|---|---|---|---|---|---|---|
| | 43 | 44 | 45 | 46 | 47 | 48 | 49 | 43 | 44 | 45 | 46 | 47 | 48 | 49 |

| Binary Digit Pos. | $2^0$ | $2^1$ | $2^2$ | $2^3$ | $2^4$ | $2^5$ | $2^6$ | $2^0$ | $2^1$ | $2^2$ | $2^3$ | $2^4$ | $2^5$ | $2^6$ |
|---|---|---|---|---|---|---|---|---|---|---|---|---|---|---|
| Decimal Equiv. | 1 | 2 | 4 | 8 | 16 | 32 | 64 | 1 | 2 | 4 | 8 | 16 | 32 | 64 |
| First DB Last Update Date? | 0 | 0 | 0 | 1 | 0 | 0 | 0 | 0 | 0 | 0 | 0 | 0 | 1 | 1 |

| First DB Binary Fingerprint | 0001000 | 1100000 |
|---|---|---|

FIG. 46

These records were changed on day 9 of 2015.

Changes in the First DB

| Temporal Segmentation Level | Period | Block | First DB Fingerprint |
|---|---|---|---|
| Day | 2015D9 | 7 | 0000001 |
| Week | 2015W4 | 7 | 0000010 |
| Month | 2015M2 | 7 | 0000100 |
| Day | 2015D42 | 7 | 0010000 |
| Quarter | 2015Q2 | 7 | 0001000 |
| Year | 2015Y | 7 | 1100000 |

These records were only changed once in 2015. If they had multiple updates in 2015, then they would have a more defined segmentation level.

FIG. 47

Block 7

| Unique ID | | | | | | | |
|---|---|---|---|---|---|---|---|
| | 43 | 44 | 45 | 46 | 47 | 48 | 49 |

| Binary Digit Pos. | $2^0$ | $2^1$ | $2^2$ | $2^3$ | $2^4$ | $2^5$ | $2^6$ |
|---|---|---|---|---|---|---|---|
| Decimal Equiv. | 1 | 2 | 4 | 8 | 16 | 32 | 64 |

| Update Dates in Second DB | | | | | | | |
|---|---|---|---|---|---|---|---|
| | 01/07/2015 | 01/12/2015 | 01/27/2015 | 01/27/2015 | 01/27/2015 | 05/04/2015 | 03/01/2015 |
| | 01/09/2015 | 01/23/2015 | 02/09/2015 | 02/09/2015 | 02/09/2015 | 05/07/2016 | |
| | 02/09/2015 | | | | 02/11/2015 | | |

| Dynamic Temporal Segmentation Last Update Date | | | | | | | |
|---|---|---|---|---|---|---|---|
| | 2015M2 | 2015W4 | 2015M2 | 2015M2 | 2015D42 | 2016Y | 2015Y |

*FIG. 49*

| Unique ID | 2015D9-Block7 | | | | | | | 2015W4-Block7 | | | | | | | 2015M2-Block7 | | | | | | | 2015D42-Block7 | | | | | | |
|---|---|---|---|---|---|---|---|---|---|---|---|---|---|---|---|---|---|---|---|---|---|---|---|---|---|---|---|---|
| | 43 | 44 | 45 | 46 | 47 | 48 | 49 | 43 | 44 | 45 | 46 | 47 | 48 | 49 | 43 | 44 | 45 | 46 | 47 | 48 | 49 | 43 | 44 | 45 | 46 | 47 | 48 | 49 |
| Binary Digit Pos. | $2^0$ | $2^1$ | $2^2$ | $2^3$ | $2^4$ | $2^5$ | $2^6$ | $2^0$ | $2^1$ | $2^2$ | $2^3$ | $2^4$ | $2^5$ | $2^6$ | $2^0$ | $2^1$ | $2^2$ | $2^3$ | $2^4$ | $2^5$ | $2^6$ | $2^0$ | $2^1$ | $2^2$ | $2^3$ | $2^4$ | $2^5$ | $2^6$ |
| Decimal Equiv. | 1 | 2 | 4 | 8 | 16 | 32 | 64 | 1 | 2 | 4 | 8 | 16 | 32 | 64 | 1 | 2 | 4 | 8 | 16 | 32 | 64 | 1 | 2 | 4 | 8 | 16 | 32 | 64 |
| First DB Last Update Date? | 1 | 0 | 0 | 0 | 0 | 0 | 0 | 0 | 1 | 0 | 0 | 0 | 0 | 0 | 0 | 0 | 1 | 0 | 0 | 0 | 0 | 0 | 0 | 0 | 0 | 1 | 0 | 0 |
| First DB Binary Fingerprint | | | | 0000001 | | | | | | | 0000010 | | | | | | | 0000100 | | | | | | | 0010000 | | | |
| Second DB Last Update Date? | 0 | 0 | 0 | 0 | 0 | 0 | 0 | 0 | 1 | 0 | 0 | 0 | 0 | 0 | 1 | 1 | 0 | 0 | 0 | 0 | 0 | 0 | 0 | 0 | 0 | 1 | 0 | 0 |
| Second DB Binary Fingerprint | | | | 0000000 | | | | | | | 0000010 | | | | | | | 0001101 | | | | | | | 0010000 | | | |

FIG. 50

| Unique ID | 2015Q2-Block7 | | | | | | | | 2015Y-Block7 | | | | | | | | 2016Y-Block7 | | | | | | | |
|---|---|---|---|---|---|---|---|---|---|---|---|---|---|---|---|---|---|---|---|---|---|---|---|---|
| | 43 | 44 | 45 | 46 | 47 | 48 | 49 | | 43 | 44 | 45 | 46 | 47 | 48 | 49 | | 43 | 44 | 45 | 46 | 47 | 48 | 49 | |
| Binary Digit Pos. | $2^0$ | $2^1$ | $2^2$ | $2^3$ | $2^4$ | $2^5$ | $2^6$ | | $2^0$ | $2^1$ | $2^2$ | $2^3$ | $2^4$ | $2^5$ | $2^6$ | | $2^0$ | $2^1$ | $2^2$ | $2^3$ | $2^4$ | $2^5$ | $2^6$ | |
| Decimal Equiv. | 1 | 2 | 4 | 8 | 16 | 32 | 64 | | 1 | 2 | 4 | 8 | 16 | 32 | 64 | | 1 | 2 | 4 | 8 | 16 | 32 | 64 | |
| First DB Last Update Date? | 0 | 0 | 0 | 1 | 0 | 0 | 0 | | 0 | 0 | 0 | 0 | 0 | 1 | 1 | | 0 | 0 | 0 | 0 | 0 | 0 | 0 | |
| First DB Binary Fingerprint | | | | | 0001000 | | | | | | | | 1100000 | | | | | | | | 0000000 | | | |
| Second DB Last Update Date? | 0 | 0 | 0 | 0 | 0 | 0 | 0 | | 0 | 0 | 0 | 0 | 0 | 0 | 1 | | 0 | 0 | 0 | 0 | 0 | 1 | 0 | |
| Second DB Binary Fingerprint | | | | | 0000000 | | | | | | | | 1000000 | | | | | | | | 0100000 | | | |

*FIG. 51*

| | 2015D9-Block7 | 2015W4-Block7 | 2015M2-Block7 | 2015D42-Block7 | 2015Q2-Block7 | 2015Y-Block7 | 2016Y-Block7 |
|---|---|---|---|---|---|---|---|
| First DB Binary Fingerprint | 0000001 | 0000010 | 0000100 | 0010000 | 0001000 | 1100000 | 0000000 |
| Second DB Binary Fingerprint | 0000000 | 0000010 | 0001101 | 0010000 | 0000000 | 1000000 | 0100000 |
| AND Binary Fingerprint | 0000000 | 0000010 | 0000100 | 0010000 | 0000000 | 1000000 | 0000000 |
| XOR Binary Fingerprint for First DB | 0000001 | 0000000 | 0000000 | 0000000 | 0001000 | 0100000 | 0000000 |
| XOR Binary Fingerprint for Second DB | 0000000 | 0000000 | 0001001 | 0000000 | 0000000 | 0000000 | 0100000 |

FIG. 52

Records in the First DB Having a Last Update Date in the First DB that isn't mirrored in the Second DB

| Unique ID | Period | Block | First DB Fingerprint | Second DB Fingerprint | XOR Fingerprint for First DB |
|---|---|---|---|---|---|
| 43 | 2015D9 | 7 | 0000001 | 0000000 | 0000001 |
| 46 | 2015Q2 | 7 | 0001000 | 0000000 | 0001000 |
| 48 | 2015Y | 7 | 1100000 | 1000000 | 0100000 |

Records in the Second DB Having a Last Update Date in the Second DB that isn't mirrored in the First DB

| Unique ID | Period | Block | First DB Fingerprint | Second DB Fingerprint | XOR Fingerprint for Second DB |
|---|---|---|---|---|---|
| 43 | 2015M2 | 7 | 0000100 | 0001101 | 0001001 |
| 46 | 2015M2 | 7 | 0000100 | 0001101 | 0001001 |
| 48 | 2016Y | 7 | 0000000 | 0100000 | 0100000 |

Records in the First DB and Second DB Having Different Dynamic Temporal Segmentation Last Update Dates

| Unique ID | Block | Dynamic Temporal Segmentation LU Date in First DB | Dynamic Temporal Segmentation LU Date in Second DB | Can you compare Dynamic Temporal Segmentation LU Dates to determine which is newer? | Result |
|---|---|---|---|---|---|
| 43 | 7 | 2015D9 | 2015M2 | Yes | Determine that the Second DB has a more recent last update date for Record 43 than the First DB. |
| 46 | 7 | 2015Q2 | 2015M2 | Yes | Determine that the First DB has a more recent last update date for Record 46 than the Second DB. |
| 48 | 7 | 2015Y | 2016Y | Yes | Determine that the Second DB has a more recent last update date for Record 48 than the First DB. |

FIG. 57

| | Block 10 | | | | | | |
|---|---|---|---|---|---|---|---|
| Unique ID | 64 | 65 | 66 | 67 | 68 | 69 | 70 |
| Binary Digit Pos. | $2^0$ | $2^1$ | $2^2$ | $2^3$ | $2^4$ | $2^5$ | $2^6$ |
| Decimal Equiv. | 1 | 2 | 4 | 8 | 16 | 32 | 64 |
| Updates in First DB | 01/07/2015 | 01/12/2015 | 01/27/2015 | 01/27/2015 | 01/27/2015 | 02/05/2015 | 02/01/2015 |
| | 02/09/2015 | 02/23/2015 | 02/13/2015 | 02/09/2015 | 01/31/2015 | | |
| | | | | 02/11/2015 | 02/04/2015 | | |
| Last Update Date in First DB | 02/09/2015 | 02/23/2015 | 02/13/2015 | 02/11/2015 | 02/04/2015 | 02/05/2015 | 02/01/2015 |
| Dynamic Temporal Segmentation Last Update Date in First DB | 2015M2 | 2015M2 | 2015M2 | 2015D42 | 2015M2 | 2015Y | 2015Y |
| Updates in Second DB | 01/07/2015 | 01/12/2015 | 01/27/2015 | 01/27/2015 | 01/27/2015 | 02/05/2015 | 01/07/2015 |
| | 02/09/2015 | 02/23/2015 | 02/13/2015 | 02/09/2015 | 01/31/2015 | | 02/01/2015 |
| | | | | | 02/04/2015 | | |
| Last Update Date in Second DB | 02/09/2015 | 02/23/2015 | 02/13/2015 | 02/09/2015 | 02/04/2015 | 02/05/2015 | 02/01/2015 |
| Dynamic Temporal Segmentation Last Update Date in Second DB | 2015M2 | 2015M2 | 2015M2 | 2015D40 | 2015M2 | 2015Y | 2015M2 |

| Required Temporal Blocks for Day Segmentation | 2015D32, 2015D35, 2015D36, 2015D40, 2015D42, 2015D44, 2015D54 |
|---|---|
| Required Temporal Blocks for Month Segmentation | 2015M2 |
| Required Temporal Blocks for Dynamic Temporal Segmentation | 2015M2, 2015D40, 2015D42, 2015Y |

*FIG. 58*

| Unique ID | 2015M2-Block10 | | | | | | | 2015D40-Block10 | | | | | | | 2015D42-Block10 | | | | | | | 2015Y-Block10 | | | | | | |
|---|---|---|---|---|---|---|---|---|---|---|---|---|---|---|---|---|---|---|---|---|---|---|---|---|---|---|---|---|
| | 64 | 65 | 66 | 67 | 68 | 69 | 70 | 64 | 65 | 66 | 67 | 68 | 69 | 70 | 64 | 65 | 66 | 67 | 68 | 69 | 70 | 64 | 65 | 66 | 67 | 68 | 69 | 70 |
| Binary Digit Pos. | $2^0$ | $2^1$ | $2^2$ | $2^3$ | $2^4$ | $2^5$ | $2^6$ | $2^0$ | $2^1$ | $2^2$ | $2^3$ | $2^4$ | $2^5$ | $2^6$ | $2^0$ | $2^1$ | $2^2$ | $2^3$ | $2^4$ | $2^5$ | $2^6$ | $2^0$ | $2^1$ | $2^2$ | $2^3$ | $2^4$ | $2^5$ | $2^6$ |
| Decimal Equiv. | 1 | 2 | 4 | 8 | 16 | 32 | 64 | 1 | 2 | 4 | 8 | 16 | 32 | 64 | 1 | 2 | 4 | 8 | 16 | 32 | 64 | 1 | 2 | 4 | 8 | 16 | 32 | 64 |
| First DB Last Update Date? | 1 | 1 | 1 | 0 | 1 | 0 | 0 | 0 | 0 | 0 | 1 | 0 | 0 | 0 | 0 | 0 | 0 | 0 | 0 | 0 | 0 | 0 | 0 | 0 | 0 | 0 | 1 | 1 |
| First DB Binary Fingerprint | 0010111 | | | | | | | 0001000 | | | | | | | 0000000 | | | | | | | 1100000 | | | | | | |
| Second DB Last Update Date? | 1 | 1 | 1 | 0 | 1 | 0 | 1 | 0 | 0 | 0 | 1 | 0 | 0 | 0 | 0 | 0 | 0 | 0 | 0 | 0 | 0 | 0 | 0 | 0 | 0 | 0 | 1 | 0 |
| Second DB Binary Fingerprint | 1010111 | | | | | | | 0001000 | | | | | | | 0000000 | | | | | | | 0100000 | | | | | | |

FIG. 59

|  | 2015M2-Block10 | 2015D40-Block10 | 2015D42-Block10 | 2015Y-Block10 |
|---|---|---|---|---|
| First DB Binary Fingerprint | 0010111 | 0000000 | 0001000 | 1100000 |
| Second DB Binary Fingerprint | 1010111 | 0001000 | 0000000 | 0100000 |
| AND Binary Fingerprint | 0010111 | 0000000 | 0000000 | 0100000 |
| XOR Binary Fingerprint for First DB | 0000000 | 0000000 | 0001000 | 1000000 |
| XOR Binary Fingerprint for Second DB | 1000000 | 0001000 | 0000000 | 0000000 |

*FIG. 60*

Records in the First DB Having a Last Update Date in the First DB that isn't mirrored in the Second DB

| Unique ID | Period | Block | First DB Fingerprint | Second DB Fingerprint | XOR Fingerprint for First DB |
|---|---|---|---|---|---|
| 67 | 2015D42 | 10 | 0001000 | 0000000 | 0001000 |
| 70 | 2015Y | 10 | 1100000 | 0100000 | 1000000 |

Records in the Second DB Having a Last Update Date in the Second DB that isn't mirrored in the First DB

| Unique ID | Period | Block | First DB Fingerprint | Second DB Fingerprint | XOR Fingerprint for Second DB |
|---|---|---|---|---|---|
| 70 | 2015M2 | 10 | 0010111 | 1010111 | 1000000 |
| 67 | 2015D40 | 10 | 0001000 | 0000000 | 0001000 |

Records in the First DB and Second DB Having Different Dynamic Temporal Segmentation Last Update Dates

| Unique ID | Block | Dynamic Temporal Segmentation LU Date in First DB | Dynamic Temporal Segmentation LU Date in Second DB | Can you compare Dynamic Temporal Segmentation LU Dates to determine which is newer? | Result |
|---|---|---|---|---|---|
| 67 | 10 | 2015D42 | 2015D40 | Yes | Determine that the First DB has a more recent last update date for Record 67 than the Second DB. |
| 70 | 10 | 2015Y | 2015M2 | No | Determine that the First and Second DBs have different update data for Record 70 and additional processing is required. |

*FIG. 63*

| Records in the First DB Having a Last Update Date in the First DB that isn't mirrored in the Second DB | | | | | |
|---|---|---|---|---|---|
| Unique ID | Period | Block | First DB Fingerprint | Second DB Fingerprint | XOR Fingerprint for First DB |
| 43 | 2015D9 | 7 | 0000001 | 0000000 | 0000001 |
| 46 | 2015Q2 | 7 | 0001000 | 0000000 | 0001000 |
| 48 | 2015Y | 7 | 1100000 | 1000000 | 0100000 |
| 67 | 2015D42 | 10 | 0001000 | 0000000 | 0001000 |
| 70 | 2015Y | 10 | 1100000 | 0100000 | 1000000 |

| Records in the Second DB Having a Last Update Date in the Second DB that isn't mirrored in the First DB | | | | | |
|---|---|---|---|---|---|
| Unique ID | Period | Block | First DB Fingerprint | Second DB Fingerprint | XOR Fingerprint for Second DB |
| 43 | 2015M2 | 7 | 0000100 | 0001101 | 0001001 |
| 46 | 2015M2 | 7 | 0000100 | 0001101 | 0001001 |
| 48 | 2016Y | 7 | 0000000 | 0100000 | 0100000 |
| 70 | 2015M2 | 10 | 0010111 | 1010111 | 1000000 |
| 67 | 2015D40 | 10 | 0001000 | 0000000 | 0001000 |

FIG. 64

| Records in the First DB and Second DB Having Different Dynamic Temporal Segmentation Last Update Dates |||||
|---|---|---|---|---|
| Unique ID | Block | Dynamic Temporal Segmentation LU Date in First DB | Dynamic Temporal Segmentation LU Date in Second DB | Can you compare Dynamic Temporal Segmentation LU Dates to determine which is newer? | Result |
| 43 | 7 | 2015D9 | 2015M2 | Yes | Determine that the Second DB has a more recent last update date for Record 43 than the First DB. |
| 46 | 7 | 2015Q2 | 2015M2 | Yes | Determine that the First DB has a more recent last update date for Record 46 than the Second DB. |
| 48 | 7 | 2015Y | 2016Y | Yes | Determine that the Second DB has a more recent last update date for Record 48 than the First DB. |
| 67 | 10 | 2015D42 | 2015D40 | Yes | Determine that the First DB has a more recent last update date for Record 67 than the Second DB. |
| 70 | 10 | 2015Y | 2015M2 | No | Determine that the First and Second DBs have different update data for Record 70 and additional processing is required. |

FIG. 65

BITWISE DATA COMPARISON UTILIZING DYNAMIC TEMPORAL SEGMENTATION

INCORPORATION BY REFERENCE

The present application hereby incorporates herein by reference the entire disclosure of the Appendix submitted herewith.

COPYRIGHT STATEMENT

All of the material in this patent document is subject to copyright protection under the copyright laws of the United States and other countries. The copyright owner has no objection to the facsimile reproduction by anyone of the patent document or the patent disclosure, as it appears in official governmental records but, otherwise, all other copyright rights whatsoever are reserved.

BACKGROUND OF THE INVENTION

The present invention generally relates to transitioning and reconciling data between multiple data sources.

In the context of enterprise-level software applications, such as enterprise-level healthcare software applications, there often is a need to transition or reconcile large amounts of data.

For example, an enterprise-level healthcare software solution may need to utilize a nightly extract-transform-load (ETL) process to synchronize electronic healthcare record data from a clinical data warehouse (CDW) to another data store, such as one associated with clinical performance management (CPM). This might require transferring updated and newly added records from a CDW database at a first location to a CPM database at a second location.

Traditionally, this might be accomplished by a nightly process which attempts to join a database from the clinical data warehouse with a database from a CPM data store, and/or which compares records from each of these databases against one another. However, this can require communication of a large number of records across a network and can create a logjam at one or both databases.

A need exists for improvement in methodologies for transitioning and reconciling data. This, and other needs, are addressed by one or more aspects of the present invention.

SUMMARY OF THE INVENTION

The present invention includes many aspects and features. Moreover, while many aspects and features relate to, and are described in, the context of healthcare software, the present invention is not limited to use only in this context, as will become apparent from the following summaries and detailed descriptions of aspects, features, and one or more embodiments of the present invention.

Accordingly, one aspect of the present invention relates to a method for synchronizing records stored at a first data storage location with records stored at a second, remote data storage location utilizing bitwise fingerprints to reduce network resource usage and bitwise operations to reduce processing resource usage. The method includes, (a) for records in a first data set stored at a first data store that are each associated with a numerical ID unique to the first data set, (i) determining a block size representing a number of sequential numerical IDs which will be associated with a single block, (ii) defining a plurality of blocks based on the determined block size and the unique IDs of the records in the first data set, each block of the defined plurality of blocks being associated with a block identifier comprising a unique numerical block identifier, wherein the unique numerical block identifier for a block and the block size determine sequential numerical IDs associated with that block, (iii) for each respective block of the defined plurality of blocks, generating a respective bitwise fingerprint for that respective block, each respective bit of the respective bitwise fingerprint indicating the existence or nonexistence of a record in the first data set having the unique ID associated with that respective bit; (b) for records in a second data set stored at a second data store that are each associated with a numerical ID unique to the second data set, (i) determining a block size representing a number of sequential numerical IDs which will be associated with a single block, (ii) defining a plurality of blocks based on the determined block size and the unique IDs of the records in the first data set, each block of the defined plurality of blocks being associated with a block identifier comprising a unique numerical block identifier, wherein the unique numerical block identifier for a block and the block size determine the sequential numerical IDs associated with that block, (iii) for each respective block of the defined plurality of blocks, generating a respective bitwise fingerprint for that respective block, each respective bit of the respective bitwise fingerprint indicating the existence or nonexistence of a record in the second data set having the unique ID associated with that respective bit; (c) comparing the existence of records in the first and second data sets by performing bitwise operations on the generated bitwise fingerprints by, for each respective numerical block identifier associated with a block of the first data set and a block of the second data set, (i) determining, by performing an equality comparison between (A) the generated bitwise fingerprint for the block of the first data set corresponding to the respective numerical block identifier, and (B) the generated bitwise fingerprint for the block of the second data set corresponding to the respective numerical block identifier, whether the same records associated with the block corresponding to the respective numerical block identifier exist in both the first data set and the second data set, (ii) for cases where the generated bitwise fingerprint for the block of the first data set corresponding to the respective numerical block identifier and the generated bitwise fingerprint for the block of the second data set corresponding to the respective numerical identifier do not match, (A) generating an AND fingerprint corresponding to the respective numerical block identifier by performing an AND operation between (I) the generated bitwise fingerprint for the block of the first data set corresponding to the respective numerical block identifier, and (II) the generated bitwise fingerprint for the block of the second data set corresponding to the respective numerical block identifier, (B) determining records that exist in the first data set but not the second data set by generating a first data set XOR fingerprint for the block of the first data set corresponding to the respective numerical block identifier by performing an XOR operation between (I) the generated bitwise fingerprint for the block of the first data set corresponding to the respective numerical block identifier, and (II) the generated AND fingerprint corresponding to the respective numerical block identifier, (III) wherein each respective bit of the generated first data set XOR fingerprint indicates that a record having the unique ID associated with that respective bit exists in the first data set but not the second data set, (C) determining records that exist in the second data set but not the first data set by generating a second data set XOR fingerprint for the block of the second data set corresponding to the respective numerical block identifier by performing an XOR operation between (I) the generated bitwise fingerprint for the block of the second data set corresponding to the respective numerical block identifier, and (II) the generated AND fingerprint corresponding to the respective numerical block identifier, (III) wherein each respective bit of the generated second data set XOR fingerprint indicates that a record having the unique ID associated with that respective bit exists in the second data set but not the first data set; and (d) updating the second data set by transferring, from the first data store to the second data store, records from the first data set that were indicated, based on having a unique ID associated with a respective bit in a generated first data set XOR fingerprint, to exist in the first data set but not the second data set.

In a feature of this aspect, the block size is sixty three.

In a feature of this aspect, the block size is selected to be $(2^n-1)$, where n can be any number greater than 1.

In a feature of this aspect, the method is utilized to transfer records from a clinical data warehouse data store to a clinical performance management data store.

In a feature of this aspect, the first data set comprises healthcare records.

Another aspect relates to a method for synchronizing records stored at a first data storage location with records stored at a second, remote data storage location utilizing bitwise fingerprints to reduce network resource usage and bitwise operations to reduce processing resource usage. The method includes maintaining, at a first data store, for each respective record in a first data set stored at the first data store, (i) a respective dynamic temporal segmentation last update date, the respective dynamic temporal segmentation last update date for the respective record being generated based on the last two update dates for the respective record, (ii) wherein each respective record is associated with a numerical ID unique to the first data set, (b) for records in the first data set, (i) determining a block size representing a number of sequential numerical IDs which will be associated with a single block, (ii) defining a plurality of numerical block identifiers based on the determined block size and the unique IDs of the records in the first data set, wherein the unique numerical block identifier and the block size determine sequential numerical IDs associated with that unique numerical block identifier, (iii) for each respective numerical block identifier, (A) determining a respective set of dynamic temporal segmentation last update dates for records in the first data set having a unique ID associated with the respective numerical block identifier, (B) for each respective dynamic temporal segmentation last update date in the respective set of dynamic temporal segmentation last update dates, (1) defining a respective temporal block associated with the respective numerical block identifier and the respective dynamic temporal segmentation last update date, each respective temporal block being associated with a temporal block identifier comprising an indication of the corresponding respective numerical block identifier and an indication of the corresponding respective dynamic temporal segmentation last update date, (2) for each defined respective temporal block, generating a respective bitwise fingerprint for that respective temporal block, each respective bit of the respective bitwise fingerprint indicating whether a record in the first data set having the unique ID associated with that respective bit has a dynamic temporal segmentation last update date matching the respective dynamic temporal segmentation last update date; (c) maintaining, at a second data store, for each respective record in a second data set stored at the second data store, (i) a respective dynamic temporal segmentation last update date, the respective dynamic temporal segmentation last update date for the respective record being generated based on the last two update dates for the respective record, (ii) wherein each respective record is associated with a numerical ID unique to the first data set, (d) for records in the second data set, (i) determining a block size representing a number of sequential numerical IDs which will be associated with a single block, (ii) defining a plurality of numerical block identifiers based on the determined block size and the unique IDs of the records in the first data set, wherein the unique numerical block identifier and the block size determine sequential numerical IDs associated with that unique numerical block identifier, (iii) for each respective numerical block identifier, (A) determining a respective set of dynamic temporal segmentation last update dates for records in the second data set having a unique ID associated with the respective numerical block identifier, (B) for each respective dynamic temporal segmentation last update date in the respective set of dynamic temporal segmentation last update dates, (1) defining a respective temporal block associated with the respective numerical block identifier and the respective dynamic temporal segmentation last update date, each respective temporal block being associated with a temporal block identifier comprising an indication of the corresponding respective numerical block identifier and an indication of the corresponding respective dynamic temporal segmentation last update date, (2) for each defined respective temporal block, generating a respective bitwise fingerprint for that respective temporal block, each respective bit of the respective bitwise fingerprint indicating whether a record in the first data set having the unique ID associated with that respective bit has a dynamic temporal segmentation last update date matching the respective dynamic temporal segmentation last update date; (e) comparing the timeliness of records in the first and second data sets by performing bitwise operations on the generated bitwise fingerprints by, for each respective temporal block identifier for the first data set or the second data set, (i) determining, by performing an equality comparison between (A) the generated bitwise fingerprint for the temporal block of the first data set corresponding to the respective temporal block identifier, and (B) the generated bitwise fingerprint for the temporal block of the second data set corresponding to the respective temporal block identifier, whether any of the records associated with the temporal block corresponding to the respective temporal block identifier have different dynamic temporal segmentation last update date in the first and second data sets, (ii) for cases where the generated bitwise fingerprint for the temporal block of the first data set corresponding to the respective temporal block identifier and the generated bitwise fingerprint for the temporal block of the second data set corresponding to the respective temporal identifier do not match, (A) generating an AND fingerprint corresponding to the respective temporal block identifier by performing an AND operation between (I) the generated bitwise fingerprint for the temporal block of the first data set corresponding to the respective temporal block identifier, and (II) the generated bitwise fingerprint for the temporal block of the second data set corresponding to the respective temporal block identifier, (B) determining records that have a dynamic temporal segmentation last update date corresponding to the respective temporal block identifier in the first data set but not the second data set by generating a first data set XOR fingerprint for the temporal block of the first data set corresponding to the respective temporal block identifier by performing an XOR operation between (I) the generated bitwise fingerprint for the temporal block of the first data set corresponding to the respective temporal block identifier, and (II) the generated AND fingerprint corresponding to the respective temporal block identifier, (III) wherein each respective bit of the generated first data set XOR fingerprint indicates that a record having the unique ID associated with that respective bit has a dynamic temporal segmentation last update date corresponding to the respective temporal block identifier in the first data set but not the second data set, (C) determining records that have a dynamic temporal segmentation last update date corresponding to the respective temporal block identifier in the second data set but not the first data set by generating a second data set XOR fingerprint for the temporal block of the second data set corresponding to the respective temporal block identifier by performing an XOR operation between (I) the generated bitwise fingerprint for the temporal block of the second data set corresponding to the respective temporal block identifier, and (II) the generated AND fingerprint corresponding to the respective temporal block identifier, (III) wherein each respective bit of the generated second data set XOR fingerprint indicates that a record having the unique ID associated with that respective bit has a dynamic temporal segmentation last update date corresponding to the respective temporal block identifier in the second data set but not the first data set, (f) comparing, for each unique ID indicated by a generated first data set XOR fingerprint for a first respective temporal block and a generated second data set XOR fingerprint for a second respective temporal block to correspond to records in the first and second data sets that have different dynamic temporal segmentation last update dates, (i) the dynamic temporal segmentation last update date corresponding to the first respective temporal block, and (ii) the dynamic temporal segmentation last update date corresponding to the second respective temporal block, and for one or more unique IDs for which it is determined based on the comparison that one of the data sets includes a more recently updated record having that unique ID, transferring the more recently updated record having that unique ID to the other data store.

In a feature of this aspect, dynamic temporal segmentation last update dates are configured to utilize, as one potential level of temporal segmentation, a decade.

In a feature of this aspect, dynamic temporal segmentation last update dates are configured to utilize, as one potential level of temporal segmentation, a year.

In a feature of this aspect, dynamic temporal segmentation last update dates are configured to utilize, as one potential level of temporal segmentation, a quarter.

In a feature of this aspect, dynamic temporal segmentation last update dates are configured to utilize, as one potential level of temporal segmentation, a month.

In a feature of this aspect, dynamic temporal segmentation last update dates are configured to utilize, as one potential level of temporal segmentation, a week.

In a feature of this aspect, dynamic temporal segmentation last update dates are configured to utilize, as one potential level of temporal segmentation, a day.

In a feature of this aspect, dynamic temporal segmentation last update dates are configured to utilize, as one potential level of temporal segmentation, an hour.

In a feature of this aspect, dynamic temporal segmentation last update dates are configured to utilize, as one potential level of temporal segmentation, a minute.

In a feature of this aspect, dynamic temporal segmentation last update dates are configured to utilize, as one potential level of temporal segmentation, a second.

Still additional aspects and features are disclosed in the incorporated Appendix.

In addition to the aforementioned aspects and features of the present invention, it should be noted that the present invention further encompasses the various possible combinations and subcombinations of such aspects and features. Thus, for example, any aspect may be combined with an aforementioned feature in accordance with the present invention without requiring any other aspect or feature.

BRIEF DESCRIPTION OF THE DRAWINGS

One or more preferred embodiments of the present invention now will be described in detail with reference to the accompanying drawings, wherein the same elements are referred to with the same reference numerals.

FIG. 7 illustrates conceptual splitting of unique IDs for 28 records into four blocks.

FIG. 9 illustrates an indication of the existence of a record for each of unique IDs 01 to 07 corresponding to a first block.

FIG. 10 illustrates in more detail the use of indications of the existence of records having unique IDs corresponding to a first block to construct a bitwise fingerprint.

FIG. 11 illustrates the use of a fingerprint construction methodology for multiple blocks.

FIG. 12 illustrates constructed bitwise fingerprints for blocks 1 to 4 (indicating the existence of records having unique IDs 01 through 28) for each of two databases.

FIGS. 13-22 illustrates an exemplary methodology for determining records missing from a database as compared to another database.

FIG. 24 illustrates exemplary tables listing the unique IDs of records found in a first database but not a second database.

FIG. 25 illustrates reformatting of the table of FIG. 24.

FIG. 26 illustrates construction of a fingerprint for a block of a first database indicating whether each record in the block was updated on a particular day.

FIG. 27 illustrates construction of a fingerprint for a block of a second database indicating whether each record in the block was updated on a particular day.

FIGS. 28-31 illustrate how bitwise fingerprints and bitwise operations can be utilized to determine whether there are any records that were updated in a first database but not a second database on a particular day.

FIG. 32 illustrates the construction of fingerprints for multiple temporal blocks each corresponding to a particular day.

FIG. 33 illustrates the construction of fingerprints for multiple temporal blocks each corresponding to a particular month.

FIGS. 34-35 illustrate that it can be difficult to select an appropriate temporal segmentation level.

FIG. 36 illustrates update dates for records in a particular block of the first database.

FIG. 37 mapped some of the update dates of FIG. 36 onto a simple calendar.

FIGS. 38-40 illustrate determination of a dynamic temporal segmentation update date for these mapped update dates

FIG. 43 illustrates determined dynamic temporal segmentation last update dates for each record in a particular block of the first database.

FIG. 44 illustrates how only the two most recent update dates are needed to calculate a dynamic temporal segmentation last update date.

FIGS. 45-46 illustrate the construction of a first database fingerprint for multiple temporal blocks.

FIG. 47 illustrates a table listing changes in the first database.

FIG. 49 illustrates update dates for records in a particular block of the second database, and determined dynamic temporal segmentation last update dates for each record in the block.

FIGS. 50-51 illustrate each of the temporal blocks generated for a particular block based on a unique determined dynamic temporal segmentation last update date value for the first or second database.

FIGS. 52-56 illustrate how determined fingerprints can be utilized to compare the timeliness of the same records in different databases.

FIG. 57 illustrates exemplary tables illustrating records determined to have different update information in the first and second databases.

FIG. 58 supplements the information in FIG. 35 with a listing of required temporal blocks for dynamic temporal segmentation.

FIG. 59 illustrates the construction of a first database fingerprint and a second database fingerprint for temporal blocks.

FIGS. 60-62 illustrate how determined fingerprints can be utilized to compare the timeliness of the same records in different databases.

FIG. 63 illustrates exemplary tables listing records determined to have different update information in the first and second databases.

FIGS. 64-65 illustrate exemplary tables listing records from multiple blocks determined to have different update information in the first and second databases.

DETAILED DESCRIPTION

Figure 1:
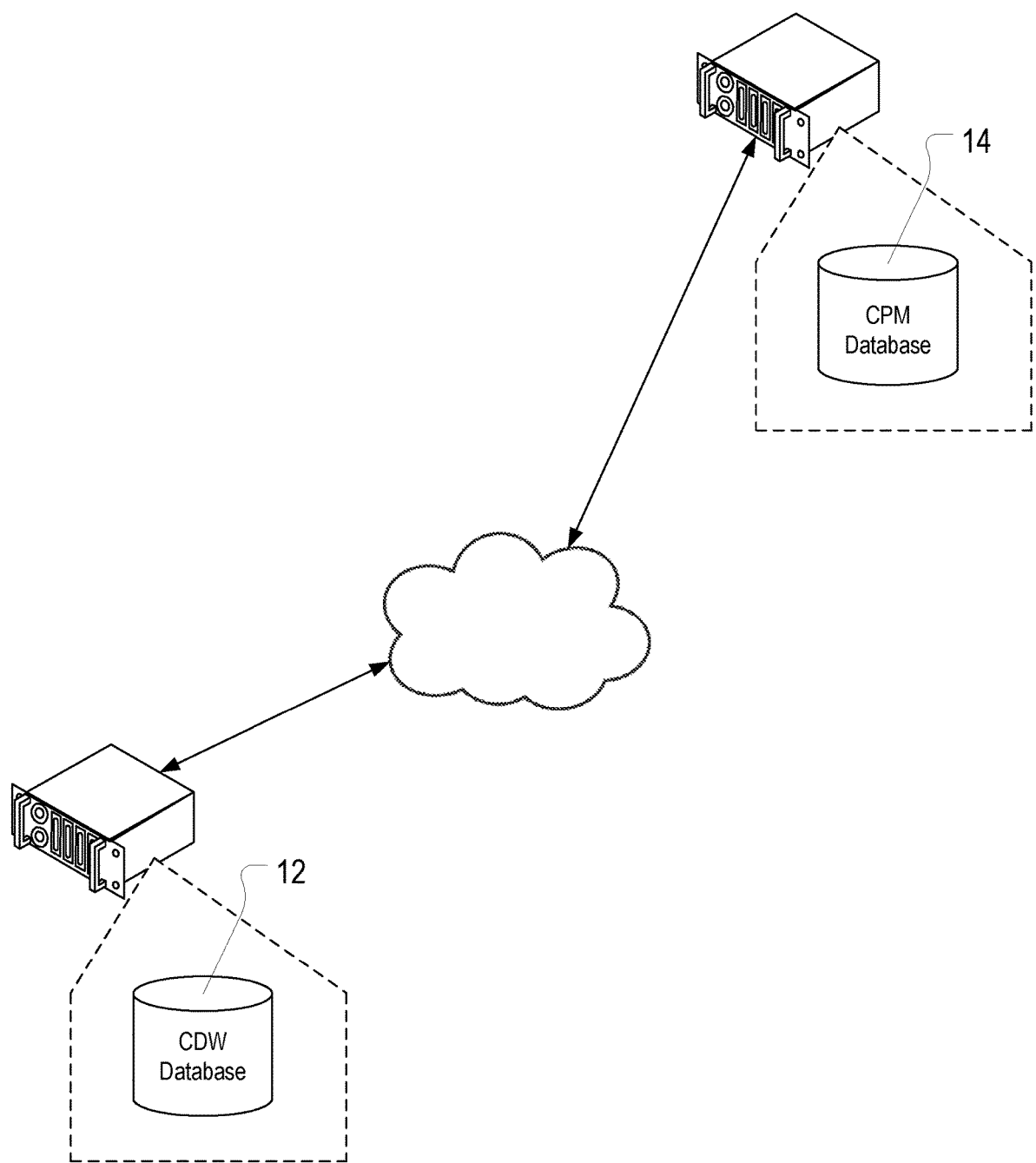
FIG. 1 illustrates an exemplary system including two databases.

As a preliminary matter, it will readily be understood by one having ordinary skill in the relevant art ("Ordinary Artisan") that the invention has broad utility and application. Furthermore, any embodiment discussed and identified as being "preferred" is considered to be part of a best mode contemplated for carrying out the invention. Other embodiments also may be discussed for additional illustrative purposes in providing a full and enabling disclosure of the invention. Furthermore, an embodiment of the invention may incorporate only one or a plurality of the aspects of the invention disclosed herein; only one or a plurality of features disclosed herein; or combination thereof. As such, many embodiments are implicitly disclosed herein and fall within the scope of what is regarded as the invention.

Accordingly, while the invention is described herein in detail in relation to one or more embodiments, it is to be understood that this disclosure is illustrative and exemplary of the invention, and is made merely for the purposes of providing a full and enabling disclosure of the invention. The detailed disclosure herein of one or more embodiments is not intended, nor is to be construed, to limit the scope of patent protection afforded the invention in any claim of a patent issuing here from, which scope is to be defined by the claims and the equivalents thereof. It is not intended that the scope of patent protection afforded the invention be defined by reading into any claim a limitation found herein that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the invention. Accordingly, it is intended that the scope of patent protection afforded the invention is to be defined by the issued claim(s) rather than the description set forth herein.

Additionally, it is important to note that each term used herein refers to that which the Ordinary Artisan would understand such term to mean based on the contextual use of such term herein. To the extent that the meaning of a term used herein—as understood by the Ordinary Artisan based on the contextual use of such term—differs in any way from any particular dictionary definition of such term, it is intended that the meaning of the term as understood by the Ordinary Artisan should prevail.

With regard solely to construction of any claim with respect to the United States, no claim element is to be interpreted under 35 U.S.C. 112(f) unless the explicit phrase "means for" or "step for" is actually used in such claim element, whereupon this statutory provision is intended to and should apply in the interpretation of such claim element. With regard to any method claim including a condition precedent step, such method requires the condition precedent to be met and the step to be performed at least once during performance of the claimed method.

Furthermore, it is important to note that, as used herein, "a" and "an" each generally denotes "at least one," but does not exclude a plurality unless the contextual use dictates otherwise. Thus, reference to "a picnic basket having an apple" describes "a picnic basket having at least one apple" as well as "a picnic basket having apples." In contrast, reference to "a picnic basket having a single apple" describes "a picnic basket having only one apple."

When used herein to join a list of items, "or" denotes "at least one of the items," but does not exclude a plurality of items of the list. Thus, reference to "a picnic basket having cheese or crackers" describes "a picnic basket having cheese without crackers", "a picnic basket having crackers without cheese", and "a picnic basket having both cheese and crackers." When used herein to join a list of items, "and" denotes "all of the items of the list." Thus, reference to "a picnic basket having cheese and crackers" describes "a picnic basket having cheese, wherein the picnic basket further has crackers," as well as describes "a picnic basket having crackers, wherein the picnic basket further has cheese."

Referring now to the drawings, one or more preferred embodiments of the invention are next described. The following description of one or more preferred embodiments is merely exemplary in nature and is in no way intended to limit the invention, its implementations, or uses.

As described above, in the context of enterprise-level software applications, such as enterprise-level healthcare software applications, there often is a need to transition or reconcile large amounts of data.

For the sake of context, the previously noted example of an enterprise-level healthcare software solution needing to synchronize updates to electronic healthcare record data at a clinical data warehouse (CDW) to a data store associated with clinical performance management (CPM) will be utilized for describing one or more preferred implementations.

FIG. 1 illustrates an exemplary system including such a CDW database 12 and a CPM database 14. Electronic healthcare records are continually updated at the CDW database, and these updates need to be synchronized to the CPM database 14.

One approach to this problem is to utilize an "update date" data field to capture when records are updated. Under such an approach, when a record is updated, the most recent update date is tracked in this field. Thus, in order to synchronize data, a conventional process might locate all records at the CDW database 12 that have an update date on or after the last transfer operation, and then only transfer those records.

Figure 2:
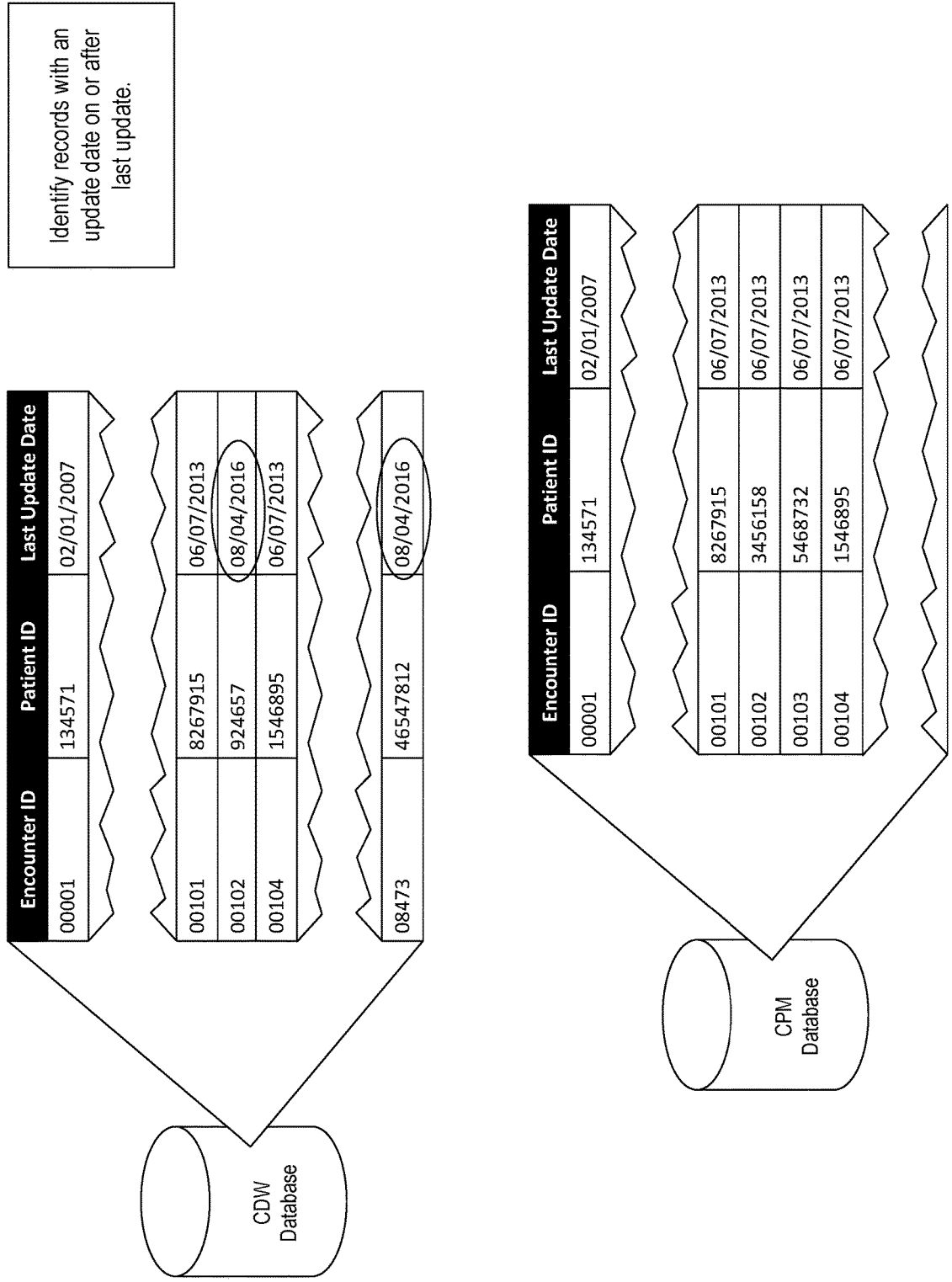
FIGS. 2-3 illustrate an exemplary process which locates all records at a first database that have an update date on or after the last transfer operation, and then only transfer those records.
Figure 3:
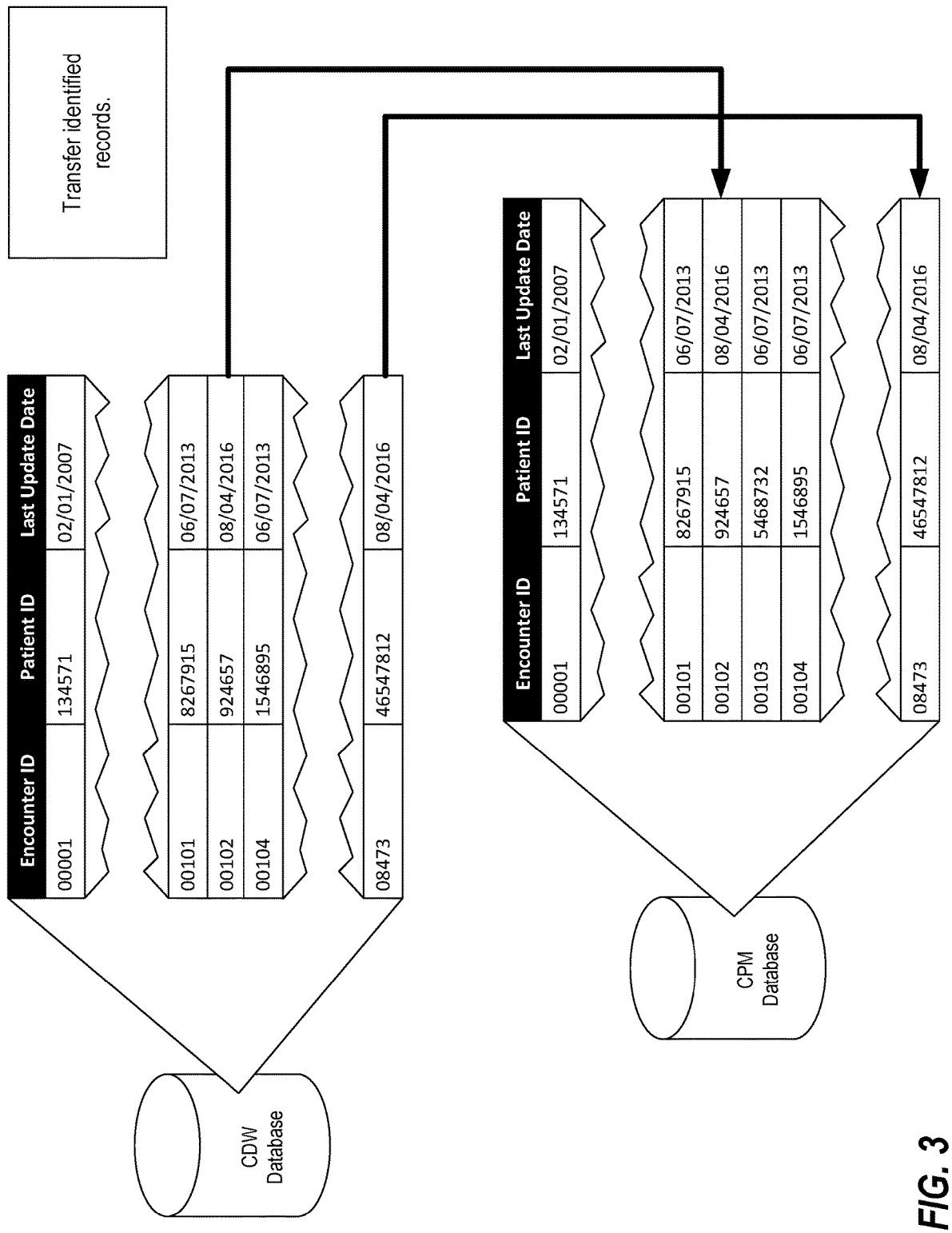

FIGS. 2-3 illustrate an exemplary process utilizing this approach. As illustrated in FIG. 2, first, records having an update date on or after a certain threshold (e.g. the last time a synchronization process was performed) are identified. In the example illustrated in FIG. 2, this would include a record with an encounter ID of 102 that was updated on Aug. 4, 2016, and a new record with an encounter ID of 8473 that was added on Aug. 4, 2016. Next, as illustrated in FIG. 3, the identified records are transferred to the CPM database.

However, such a process has a major drawback in that it fails to account for records that have been purged from the CDW database 12. Records that are purged from the CDW database 12 would no longer exist, and thus a search for records with an update date after a certain time would not locate these records. For example, returning to the example of FIGS. 2-3, although the record having an encounter ID of 103 has been purged from the CDW database 12, this is not reflected in the CPM database 14, which still includes the purged record.

Figure 4:
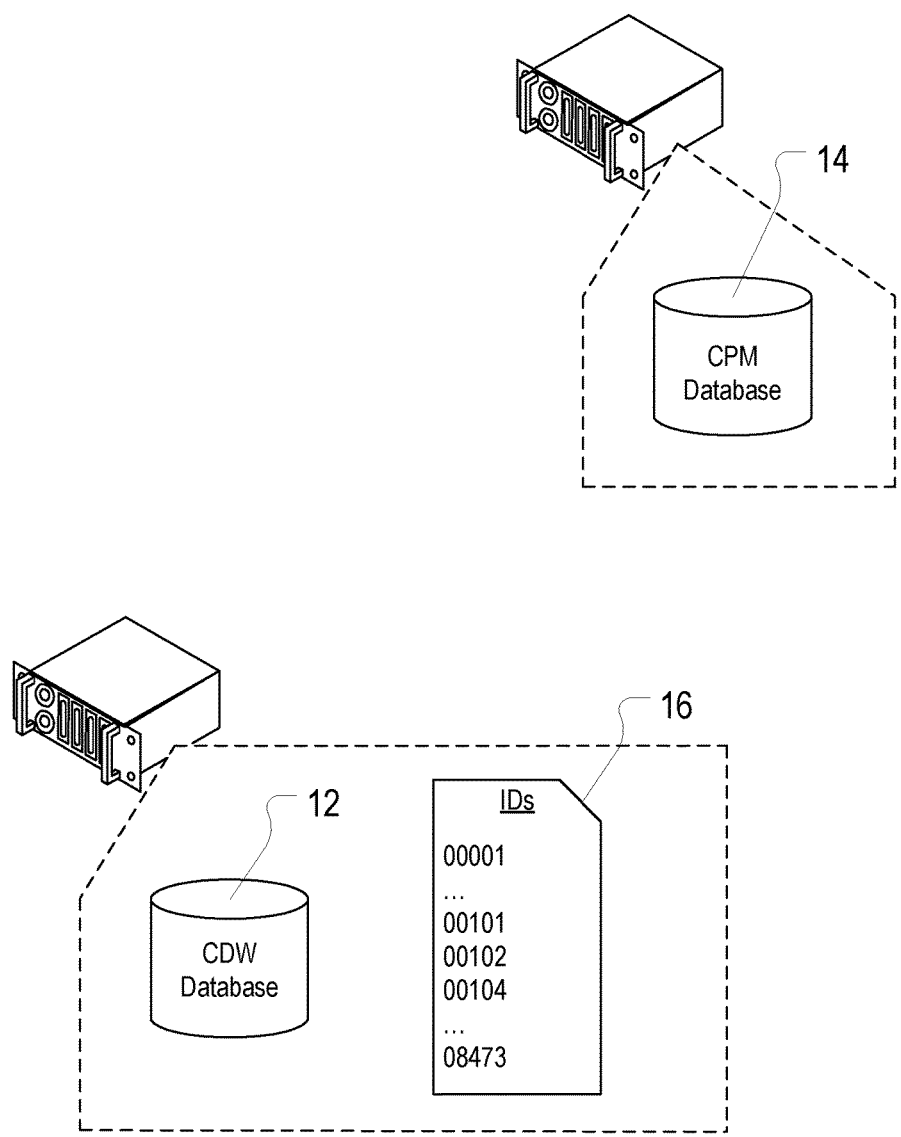
FIG. 4 illustrates construction of a set of encounter IDs for a database.
Figure 5:
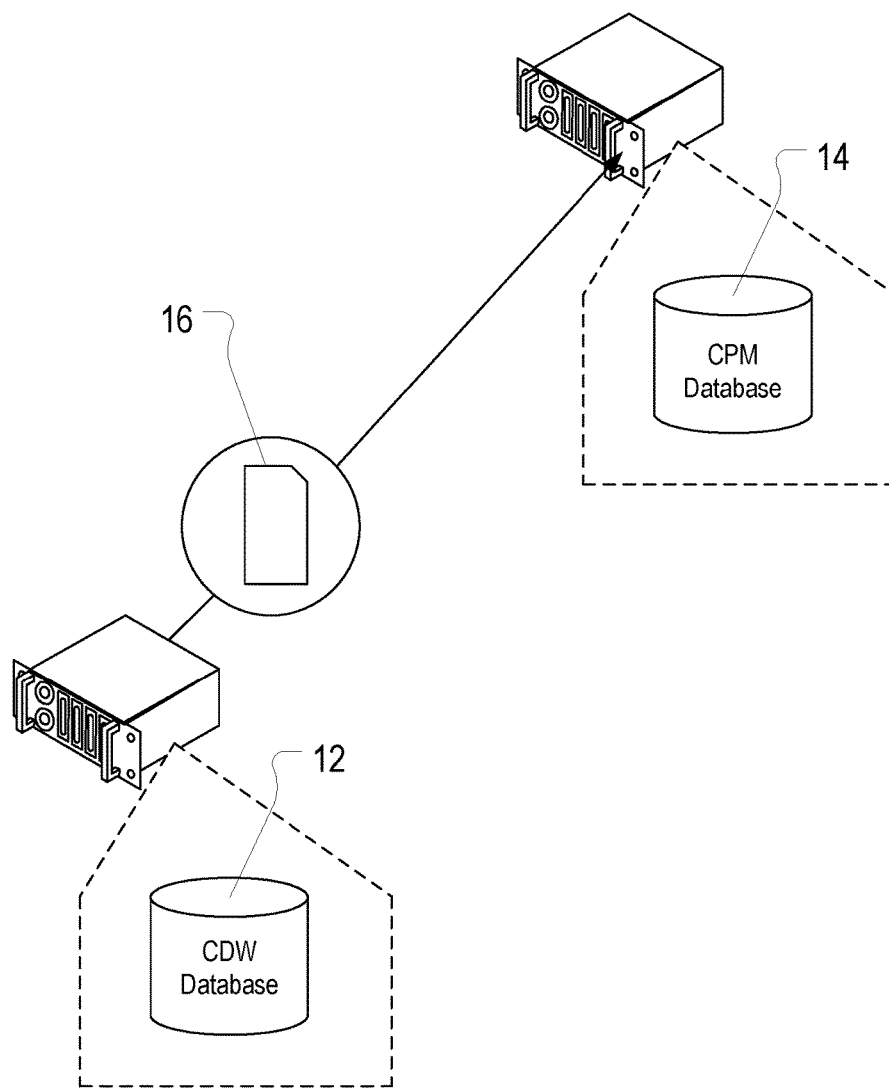
FIG. 5 illustrates communication of the constructed set of encounter IDs of FIG. 4 for comparison to encounter IDs in another database.
Figure 6:
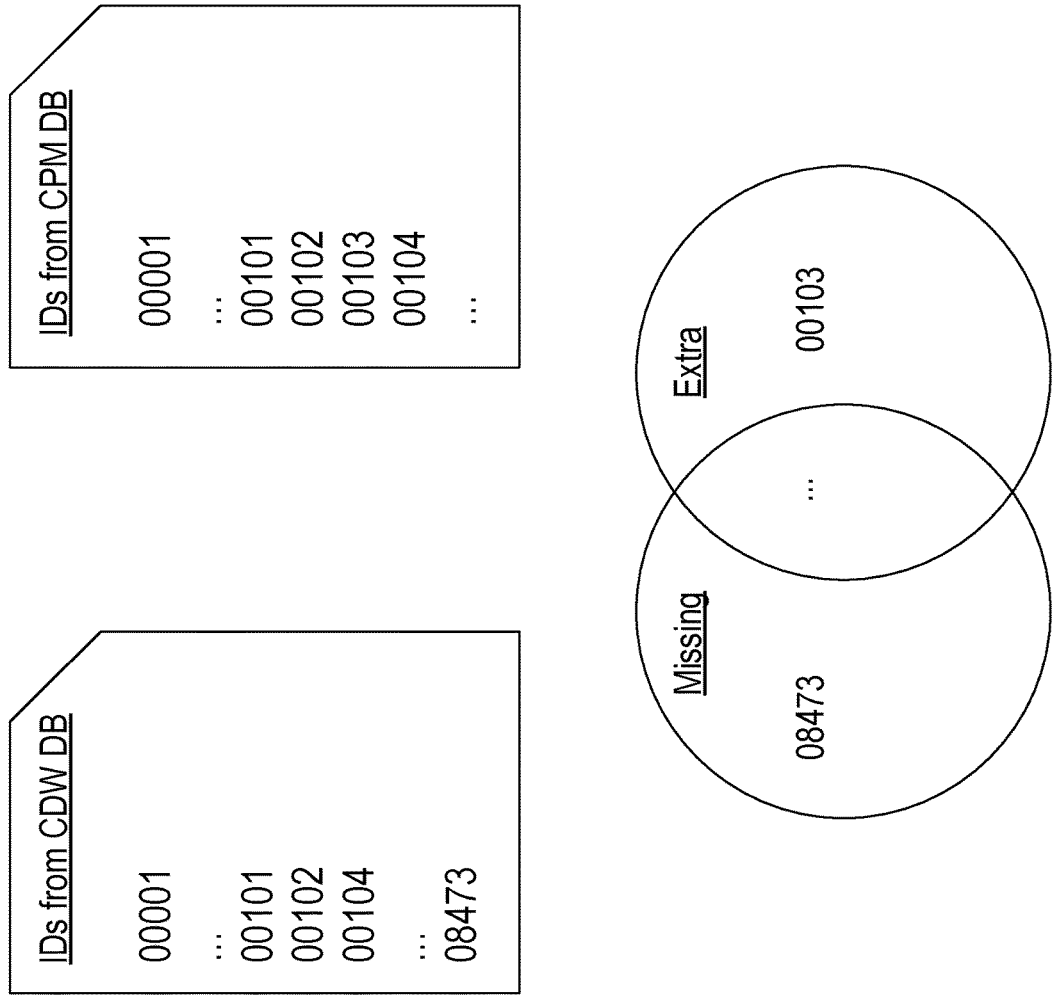
FIG. 6 illustrates how comparing a set of encounter IDs for a first database to encounter IDs contained in a second database reveals encounter IDs missing from the second database, and extra encounter IDs in the second database.

Another approach which attempts to obviate this issue involves utilizing unique record ID fields to reconcile records between two databases. For example, the unique encounter ID field could be utilized to reconcile records between the CDW database 12 and the CPM database 14. This approach would typically involve building a set of encounter IDs 16 for the records contained in the CDW database 12 as illustrated in FIG. 4, and then communicating this set of encounter IDs for comparison to encounter IDs contained in the CPM database 14, as illustrated in FIG. 5. Comparing this set of encounter IDs for the CDW database 12 to encounter IDs contained in the CPM database 14 reveals encounter IDs missing from the CPM database 14, and extra encounter IDs in the CPM database 14, as illustrated in FIG. 6.

This approach, however, requires communication of the entire set of encounter IDs for the CDW database 12, which utilizes network resources, and further requires record by record comparison of two large sets of encounter IDs, which utilizes processing resources.

In accordance with one or more preferred implementations, bitwise fingerprints are utilized to facilitate identification of records for transfer, deletion, or updating. In accordance with one or more preferred implementations, unique IDs (such as encounter IDs) are utilized to construct such bitwise fingerprints.

Consider, for example, a database containing records having unique IDs numbered from 1 to 28. This exemplary database can be conceptually split into four blocks, with each block containing information on up to 7 records. The first block, for example, would correspond to records having a unique ID of 1 to 7. The second block would correspond to records having a unique ID of 8 to 14. The third block would correspond to records having a unique ID of 15 to 21. The fourth block would correspond to records having a unique ID of 22 to 28. Such conceptual splitting of unique IDs for 28 records into four blocks is illustrated in FIG. 7.

Once split up into blocks, a bitwise fingerprint can be constructed for each of these blocks to represent information about the records corresponding to these blocks.

Figure 8:
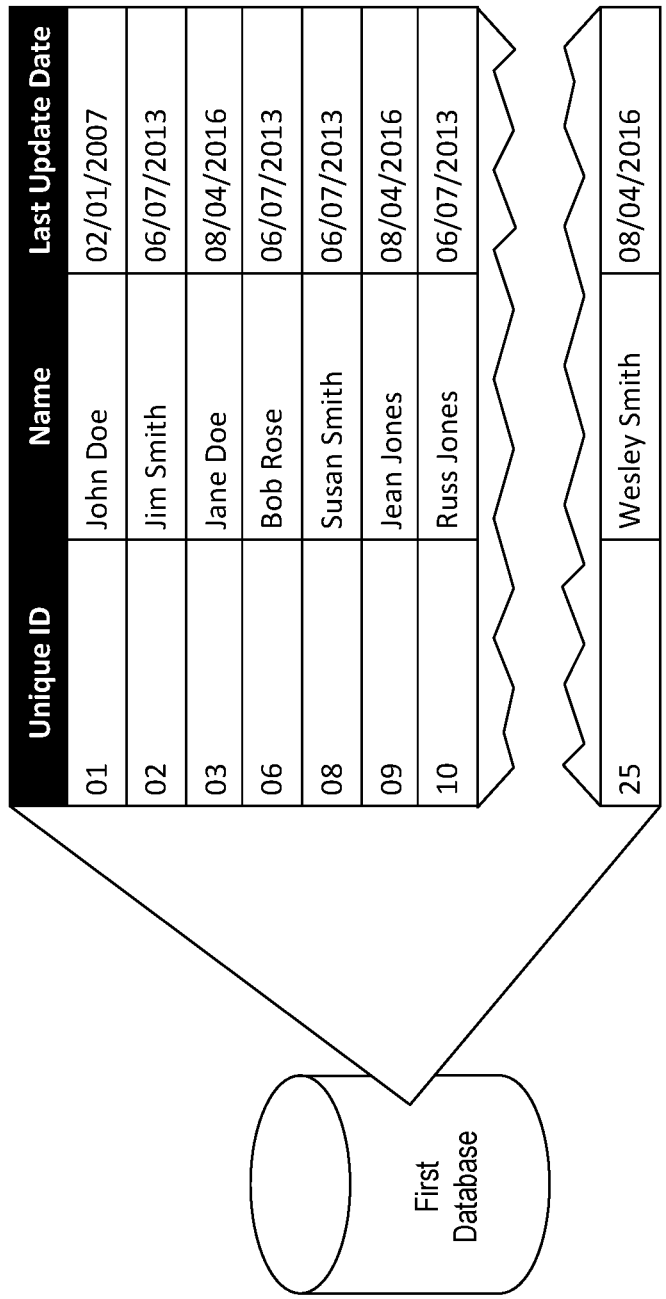
FIG. 8 illustrates a first database containing a plurality of records each of which has a unique ID.

For example, FIG. 8 illustrates a first database containing a plurality of records each of which has a unique ID. Using the block structure noted above, a plurality of bitwise fingerprints can be constructed for the first database which represent information about the existence of records in the first database. In particular, a bitwise fingerprint can be constructed for each defined block which represents information about the existence of records having unique IDs corresponding to the first block. FIG. 9 illustrates an indication of the existence of a record for each of the unique IDs 01 to 07 corresponding to the first block, with a one indicating that a record exists in the first database for that unique ID, and a zero indicating that a record does not exist in the first database for that unique ID. In accordance with one or more preferred implementations, this set of zeroes and ones for a block can be cast as binary notation and utilized as a bitwise fingerprint. For example, the illustrated set of zeroes and ones in FIG. 9 may be read one way and taken to represent the binary value "0100111", or may be read the other way and taken to represent the binary value "1110010". It will be appreciated that the direction in which it is read is not important, so long as it is consistent throughout a methodology.

FIG. 10 illustrates in more detail the use of the indications of the existence of records having unique IDs corresponding to the first block to construct a bitwise fingerprint. This bitwise fingerprint can be represented as "0100111" in binary notation, and "39" in decimal notation. Information regarding the existence of records having unique IDs corresponding to other blocks can be similarly utilized to construct a bitwise fingerprint for those other blocks. FIG. 11 illustrates how the same fingerprint construction methodology can be utilized for each block.

Once a bitwise fingerprint has been constructed for each block in the first database, these bitwise fingerprints can be compared to bitwise fingerprints for the same blocks for another database to determine if any records are missing from either database, and, if so, which records are missing from each database. In accordance with one or more preferred implementations, a simple equality comparison is utilized to determine whether there is a difference in the existence of records between the databases. In accordance with one or more preferred implementations, if the equality comparison fails, bitwise operations are performed on such constructed fingerprints to quickly determine differences in the two databases.

For example, FIG. 12 illustrates constructed bitwise fingerprints for blocks 1 to 4 (indicating the existence of records having unique IDs 01 through 28) for each of two databases. A preferred methodology for determining records missing from each database will now be described.

Figure 16:
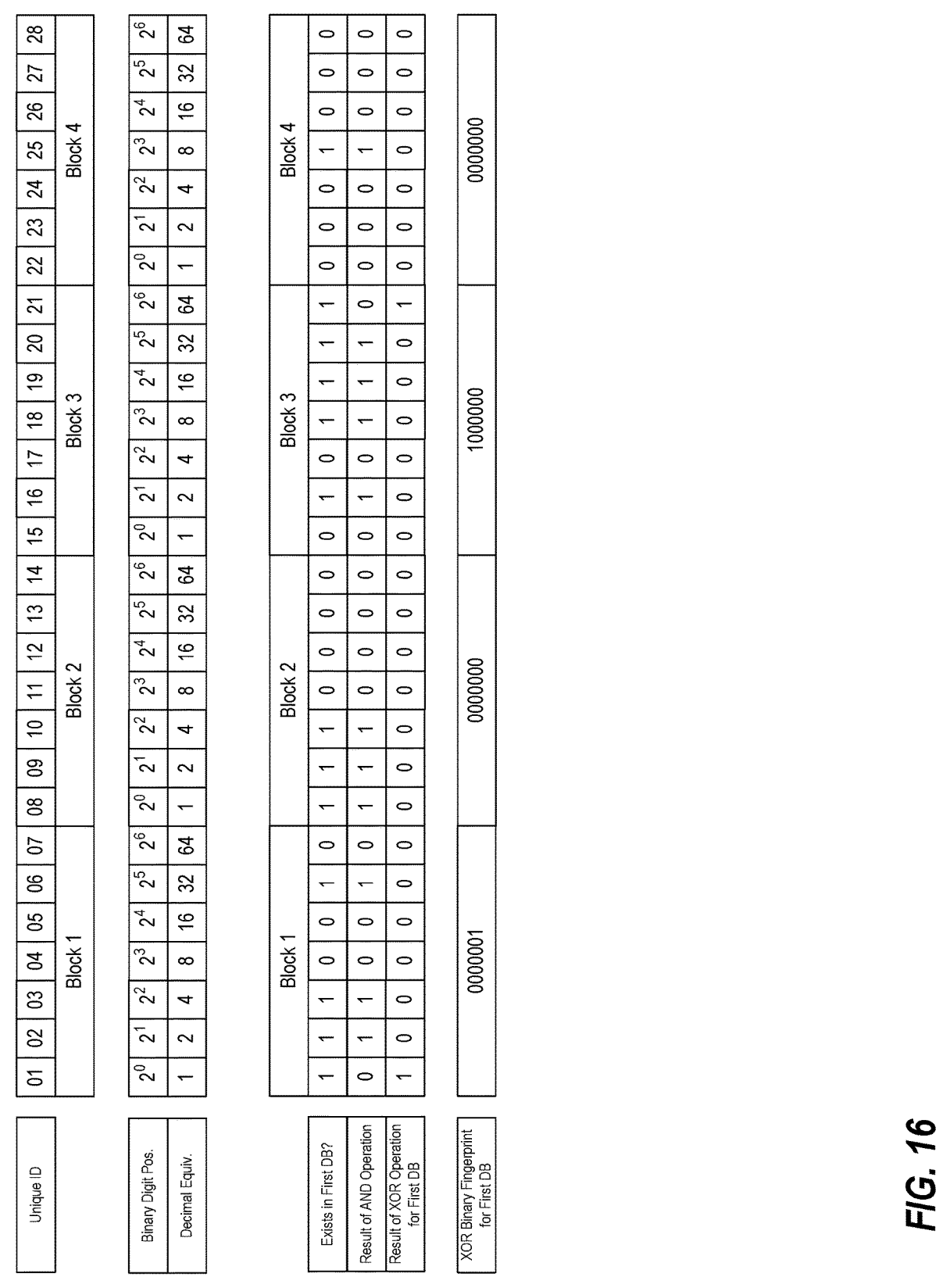
Figure 17:
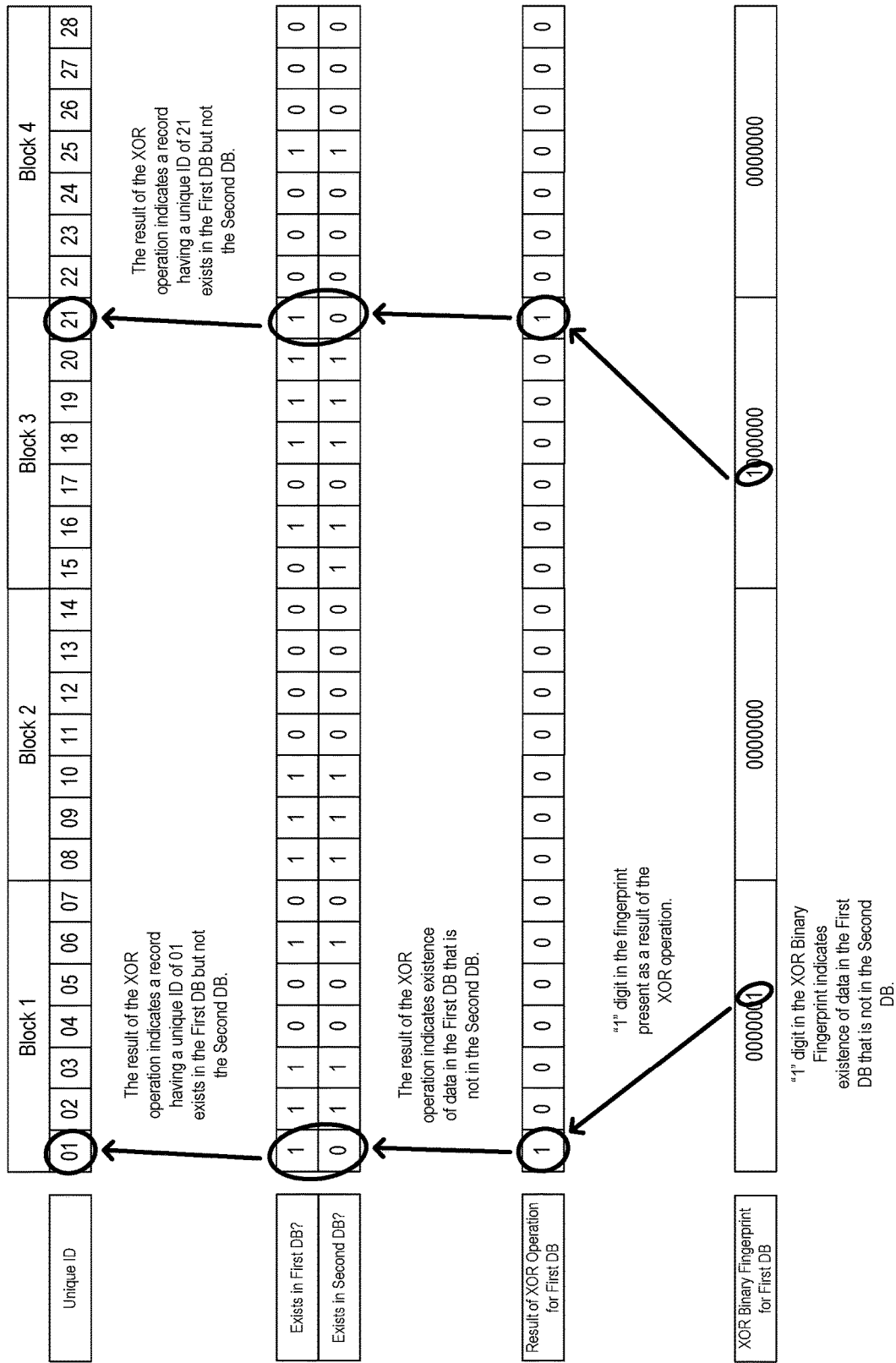

First, for each block, the bitwise fingerprints for that block for each database are ANDed together to generate an AND fingerprint, as illustrated in FIGS. 13-14. To determine records for a particular block present in the first database but absent in the second database (e.g. missing records), the AND fingerprint for that block is XORed against the first database's fingerprint for that block to produce a first database XOR fingerprint, as illustrated in FIGS. 15-16. The first database XOR fingerprint for a block indicates records from that block that are present in the first database but absent in the second database, as illustrated in FIG. 17-18.

Figure 21:
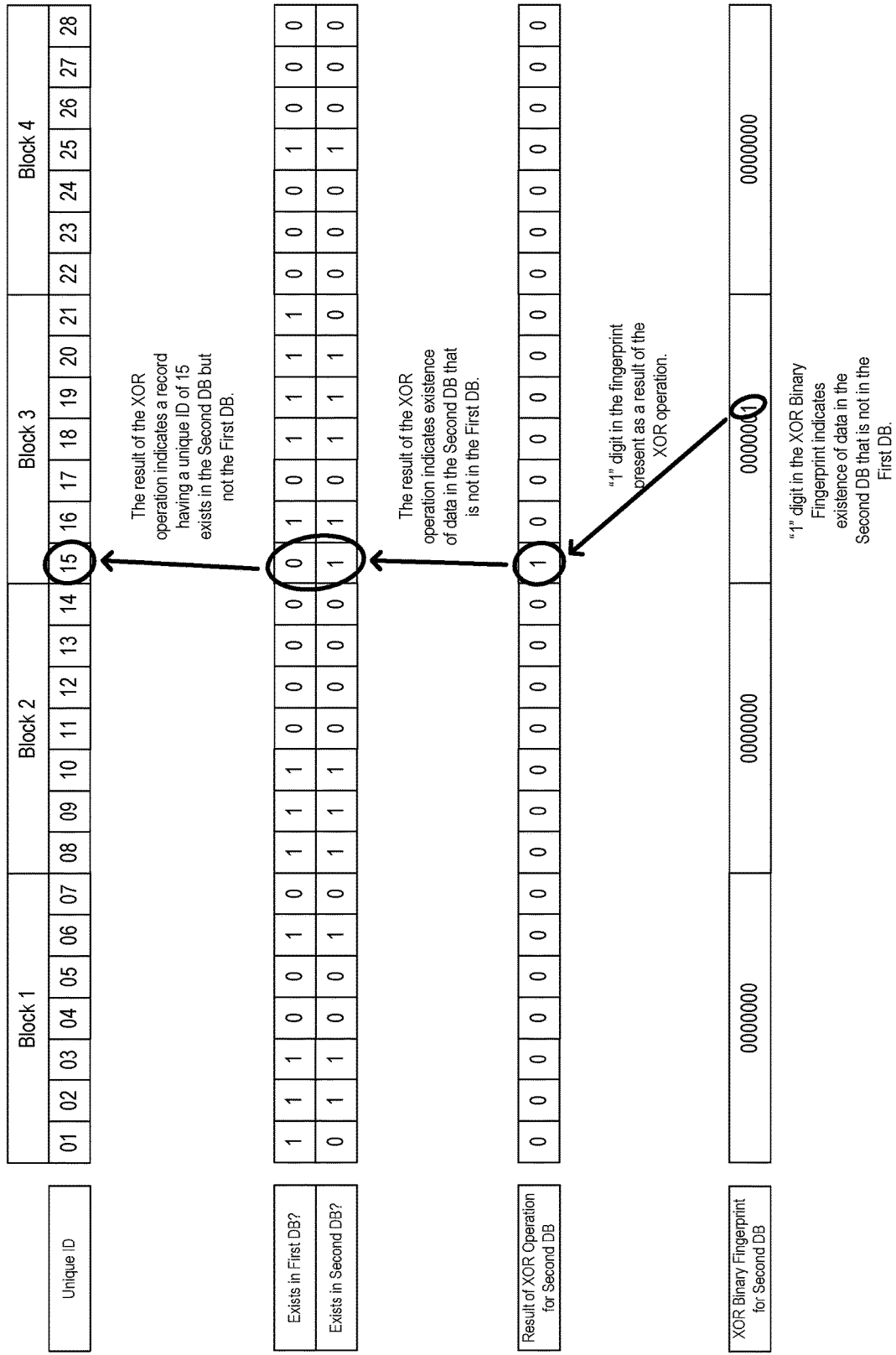
Figure 22:
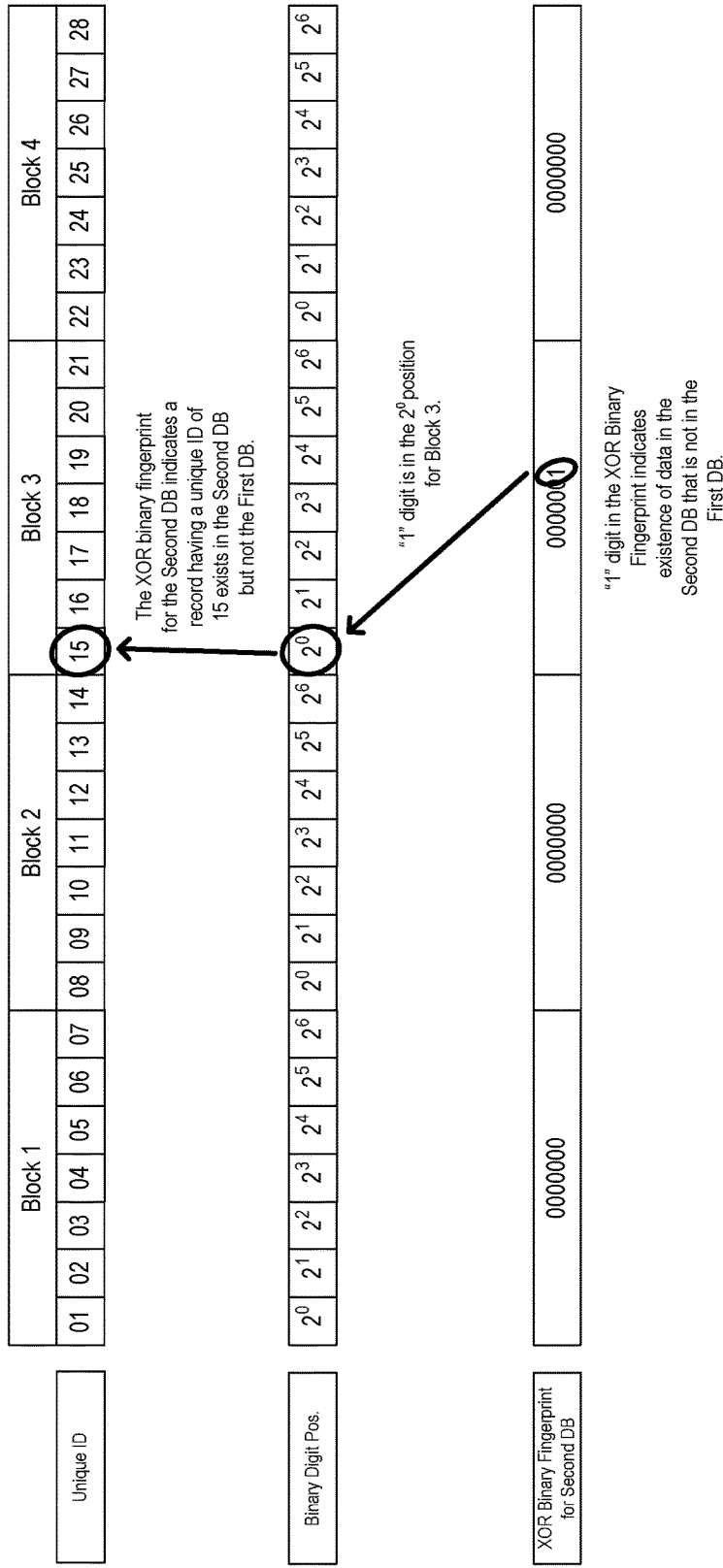

To determine records for a particular block present in the second database but absent in the first database (e.g. extra records), the AND fingerprint for that block is XORed against the second database's fingerprint for that block to produce a second database XOR fingerprint, as illustrated in FIGS. 19-20. The second database XOR fingerprint for a block indicates records from that block that are present in the second database but absent in the first database, as illustrated in FIGS. 21-22.

Figure 18:
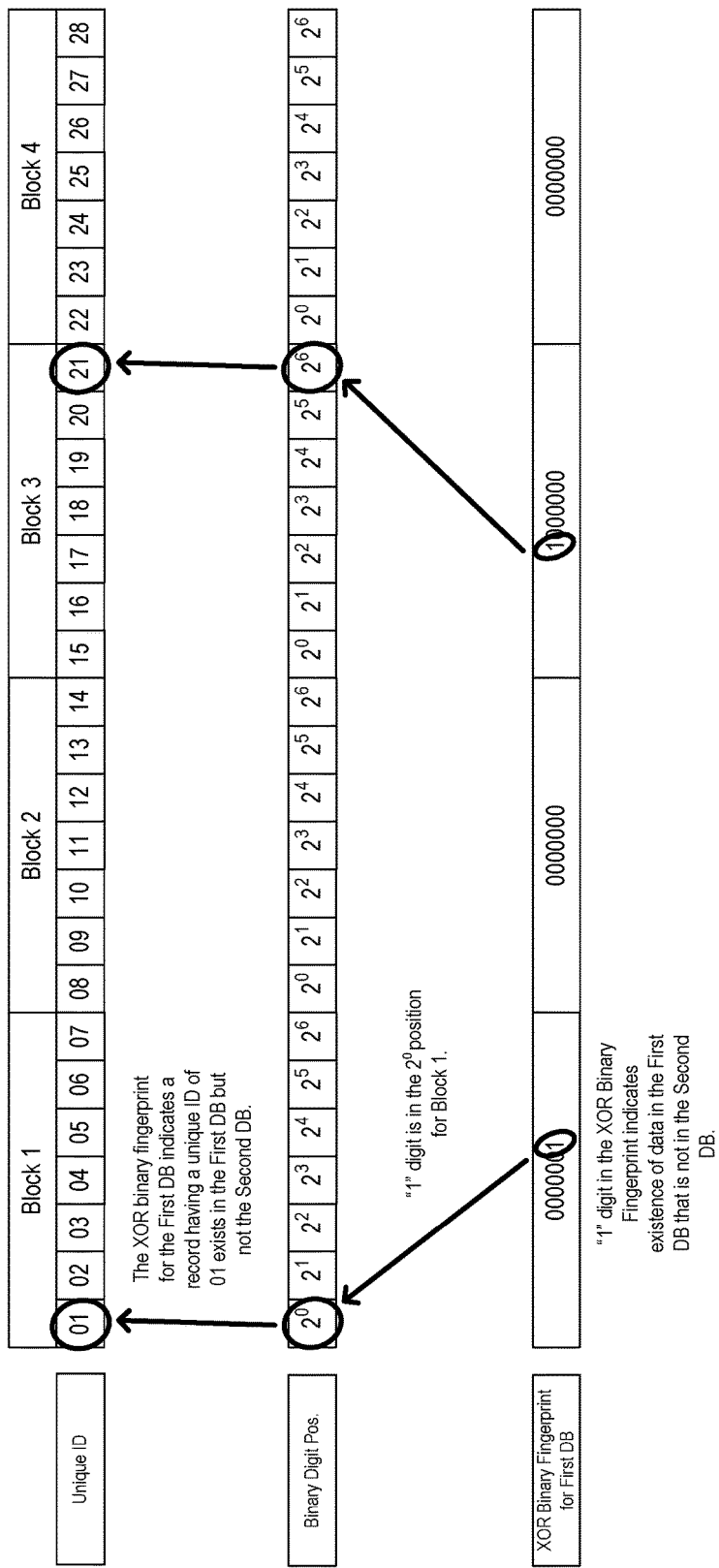
Figure 23:
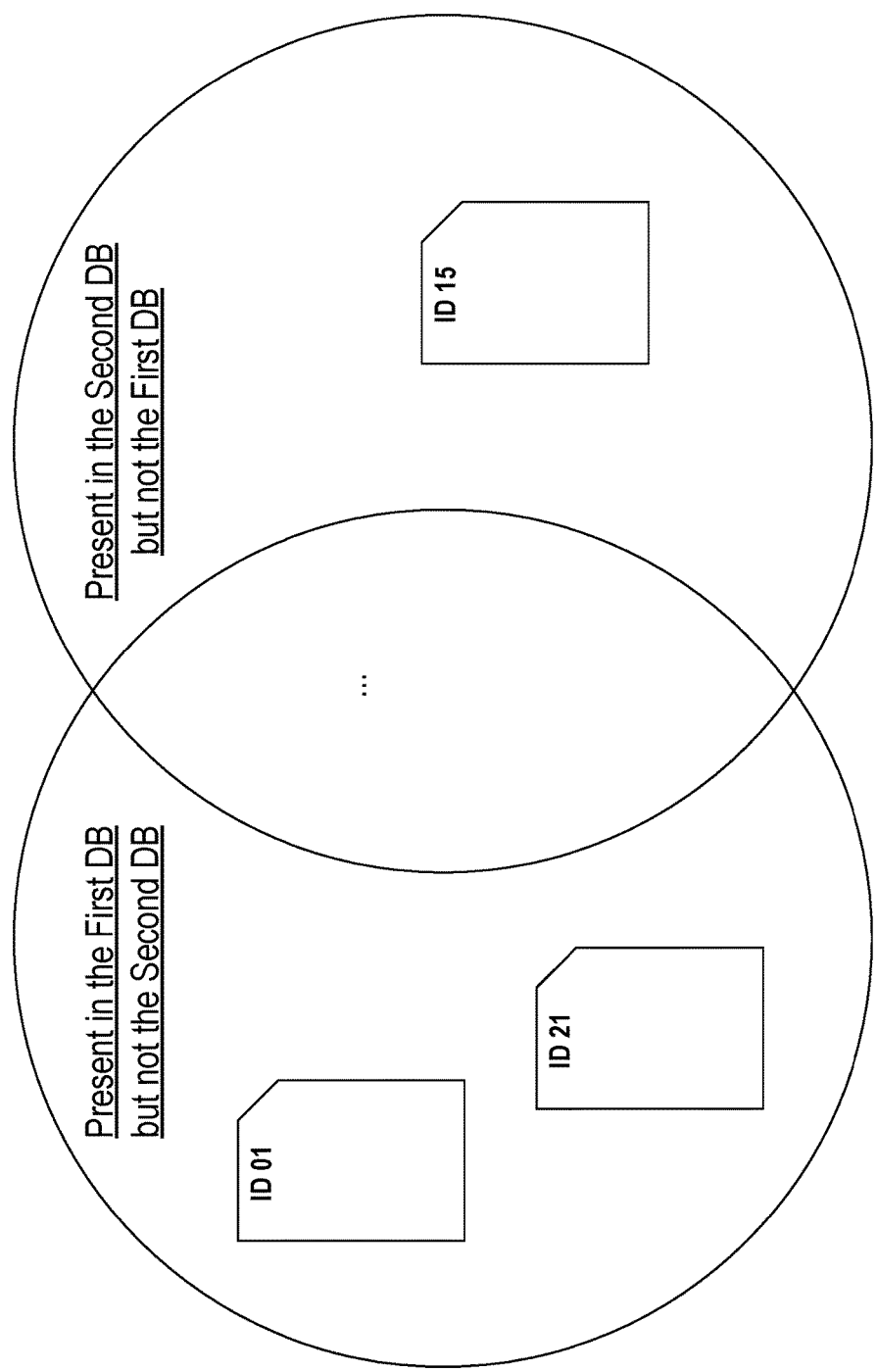
FIG. 23 illustrates determined differences between a first database and a second database.

As illustrated in FIG. 18, the first database XOR fingerprint indicates that a record having a unique ID of 01 is present in the first database but not the second database, and that a record having a unique ID of 15 is present in the first database but not the second database. Similarly, as illustrated in FIG. 22, the second database XOR fingerprint indicates that a record having a unique ID of 15 is present in the second database but not the first database. FIG. 23 illustrates these differences.

In accordance with one or more preferred implementations, these determined differences can be saved for later review, utilized programmatically, and/or presented to a user. For example, FIG. 24 illustrates exemplary tables listing the unique IDs of records found in the first database but not the second database, and records found in the second database but not the first database. The illustrated tables further include a column providing an identification of a block a listed record is part of, as well as columns providing fingerprints that were utilized to determine records present in one database but not the other. Although the fingerprints are displayed in binary notation in the tables of FIG. 24, it will be appreciated that they could alternatively or additionally be displayed in another notation, such as decimal notation as illustrated in FIG. 25, or hexadecimal notation or some other notation.

In accordance with one or more preferred implementations, exemplary methodologies described herein are utilized to compare a source database with a destination database. FIG. 25 illustrates reformatting of the table of FIG. 24 to recast the displayed information in this light. The upper table lists records that are missing from the destination database, while the lower table lists "extra" records that are present in the destination database but not the source database. In accordance with one or more preferred implementations, this information is utilized to determine that records 01 and 21 need to be transferred from the source database to the destination database, and that record 15 needs to be deleted from the destination database. In accordance with one or more preferred implementations, this occurs as part of an automatic update process.

It will be appreciated that, in some scenarios, it may be desirable to know more than whether a record having a particular unique ID exists in a particular database. For example, although in some scenarios records may be merely created once and never updated, in many scenarios and environments, records may be updated after being created. In scenarios in which records may be updated, comparing the existence of a record in two databases doesn't address the question of whether the two databases have the same version of the record, e.g. it doesn't tell you whether a record in a destination database is the most recently updated version that is present in a source database.

In accordance with one or more preferred implementations, a similar bitwise methodology as that described above for determining the existence of records can be utilized to determine the timeliness of records.

For example, a fingerprint can be constructed for a block of a database indicating whether each record in the block was updated during a particular time interval (e.g. a particular hour, day, week, month, year, etc.), which may be characterized as a temporal segment.

Expanding the simple databases discussed hereinabove to include additional records and blocks, as illustrated in FIG. 26, a first fingerprint is constructed for block 5 of the first database indicating whether each record in the block was updated on Jan. 30, 2016. Similarly, a second fingerprint is constructed for block 5 of the second database indicating whether each record in the block was updated on Jan. 30, 2016, as illustrated in FIG. 27.

Figure 30:
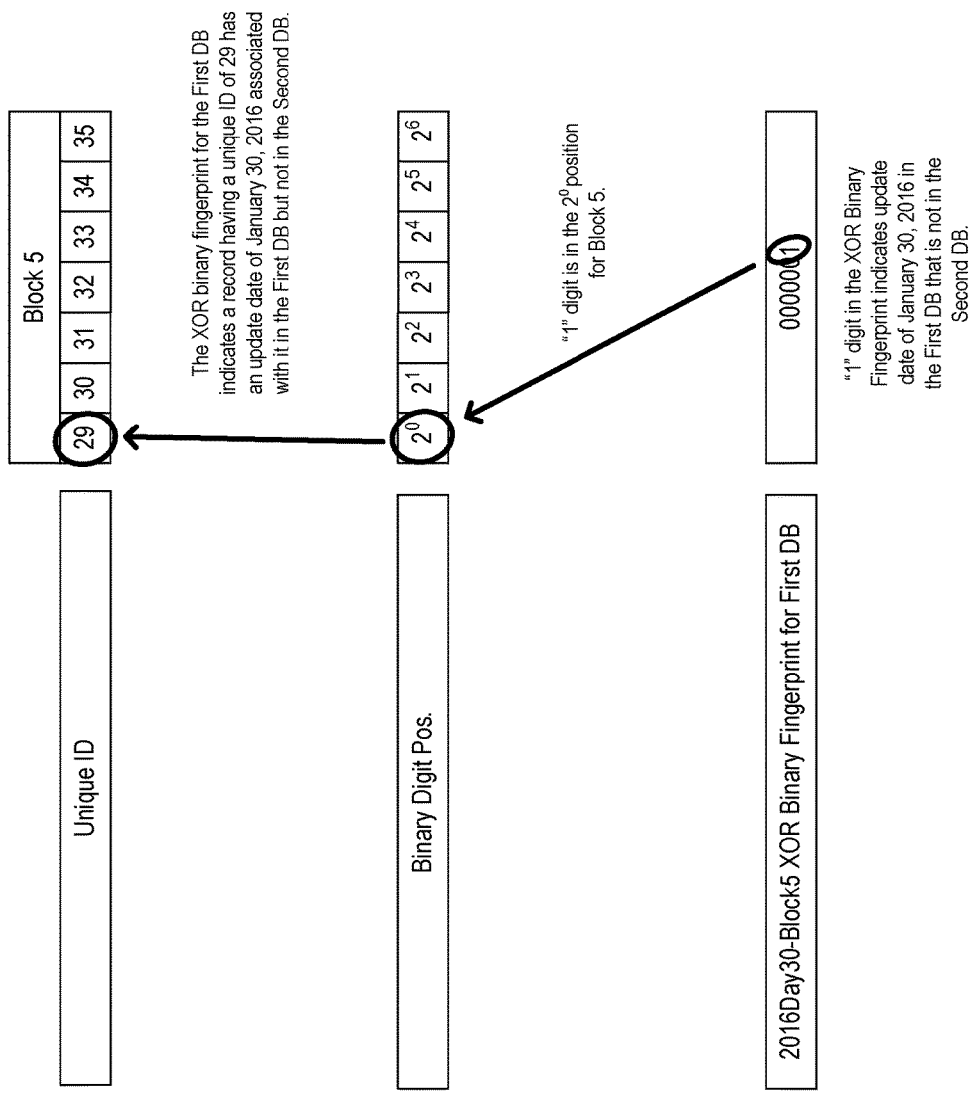

These first and second fingerprints are then ANDed together to produce an AND fingerprint, as illustrated in FIG. 28. The first fingerprint for the first database is then XORed against the AND fingerprint to produce a first database XOR fingerprint, as illustrated in FIG. 29. The first database XOR binary fingerprint indicates a record having a unique ID of 29 has an update date of Jan. 30, 2016 associated with it in the first database but not in the second database, as illustrated in FIG. 30.

The second fingerprint for the second database is similarly XORed against the AND fingerprint to produce a second database XOR fingerprint, as illustrated in FIG. 31. However, the absence of a "1" digit in the second database XOR fingerprint indicates that there are no records in block 5 having an update date of Jan. 30, 2016 in the second database but not in the first database.

In some scenarios, it is very useful to be able to ascertain whether there are any records that were updated in a first database but not a second database on a particular day (or updated to a particular update date or update version). Additionally, however, it may be desirable to know not just whether there are records in block 5 that were updated on day 30 of 2016 in the first database but not the second database, but additionally whether any records in block 5 were updated on another day or days in one database but not the other database.

It will be appreciated that these just discussed fingerprints are associated with block 5 and a temporal segment representing the day of Jan. 30, 2016. In accordance with one or more preferred implementations, these fingerprints can be characterized as being associated with a "2016Day30-

Block5" temporal block. That is, these fingerprints provide information about records in block 5 vis-à-vis day 30 of 2016 (Jan. 30, 2016).

In accordance with one or more preferred implementations, multiple temporal blocks are utilized to facilitate determination of whether records were updated during multiple different time intervals (e.g. different days).

For example, FIG. 32 illustrates the construction of fingerprints for multiple temporal blocks each corresponding to a particular day. Just as described and illustrated with respect to a "2016-Day30-Block5" temporal block, these fingerprints can be utilized to determine records that were updated on the corresponding day in one database but not the other.

As discussed hereinabove, other time intervals may be utilized. For example, FIG. 33 illustrates the construction of fingerprints for multiple temporal blocks each corresponding to a particular month. Just as described and illustrated with respect to a "2016-Day30-Block5" temporal block, these fingerprints can be utilized to determine records that were updated on the corresponding month in one database but not the other. Although this is useful in some scenarios, in some scenarios in which records are updated multiple times in a month, the use of static month-level temporal segmentation may not accurately discern whether update data really matches between two databases.

It will be appreciated that more fine-grained temporal segmentation could be utilized, and fingerprints could be constructed for every day of a particular year (e.g. 2015), and these fingerprints could be utilized to determine records that were updated on any given day in the year in one database but not the other. However, this might require generation of fingerprints, and calculations, for three hundred and sixty five different temporal blocks for each block of data. Even if days not identified as an update date were not included as a temporal block, substantial resources (e.g. processing and network resources) may still be required. For some scenarios, this may still be desirable, or unavoidable.

For some scenarios, however, data updates to a particular block may be sparse, and month-level temporal segmentation, or even more course-grained temporal segmentation, might generally be sufficient, and result in a savings of resources.

Thus, although it is possible to try to select a temporal segmentation level based on the needs, requirements, or characteristics of an environment or scenario, many environments and scenarios make it difficult to select an appropriate temporal segmentation level, with a coarse-grained segmentation level risking failing to identify potential discrepancies in record versions or update data, and a fine-grained segmentation level requiring more resources.

For example, FIG. 34 illustrates update dates for records in block 10 of the first database and the second database. As illustrated in FIG. 34, using day-level temporal segmentation would require the use of eleven different temporal blocks just for the seven records in block 10. Using month-level temporal segmentation would only require the use of two temporal blocks, but would not be helpful for discerning that the first database includes an update date of Feb. 11, 2015 for record 67 that is not included in the second database.

In some scenarios, it may be that all that needs to be determined is whether a record in a database has the same last update date as the same record in another database, e.g. because the entirety of a record is provided during each update operation. In such a scenario, the example of FIG. 34 gets slightly better for day-level temporal segmentation, but even worse for month level segmentation, as illustrated in FIG. 35. Still, it is difficult to select an appropriate temporal segmentation level, with a coarse-grained segmentation level risking failing to identify potential discrepancies in record versions or update data, and a fine-grained segmentation level requiring more resources In accordance with one or more preferred implementations, dynamic temporal segmentation is utilized to facilitate determinations regarding the timeliness of records.

In accordance with one or more preferred implementations, dynamic temporal segmentation is utilized to determine the minimum necessary temporal segmentation level for a dynamic temporal segmentation last update date for a record that still ensures that the dynamic temporal segmentation last update date is uniquely identified. For example, if a record was updated on Jan. 7, 2015 and Jan. 9, 2015, month-level temporal segmentation would not be sufficient to ensure that the last update date is uniquely identified. Similarly, week-level temporal segmentation would also not be sufficient to ensure that the last update date is uniquely identified. In this example, day-level temporal segmentation would be necessary to ensure that the last update date is uniquely identified.

Figure 39:
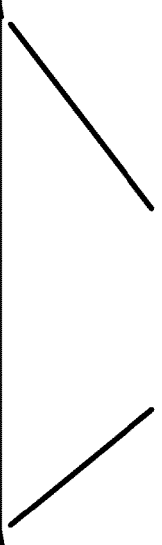

FIG. 36 illustrates update dates for records in block 7 of the first database. To facilitate explanation of dynamic temporal segmentation, FIG. 37 maps some of these update dates onto a simple calendar. As illustrated in FIG. 38, because there exist updates to record 43 on both Jan. 7, 2015 and Jan. 9, 2015, the most recent update cannot be uniquely described by the year "2015Y", the quarter "2015Q1", the month "2015M1", or the week "2015W2", thus requiring a last update date of "2015D9" to uniquely identify the last update to record 43. On the other hand, as illustrated in FIG. 39, although there exist multiple updates to record 44 in January of 2015, the most recent update is the only update in week 4 of 2015, thus allowing for use of a last update date of "2015W4" to uniquely identify the last update to record 44. As illustrated in FIG. 40, although there exist multiple updates to record 45 in Q1 of 2015, the most recent update is the only update in February of 2015, thus allowing for use of a last update date of "2015M2" to uniquely identify the last update to record 45.

Figure 41:
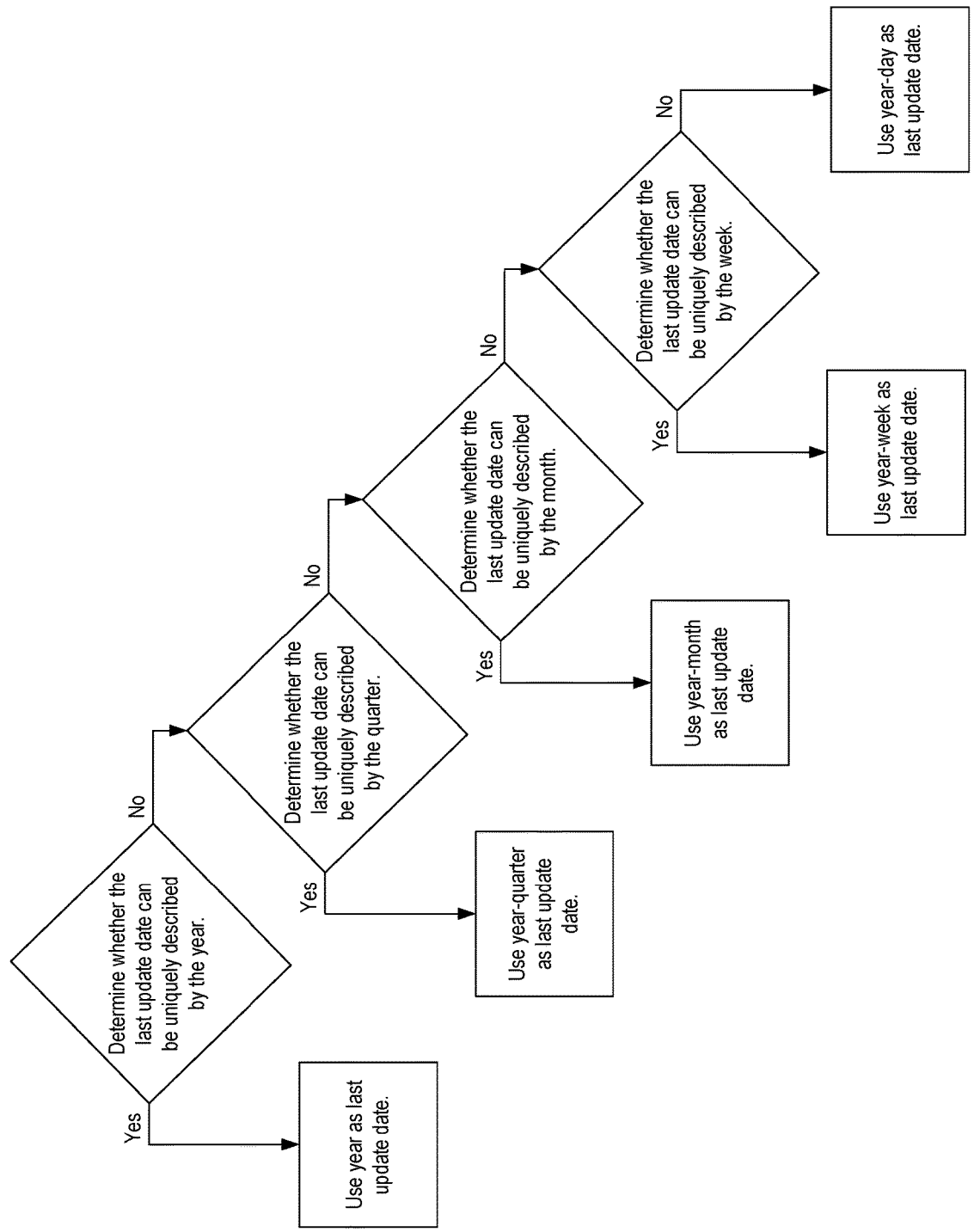
FIGS. 41-42 illustrate flows for selecting a minimum necessary temporal segmentation level.
Figure 42:
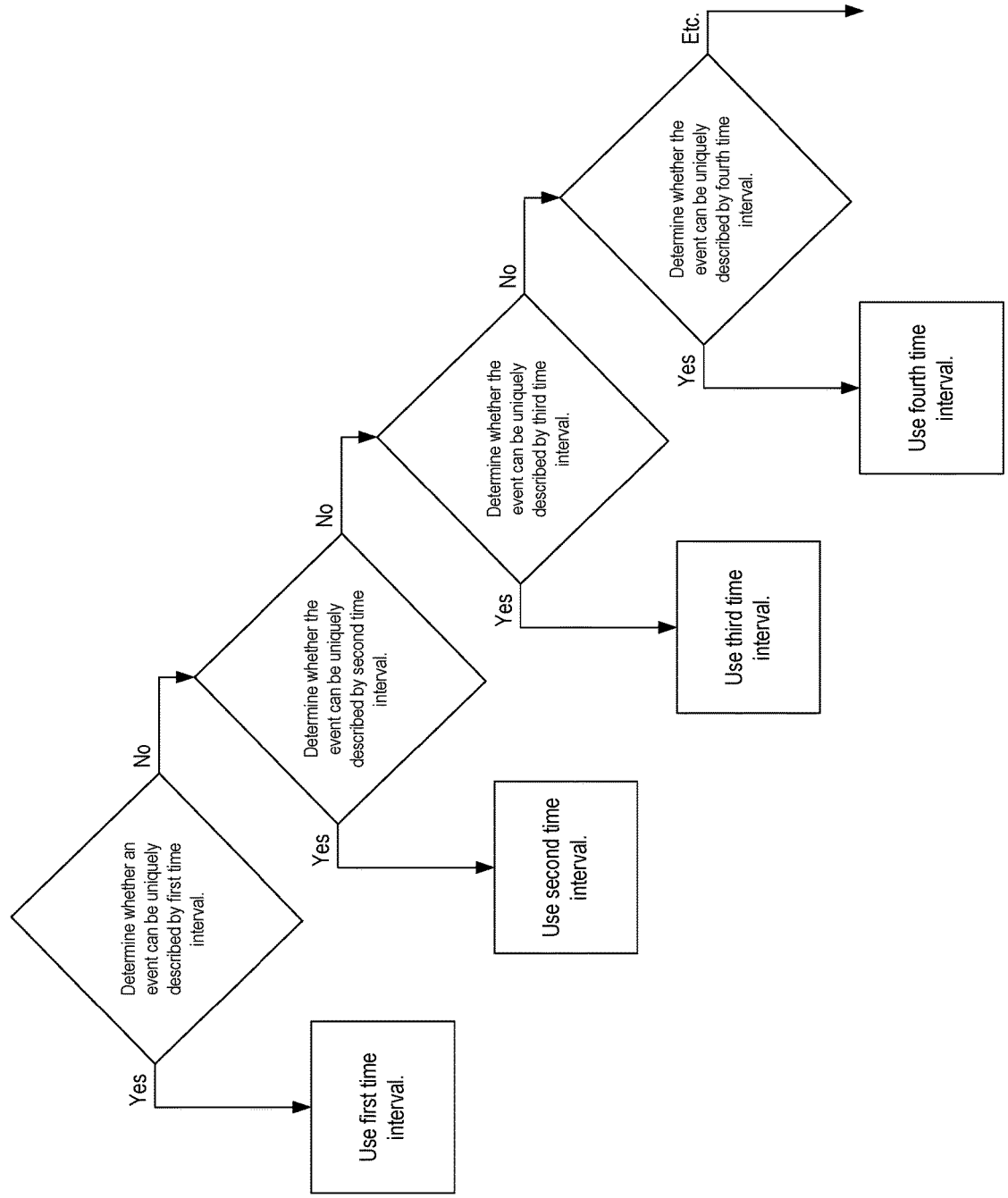

FIG. 41 illustrates a general flow for selecting a minimum necessary temporal segmentation level. It will be appreciated that although the examples herein utilize certain temporal segments, other temporal segments may equally be utilized, as illustrated by the exemplary generic flow of FIG. 42. This may even include temporal segments more fine-grained (i.e. more granular) than a day and temporal segments more coarse-grained (i.e. less granular) than a year. Further, any number of temporal segments having any amount of overlap may be utilized.

Figure 37:
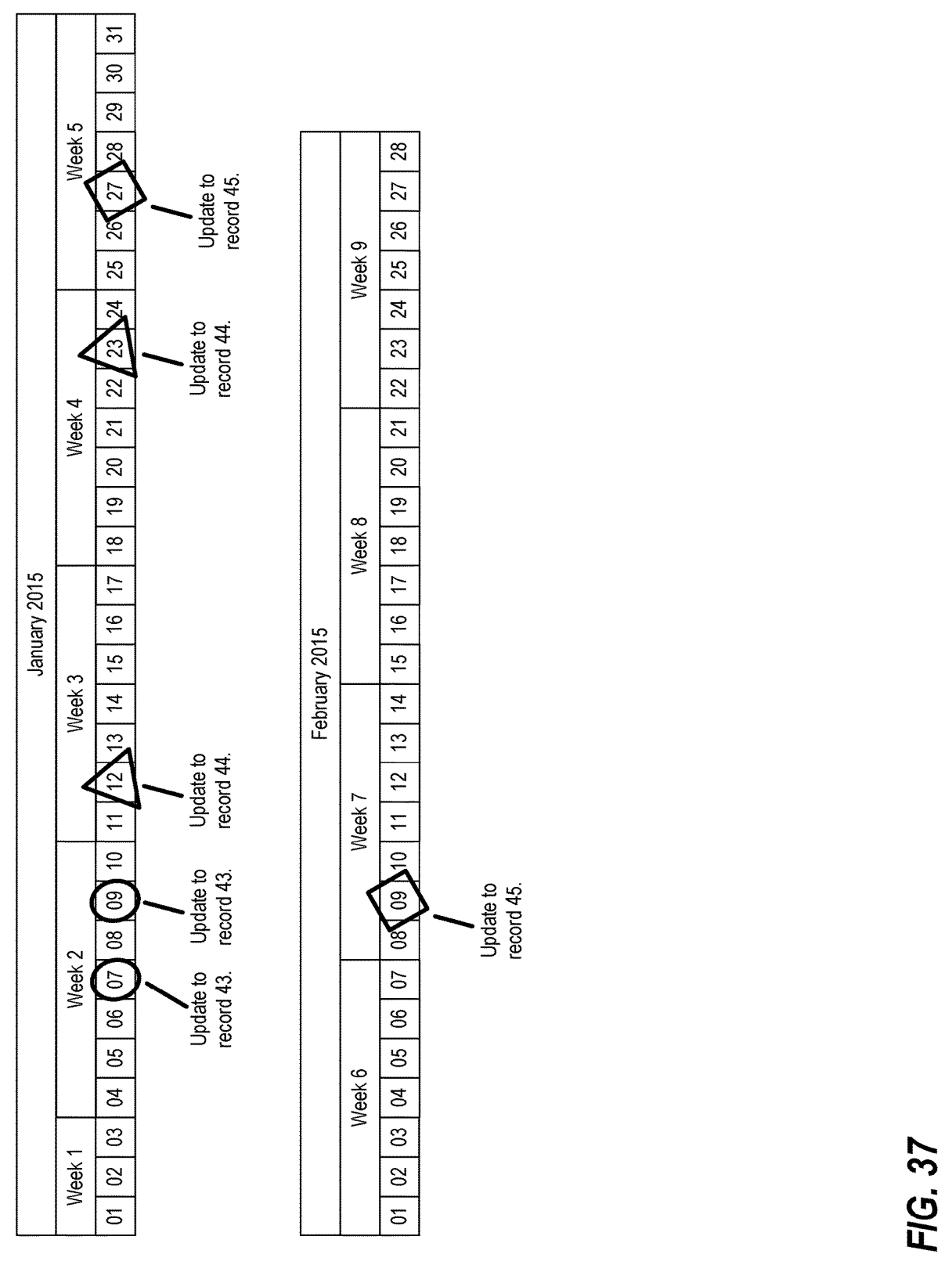

FIG. 37 mapped some of the update dates of FIG. 36 onto a simple calendar, and FIGS. 38-40 illustrated determination of a dynamic temporal segmentation update date for these mapped update dates. FIG. 43 illustrates determined dynamic temporal segmentation last update dates for each record in block 7 of the first database.

Notably, in accordance with one or more preferred implementations, when a record is updated to have a new last update date, all that is needed to calculate a minimum necessary temporal segmentation level is the update date of the preceding update. For example, although three update dates are known for record 46, only the two most recent are needed to calculate a dynamic temporal segmentation last update date, as illustrated in FIG. 44.

In accordance with one or more preferred implementations, a dynamic temporal segmentation last update date is calculated when a new update for a record is received. In accordance with one or more preferred implementations, a dynamic temporal segmentation last update date for a record is calculated as part of a process for generating fingerprints for one or more temporal blocks.

Returning to the example of FIG. 43, each of the unique determined dynamic temporal segmentation last update date values can be utilized to generate a corresponding temporal block for block 7. For example, this would include a first temporal block for block 7 corresponding to day 9 of 2015, which can be identified as "2015D9-Block7". FIGS. 45-46 illustrate each of the temporal blocks generated for block 7 based on a unique determined dynamic temporal segmentation last update date value.

Figure 48:
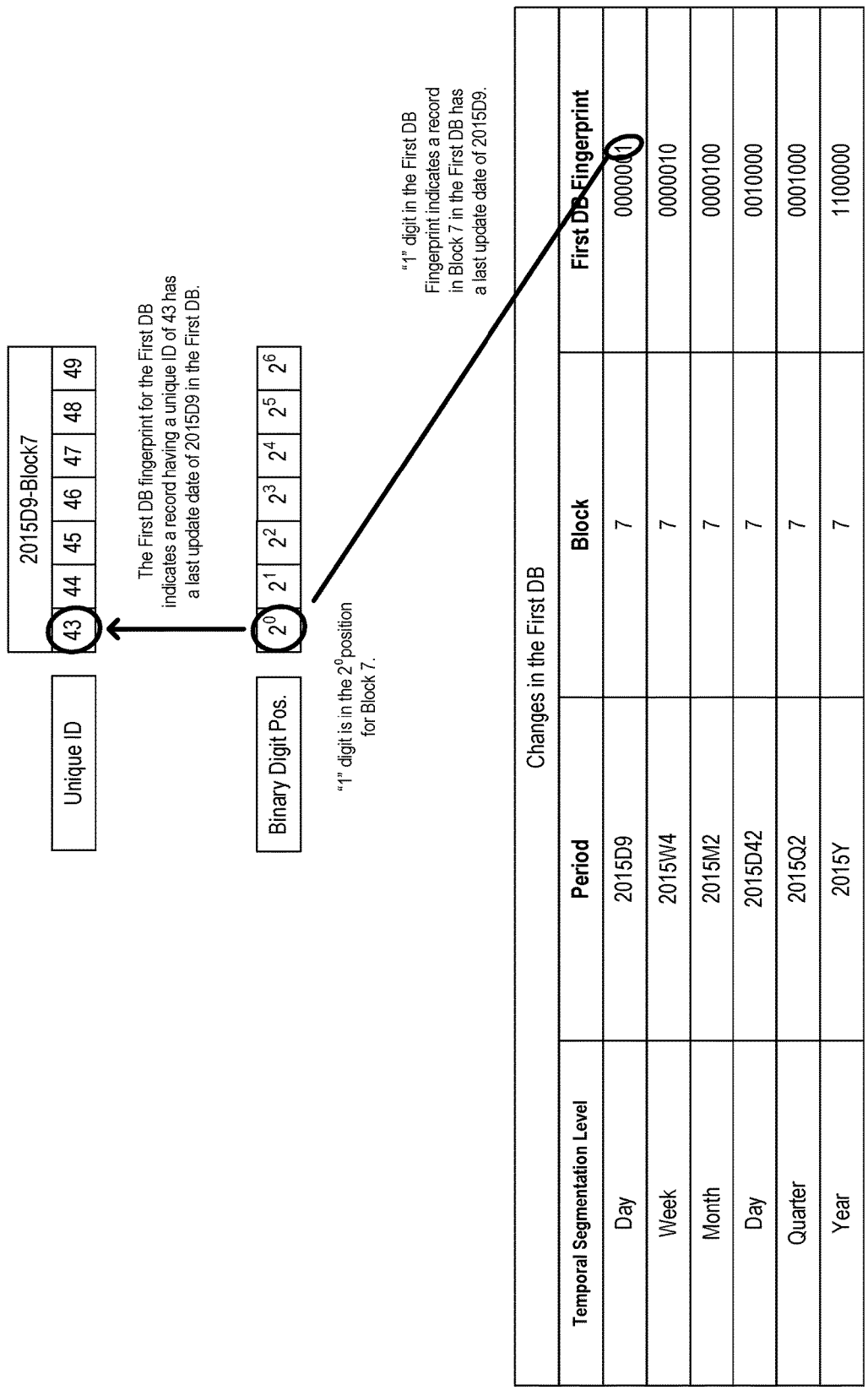
FIG. 48 illustrates how a fingerprint indicates that, and can be used to determine that, a record having a particular unique ID has a particular last update date in the first database.

FIGS. 45-46 further illustrate the construction of a first database fingerprint for each of the temporal blocks. The fingerprint for a temporal block captures information regarding, and can be utilized to determine, whether a record in the block has a dynamic temporal segmentation last update date matching the dynamic temporal segment corresponding to the temporal block. For example, FIG. 47 illustrates a table listing changes in the first database. As illustrated, the first database fingerprint in the row of the table corresponding to the period "2015D9" indicates records that were changed on day 9 of 2015. This fingerprint indicates that, and can be used to determine that, a record having a unique ID of 43 has a last update date of 2015D9 in the first database, as illustrated in FIG. 48.

FIG. 49 illustrates update dates for records in block 7 of the second database. FIG. 49 further illustrates determined dynamic temporal segmentation last update dates for each record in block 7 of the second database.

As with the first database, each of the unique determined dynamic temporal segmentation last update date values can be utilized to generate a corresponding temporal block for block 7.

FIGS. 50-51 illustrate each of the temporal blocks generated for block 7 based on a unique determined dynamic temporal segmentation last update date value for the first or second database. FIGS. 50-51 further illustrate the construction of a first database fingerprint for each of the temporal blocks and a second database fingerprint for each of the temporal blocks. Although for purposes of clarity a fingerprint is included in the illustration for each database for each temporal block, in accordance with one or more preferred implementations a fingerprint for a particular temporal block for a particular database will only be generated if that database has a record in the block having a dynamic temporal segmentation last update date corresponding to the temporal block. In such implementations, a null value may be utilized. In such implementations, calculations may be made for null values utilizing a value of all zeroes.

Similar to the methodologies described hereinabove, the generated fingerprints may be utilized to compare the timeliness of records in the first and second databases.

For each temporal block, the first database fingerprint for the temporal block and the second database fingerprint for the temporal block are ANDed together to produce an AND fingerprint for the temporal block, as illustrated in FIG. 52. For each temporal block, the first database fingerprint for the temporal block is then XORed against the AND fingerprint to produce a first database XOR fingerprint for the temporal block, as illustrated in FIG. 52. Likewise, for each temporal block, the second database fingerprint for the temporal block is XORed against the AND fingerprint to produce a second database XOR fingerprint for the temporal block, as illustrated in FIG. 52.

The first database XOR fingerprint for a respective temporal block indicates, for each record in the associated block, whether that record in the first database has a dynamic temporal update date corresponding to that respective temporal block while the same record in the second database does not.

Figure 53:
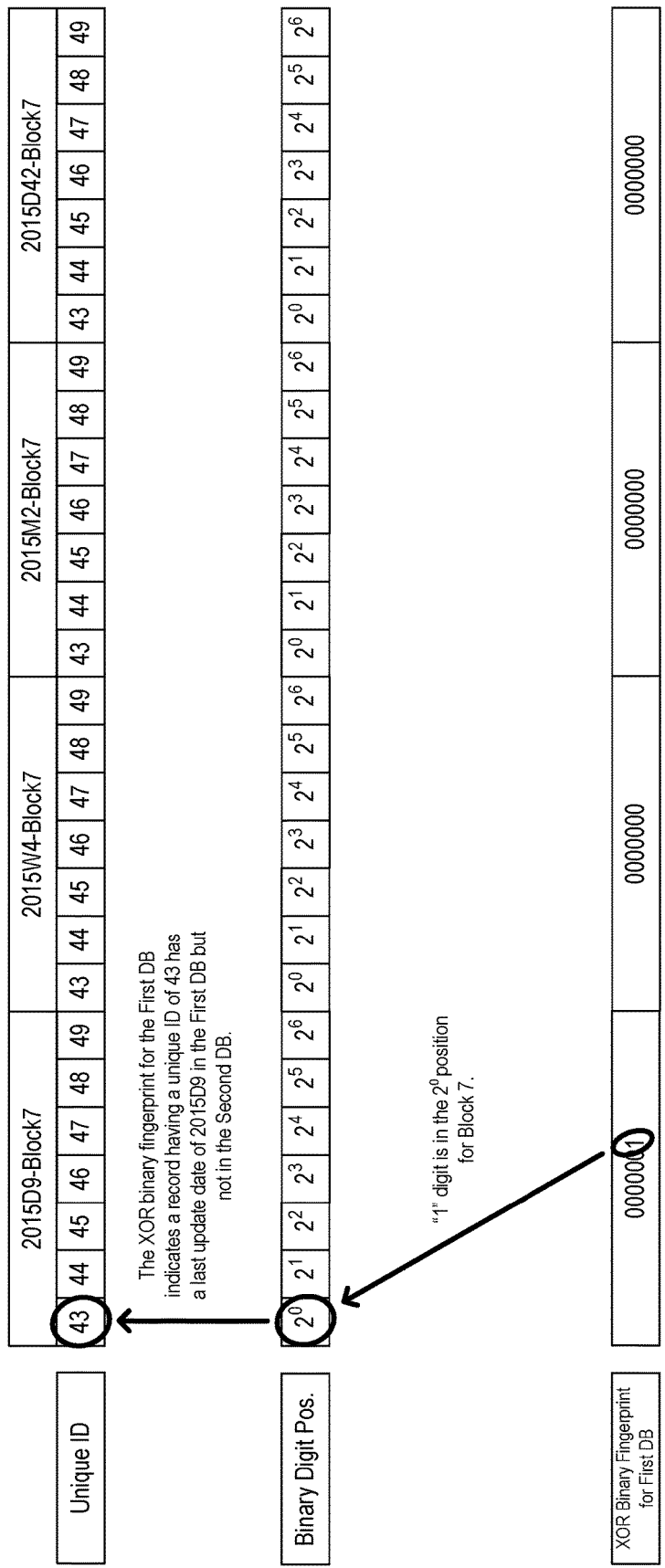
Figure 54:
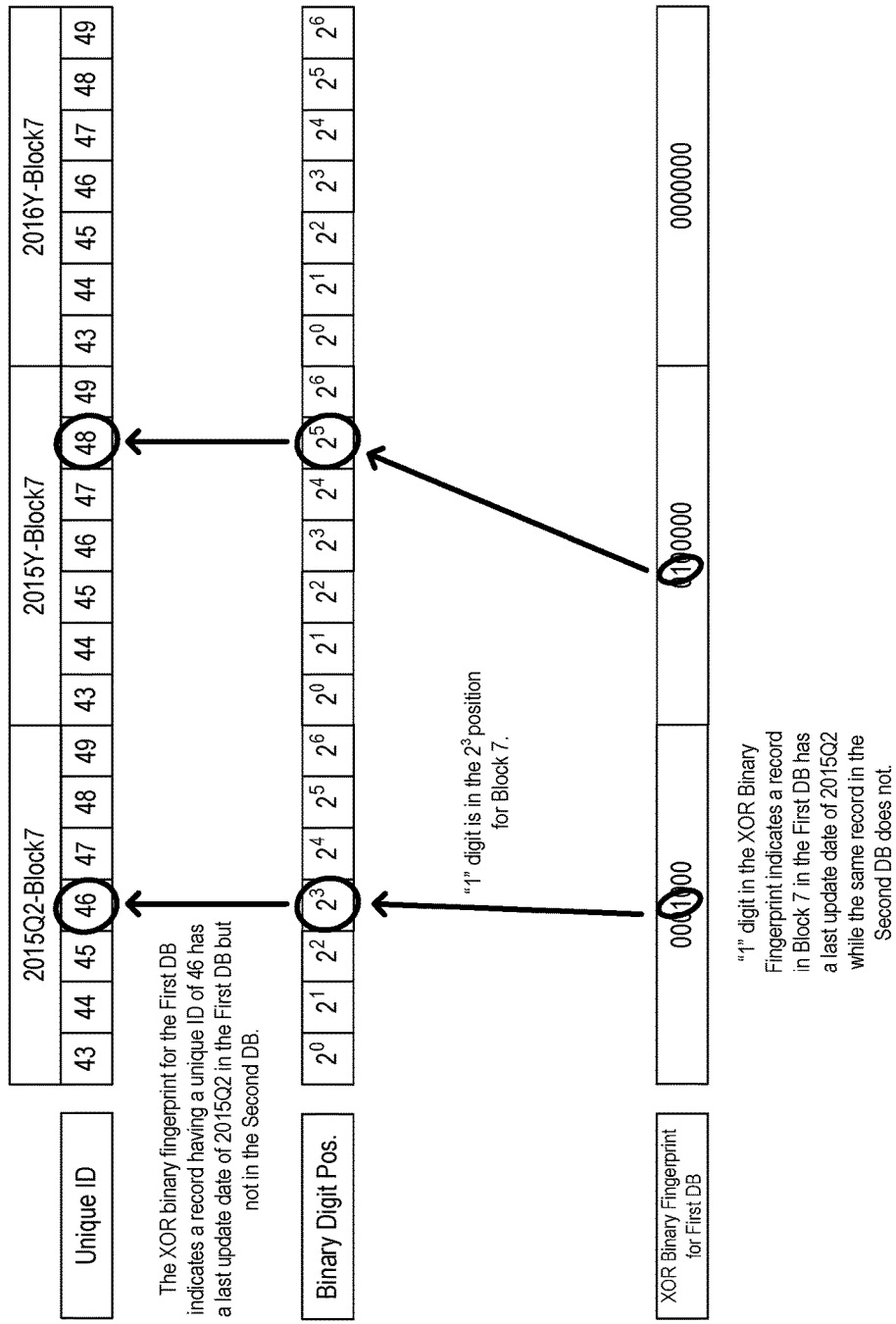

For example, as illustrated in FIG. 53, the first database XOR fingerprint for the "2015D9-Block7" temporal block indicates that a record having a unique ID of 43 has a last update date of "2015D9" in the first database but not in the second database, and as illustrated in FIG. 54, the first database XOR fingerprint for the "2015Q2-Block7" temporal block indicates that a record having a unique ID of 46 has a last update date of "2015Q2" in the first database but not in the second database.

Similarly, the second database XOR fingerprint for a respective temporal block indicates, for each record in the associated block, whether that record in the second database has a dynamic temporal update date corresponding to that respective temporal block while the same record in the first database does not.

Figure 55:
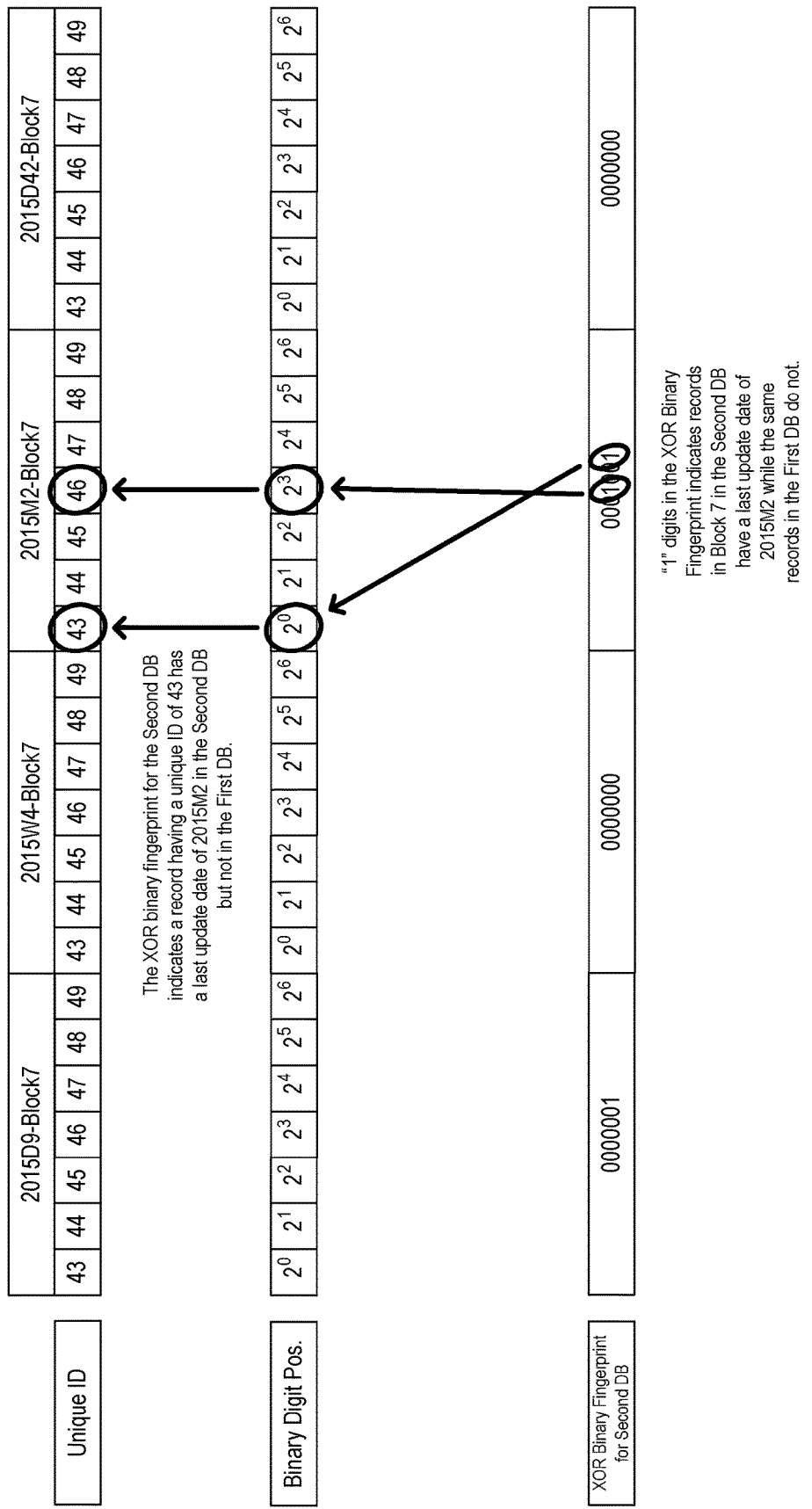
Figure 56:
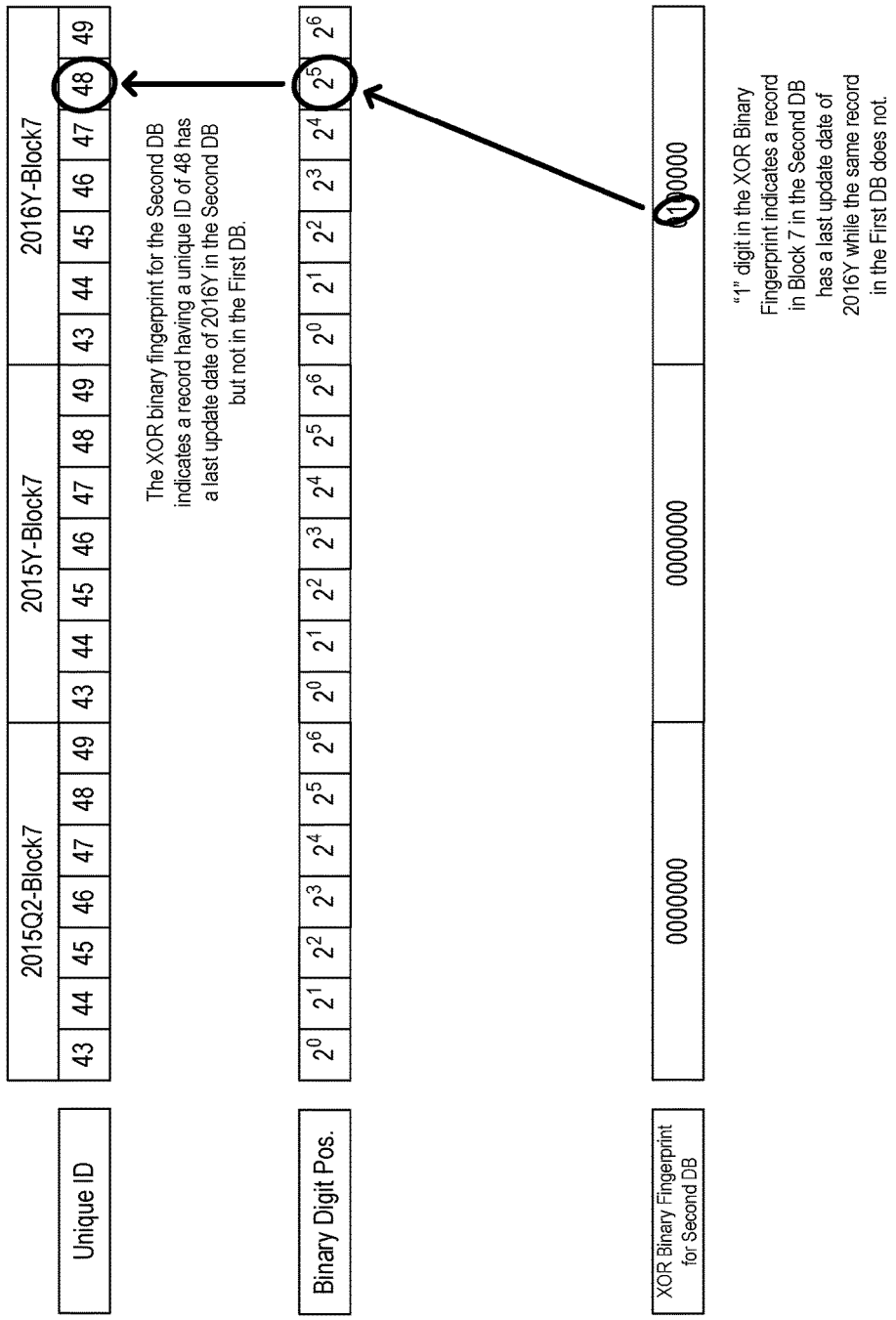

For example, as illustrated in FIG. 55, the second database XOR fingerprint for the "2015M2-Block7" temporal block indicates that a record having a unique ID of 43 has a last update date of "2015M2" in the second database but not in the first database, and as illustrated in FIG. 56, the second database XOR fingerprint for the "2016Y-Block7" temporal block indicates that a record having a unique ID of 48 has a last update date of "2016Y" in the second database but not in the first database.

Thus, determined fingerprints can be utilized to compare the timeliness of the same records in different databases. In accordance with one or more preferred implementations, determined differences can be saved for later review, utilized programmatically, and/or presented to a user.

FIG. 57 illustrates exemplary tables illustrating records determined to have different update information in the first and second databases. The lowermost table lists the unique ID of each record found to not have the same dynamic temporal segmentation last update date in both databases, thus indicating that there is a difference in update data. This table illustrates that, for each of these records, it is possible to compare the dynamic temporal segmentation last update dates to determine whether the first or second table has a more recent update date, and further illustrates the determination for each of these records. For example, it is determined that the first database has a more recent last update date for record 43 than the second database, e.g. indicating that an updated record 43 needs to be transferred to the second database.

Returning now to the example of FIG. 35, FIG. 58 supplements the information in FIG. 35 with a listing of required temporal blocks for dynamic temporal segmentation. Notably, whereas a static day-level temporal segmentation would require seven temporal blocks, the illustrated implementation utilizing dynamic temporal segmentation only requires four, but still allows for differentiation that would be missed by a static month-level temporal segmentation.

FIG. 59 illustrates the construction of a first database fingerprint and a second database fingerprint for each of the temporal blocks. Similar to the methodologies described hereinabove, the generated fingerprints may be utilized to compare the timeliness of records in the first and second databases.

For each temporal block, the first database fingerprint for the temporal block and the second database fingerprint for the temporal block are ANDed together to produce an AND fingerprint for the temporal block, as illustrated in FIG. 60. For each temporal block, the first database fingerprint for the temporal block is then XORed against the AND fingerprint to produce a first database XOR fingerprint for the temporal block, as illustrated in FIG. 60. Likewise, for each temporal block, the second database fingerprint for the temporal block is XORed against the AND fingerprint to produce a second database XOR fingerprint for the temporal block, as illustrated in FIG. 60.

The first database XOR fingerprint for a respective temporal block indicates, for each record in the associated block, whether that record in the first database has a dynamic temporal update date corresponding to that respective temporal block while the same record in the second database does not.

Figure 61:
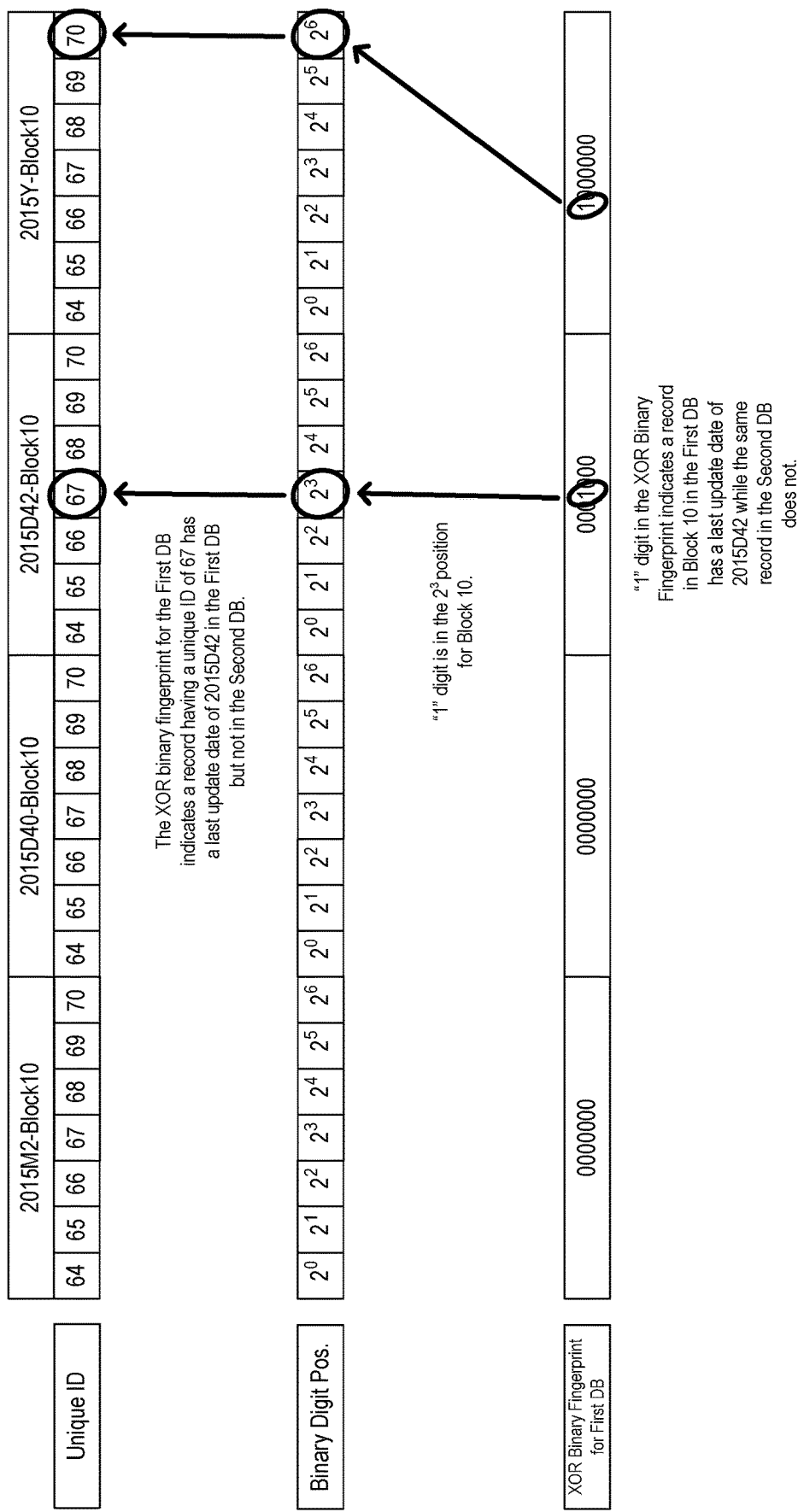

For example, as illustrated in FIG. 61, the first database XOR fingerprint for the "2015D42-Block10" temporal block indicates that a record having a unique ID of 67 has a last update date of "2015D42" in the first database but not in the second database.

Similarly, the second database XOR fingerprint for a respective temporal block indicates, for each record in the associated block, whether that record in the second database has a dynamic temporal update date corresponding to that respective temporal block while the same record in the first database does not.

Figure 62:
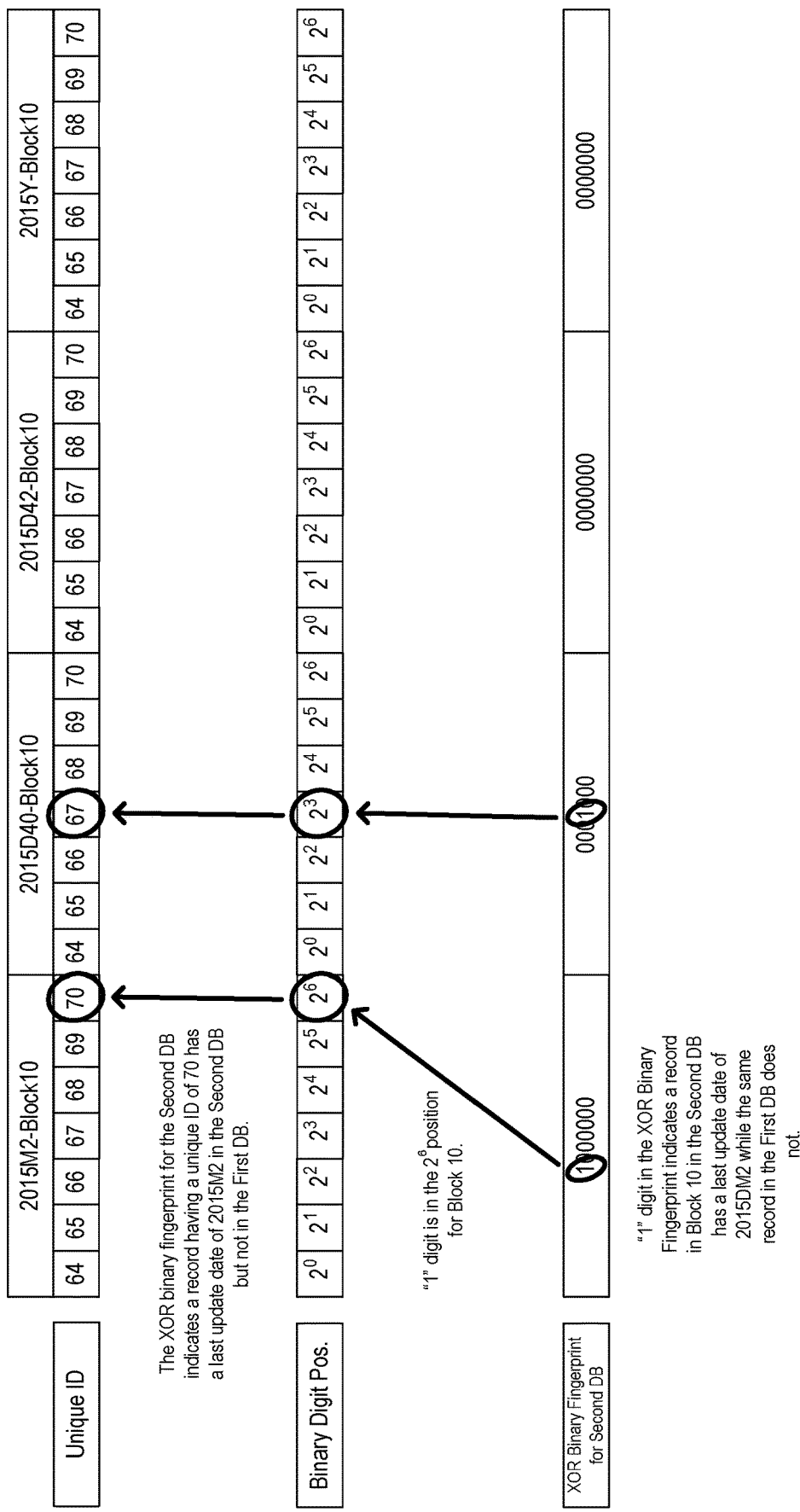

For example, as illustrated in FIG. 62, the second database XOR fingerprint for the "2015M2-Block7" temporal block indicates that a record having a unique ID of 70 has a last update date of "2015M2" in the second database but not in the first database.

Thus, determined fingerprints can be utilized to compare the timeliness of the same records in different databases. In accordance with one or more preferred implementations, determined differences can be saved for later review, utilized programmatically, and/or presented to a user.

FIG. 63 illustrates exemplary tables listing records determined to have different update information in the first and second databases. The lowermost table lists the unique ID of each record found to not have the same dynamic temporal segmentation last update date in both databases, thus indicating that there is a difference in update data.

This table illustrates that, for one of these records, it is possible to compare the dynamic temporal segmentation last update dates to determine whether the first or second table has a more recent update date, and further illustrates the determination for each of these records. For example, it is determined that the first database has a more recent last update date for record 67 than the second database, e.g. indicating that an updated record 67 needs to be transferred to the second database.

This table further illustrates that, for one of these records, it is not possible to compare the dynamic temporal segmentation last update dates to determine whether the first or second table has a more recent update date. In this case, the methodology has flagged that different update data exists for the two databases, but it is unable to determine which is more recent. In accordance with one or more preferred implementations, a listing of records needing further review may be generated. In accordance with one or more preferred implementations, a system may be configured to automatically request update date data for the record from one or both databases to determine which copy of the record has a more recent update.

Although the tables of FIG. 63 only display information for a single block, and although some methodologies described herein are for the sake of simplicity described with respect to a single block, it will be appreciated that one or more preferred implementations involve determinations related to existence or timeliness for a plurality of blocks. For example, FIGS. 64-65 illustrate exemplary tables listing records from multiple blocks determined to have different update information in the first and second databases.

Various methodologies in accordance with one or more preferred implementations are disclosed herein in the context of relatively simplistic examples. These relatively simplistic examples are intended to illustrate innovative methodologies in accordance with one or more preferred implementations that are useful with larger data sets to reduce utilization of network and processing resources.

For example, returning to the exemplary system including a CDW database 12 having records that need to be periodically synchronized into a CPM database 14, in order to facilitate determination of what records are missing and extra in the CPM database 14 as compared to the CDW database 12, each database can be divided into a plurality of blocks, and a bitwise fingerprint can be constructed for each block.

In accordance with one or more preferred implementations, each of these blocks might represents 31 records, while in one or more other preferred implementations, each of these blocks might represent 63 records. It will be appreciated that a block can be defined to be any size, although certain sizes make more sense within the context of binary operations. In accordance with one or more preferred implementations, block size is selected to be (2^n−1), where n can be any number greater than 1.

As described hereinabove, an approach which utilizes a unique encounter ID field to reconcile records between the CDW database 12 and the CPM database 14 would typically involve building a set of encounter IDs 16 for the records contained in the CDW database 12 as illustrated in FIG. 4, and then communicating this set of encounter IDs for comparison to encounter IDs contained in the CPM database 14, as illustrated in FIG. 5. Comparing this set of encounter IDs for the CDW database 12 to encounter IDs contained in the CPM database 14 reveals encounter IDs missing from the CPM database 14, and extra encounter IDs in the CPM database 14, as illustrated in FIG. 6.

This approach, however, requires communication of the entire set of encounter IDs for the CDW database 12, which utilizes network resources, and further requires record by record comparison of two large sets of encounter IDs, which utilizes processing resources.

On the first point, this approach which involves storage of IDs raw might typically require 7,660 bytes per 620 IDs, with 1 billion rows adding up to 11.1 Gigabytes. In contrast to this, a methodology utilizing bitwise fingerprints (e.g. constructed datagrams) might only require 92 bytes per 620 IDs, with 1 billion rows only adding up to 0.13 Gigabytes. This represents an efficiency savings of around 80x. This potentially represents a valuable storage resource savings, but is especially valuable as a network resource savings.

On the second point, this approach which involves storage of IDs raw requires record by record comparison of two large sets of IDs, which utilizes processing resources. In accordance with one or more preferred implementations, a methodology utilizing bitwise fingerprints can take advantage of the efficiency of bitwise operations (e.g. bitwise operations in SQL) to achieve significant efficiency gains and significant reduction in resource usage.

As noted hereinabove, various methodologies in accordance with one or more preferred implementations are disclosed herein in the context of relatively simplistic examples, with these relatively simplistic examples intended to illustrate innovative methodologies in accordance with one or more preferred implementations that are useful with larger data sets to reduce utilization of network and processing resources.

Although specific description is provided with respect to implementation of innovative methodologies in the context of reconciling records between clinical medical databases, it will be appreciated that innovative methodologies disclosed herein are for use in many other contexts as well.

Although specific description is provided with respect to implementation of innovative methodologies in the context of reconciling records databases, it will be appreciated that innovative methodologies disclosed herein are for use in reconciling data between any two data sources or data sets. Methodologies disclosed herein are especially useful when the data sources are remote across one or more boundaries in time or space, e.g. at different offices, on different networks, on different continents, etc.

Although specific description is provided with respect to implementation of innovative methodologies in the context of databases having sequential numeric IDs, in accordance with one or more preferred implementations, records (e.g. records having unique alphanumeric keys or another type of key) may be mapped to a sequential numeric IDs for performance of methodologies disclosed herein. In accordance with one or more preferred implementations, numeric IDs may be offset based on the range of unique IDs utilized in a scenario. In accordance with one or more preferred implementations, unique numerical identifiers associated with blocks may be offset based on the range of unique IDs utilized in a scenario. In accordance with one or more preferred implementations, an addressing scheme or offset scheme is communicated from one data source to another data source for use in generating equivalent fingerprints.

Based on the foregoing description, it will be readily understood by those persons skilled in the art that the present invention is susceptible of broad utility and application. Many embodiments and adaptations of the present invention other than those specifically described herein, as well as many variations, modifications, and equivalent arrangements, will be apparent from or reasonably suggested by the present invention and the foregoing descriptions thereof, without departing from the substance or scope of the present invention. Accordingly, while the present invention has been described herein in detail in relation to one or more preferred embodiments, it is to be understood that this disclosure is only illustrative and exemplary of the present invention and is made merely for the purpose of providing a full and enabling disclosure of the invention. The foregoing disclosure is not intended to be construed to limit the present invention or otherwise exclude any such other embodiments, adaptations, variations, modifications or equivalent arrangements, the present invention being limited only by the claims appended hereto and the equivalents thereof.

What is claimed is:

1. A method for synchronizing records stored at a first data storage location with records stored at a second, remote data storage location utilizing bitwise fingerprints to reduce network resource usage and bitwise operations to reduce processing resource usage, the method comprising
   (a) for records in a first data set stored at a first data store that are each associated with a numerical ID unique to the first data set,
      (i) determining a block size representing a number of sequential numerical IDs which will be associated with a single block,
      (ii) defining a plurality of blocks based on the determined block size and the unique IDs of the records in the first data set, each block of the defined plurality of blocks being associated with a block identifier comprising a unique numerical block identifier, wherein the unique numerical block identifier for a block and the block size determine sequential numerical IDs associated with that block, and
      (iii) for each respective block of the defined plurality of blocks, generating a respective bitwise fingerprint for that respective block, each respective bit of the respective bitwise fingerprint indicating the existence or nonexistence of a record in the first data set having the unique ID associated with that respective bit;
   (b) for records in a second data set stored at a second data store that are each associated with a numerical ID unique to the second data set,
      (i) determining a block size representing a number of sequential numerical IDs which will be associated with a single block,
      (ii) defining a plurality of blocks based on the determined block size and the unique IDs of the records in the first data set, each block of the defined plurality of blocks being associated with a block identifier comprising a unique numerical block identifier, wherein the unique numerical block identifier for a block and the block size determine the sequential numerical IDs associated with that block, and
      (iii) for each respective block of the defined plurality of blocks, generating a respective bitwise fingerprint for that respective block, each respective bit of the respective bitwise fingerprint indicating the existence or nonexistence of a record in the second data set having the unique ID associated with that respective bit;
   (c) comparing the existence of records in the first and second data sets by performing bitwise operations on the generated bitwise fingerprints by, for each respective numerical block identifier associated with a block of the first data set and a block of the second data set,
      (i) determining, by performing an equality comparison between
         (A) the generated bitwise fingerprint for the block of the first data set corresponding to the respective numerical block identifier, and
         (B) the generated bitwise fingerprint for the block of the second data set corresponding to the respective numerical block identifier, whether the same records associated with the block corresponding to the respective numerical block identifier exist in both the first data set and the second data set,
      (ii) for cases where the generated bitwise fingerprint for the block of the first data set corresponding to the respective numerical block identifier and the generated bitwise fingerprint for the block of the second data set corresponding to the respective numerical identifier do not match,
         (A) generating an AND fingerprint corresponding to the respective numerical block identifier by performing an AND operation between
            (I) the generated bitwise fingerprint for the block of the first data set corresponding to the respective numerical block identifier, and (II) the generated bitwise fingerprint for the block of the second data set corresponding to the respective numerical block identifier, (B) determining records that exist in the first data set but not the second data set by generating a first data set XOR fingerprint for the block of the first data set corresponding to the respective numerical block identifier by performing an XOR operation between (I) the generated bitwise fingerprint for the block of the first data set corresponding to the respective numerical block identifier, and (II) the generated AND fingerprint corresponding to the respective numerical block identifier, (III) wherein each respective bit of the generated first data set XOR fingerprint indicates that a record having the unique ID associated with that respective bit exists in the first data set but not the second data set, and (C) determining records that exist in the second data set but not the first data set by generating a second data set XOR fingerprint for the block of the second data set corresponding to the respective numerical block identifier by performing an XOR operation between (I) the generated bitwise fingerprint for the block of the second data set corresponding to the respective numerical block identifier, and (II) the generated AND fingerprint corresponding to the respective numerical block identifier, (III) wherein each respective bit of the generated second data set XOR fingerprint indicates that a record having the unique ID associated with that respective bit exists in the second data set but not the first data set; and (d) updating the second data set by transferring, from the first data store to the second data store, records from the first data set that were indicated, based on having a unique ID associated with a respective bit in a generated first data set XOR fingerprint, to exist in the first data set but not the second data set.

2. The method of claim 1, wherein the block size is sixty three sequential numerical IDs.

3. The method of claim 1, wherein the block size is selected to be $(2^{\wedge}n-1)$ sequential numerical IDs, where n is any number greater than 1.

4. The method of claim 1, wherein the method is utilized to transfer records from a clinical data warehouse data store to a clinical performance management data store.

5. The method of claim 1, wherein the first data set comprises healthcare records.

6. A method for synchronizing records stored at a first data storage location with records stored at a second, remote data storage location utilizing bitwise fingerprints to reduce network resource usage and bitwise operations to reduce processing resource usage, the method comprising (a) maintaining, at a first data store, for each respective record in a first data set stored at the first data store, (i) a respective dynamic temporal segmentation last update date, the respective dynamic temporal segmentation last update date for the respective record being generated based on the last two update dates for the respective record, (ii) wherein each respective record is associated with a numerical ID unique to the first data set, (b) for records in the first data set, (i) determining a block size representing a number of sequential numerical IDs which will be associated with a single block, and (ii) defining a plurality of numerical block identifiers based on the determined block size and the unique IDs of the records in the first data set, wherein the unique numerical block identifier and the block size determine sequential numerical IDs associated with that unique numerical block identifier, (iii) for each respective numerical block identifier, (A) determining a respective set of dynamic temporal segmentation last update dates for records in the first data set having a unique ID associated with the respective numerical block identifier, and (B) for each respective dynamic temporal segmentation last update date in the respective set of dynamic temporal segmentation last update dates, (1) defining a respective temporal block associated with the respective numerical block identifier and the respective dynamic temporal segmentation last update date, each respective temporal block being associated with a temporal block identifier comprising an indication of the corresponding respective numerical block identifier and an indication of the corresponding respective dynamic temporal segmentation last update date, and (2) for each defined respective temporal block, generating a respective bitwise fingerprint for that respective temporal block, each respective bit of the respective bitwise fingerprint indicating whether a record in the first data set having the unique ID associated with that respective bit has a dynamic temporal segmentation last update date matching the respective dynamic temporal segmentation last update date;

(c) maintaining, at a second data store, for each respective record in a second data set stored at the second data store, (i) a respective dynamic temporal segmentation last update date, the respective dynamic temporal segmentation last update date for the respective record being generated based on the last two update dates for the respective record, (ii) wherein each respective record is associated with a numerical ID unique to the first data set, (d) for records in the second data set, (i) determining a block size representing a number of sequential numerical IDs which will be associated with a single block, and (ii) defining a plurality of numerical block identifiers based on the determined block size and the unique IDs of the records in the first data set, wherein the unique numerical block identifier and the block size determine sequential numerical IDs associated with that unique numerical block identifier, (iii) for each respective numerical block identifier, (A) determining a respective set of dynamic temporal segmentation last update dates for records in the second data set having a unique ID associated with the respective numerical block identifier, and (B) for each respective dynamic temporal segmentation last update date in the respective set of dynamic temporal segmentation last update dates, (1) defining a respective temporal block associated with the respective numerical block identifier and the respective dynamic temporal segmentation last update date, each respective temporal block being associated with a temporal block identifier comprising an indication of the corresponding respective numerical block identifier and an indication of the corresponding respective dynamic temporal segmentation last update date, and (2) for each defined respective temporal block, generating a respective bitwise fingerprint for that respective temporal block, each respective bit of the respective bitwise fingerprint indicating whether a record in the first data set having the unique ID associated with that respective bit has a dynamic temporal segmentation last update date matching the respective dynamic temporal segmentation last update date;

(e) comparing the timeliness of records in the first and second data sets by performing bitwise operations on the generated bitwise fingerprints by, for each respective temporal block identifier for the first data set or the second data set, (i) determining, by performing an equality comparison between (A) the generated bitwise fingerprint for the temporal block of the first data set corresponding to the respective temporal block identifier, and (B) the generated bitwise fingerprint for the temporal block of the second data set corresponding to the respective temporal block identifier, whether any of the records associated with the temporal block corresponding to the respective temporal block identifier have different dynamic temporal segmentation last update date in the first and second data sets, and (ii) for cases where the generated bitwise fingerprint for the temporal block of the first data set corresponding to the respective temporal block identifier and the generated bitwise fingerprint for the temporal block of the second data set corresponding to the respective temporal identifier do not match, (A) generating an AND fingerprint corresponding to the respective temporal block identifier by performing an AND operation between (I) the generated bitwise fingerprint for the temporal block of the first data set corresponding to the respective temporal block identifier, and (II) the generated bitwise fingerprint for the temporal block of the second data set corresponding to the respective temporal block identifier, (B) determining records that have a dynamic temporal segmentation last update date corresponding to the respective temporal block identifier in the first data set but not the second data set by generating a first data set XOR fingerprint for the temporal block of the first data set corresponding to the respective temporal block identifier by performing an XOR operation between (I) the generated bitwise fingerprint for the temporal block of the first data set corresponding to the respective temporal block identifier, and (II) the generated AND fingerprint corresponding to the respective temporal block identifier, (III) wherein each respective bit of the generated first data set XOR fingerprint indicates that a record having the unique ID associated with that respective bit has a dynamic temporal segmentation last update date corresponding to the respective temporal block identifier in the first data set but not the second data set, and (C) determining records that have a dynamic temporal segmentation last update date corresponding to the respective temporal block identifier in the second data set but not the first data set by generating a second data set XOR fingerprint for the temporal block of the second data set corresponding to the respective temporal block identifier by performing an XOR operation between, (I) the generated bitwise fingerprint for the temporal block of the second data set corresponding to the respective temporal block identifier, and (II) the generated AND fingerprint corresponding to the respective temporal block identifier, (III) wherein each respective bit of the generated second data set XOR fingerprint indicates that a record having the unique ID associated with that respective bit has a dynamic temporal segmentation last update date corresponding to the respective temporal block identifier in the second data set but not the first data set, and (f) comparing, for each unique ID indicated by a generated first data set XOR fingerprint for a first respective temporal block and a generated second data set XOR fingerprint for a second respective temporal block to correspond to records in the first and second data sets that have different dynamic temporal segmentation last update dates, (i) the dynamic temporal segmentation last update date corresponding to the first respective temporal block, and (ii) the dynamic temporal segmentation last update date corresponding to the second respective temporal block, and for one or more unique IDs for which it is determined based on the comparison that one of the data sets includes a more recently updated record having that unique ID, transferring the more recently updated record having that unique ID to the other data store.

7. The method of claim 6, wherein the block size is sixty three sequential numerical IDs.

8. The method of claim 6, wherein the block size is selected to be (2^n−1) sequential numerical IDs, where n is any number greater than 1.

9. The method of claim 6, wherein the method is utilized to transfer records from a clinical data warehouse data store to a clinical performance management data store.

10. The method of claim 6, wherein the first data set comprises healthcare records.

11. The method of claim 6, wherein dynamic temporal segmentation last update dates are configured to utilize, as one potential level of temporal segmentation, a decade.

12. The method of claim 6, wherein dynamic temporal segmentation last update dates are configured to utilize, as one potential level of temporal segmentation, a year.

13. The method of claim 6, wherein dynamic temporal segmentation last update dates are configured to utilize, as one potential level of temporal segmentation, a quarter.

14. The method of claim 6, wherein dynamic temporal segmentation last update dates are configured to utilize, as one potential level of temporal segmentation, a month.

15. The method of claim 6, wherein dynamic temporal segmentation last update dates are configured to utilize, as one potential level of temporal segmentation, a week.

16. The method of claim 6, wherein dynamic temporal segmentation last update dates are configured to utilize, as one potential level of temporal segmentation, a day.

17. The method of claim 6, wherein dynamic temporal segmentation last update dates are configured to utilize, as one potential level of temporal segmentation, an hour.

18. The method of claim 6, wherein dynamic temporal segmentation last update dates are configured to utilize, as one potential level of temporal segmentation, a minute.

19. The method of claim 6, wherein dynamic temporal segmentation last update dates are configured to utilize, as one potential level of temporal segmentation, a second.

20. One or more computer readable media containing computer executable instructions for performing a method for synchronizing records stored at a first data storage location with records stored at a second, remote data storage location utilizing bitwise fingerprints to reduce network resource usage and bitwise operations to reduce processing resource usage, the method comprising
  (a) maintaining, at a first data store, for each respective record in a first data set stored at the first data store,
    (i) a respective dynamic temporal segmentation last update date, the respective dynamic temporal segmentation last update date for the respective record being generated based on the last two update dates for the respective record,
    (ii) wherein each respective record is associated with a numerical ID unique to the first data set,
  (b) for records in the first data set,
    (i) determining a block size representing a number of sequential numerical IDs which will be associated with a single block,
    (ii) defining a plurality of numerical block identifiers based on the determined block size and the unique IDs of the records in the first data set, wherein the unique numerical block identifier and the block size determine sequential numerical IDs associated with that unique numerical block identifier, and
    (iii) for each respective numerical block identifier,
      (A) determining a respective set of dynamic temporal segmentation last update dates for records in the first data set having a unique ID associated with the respective numerical block identifier, and
      (B) for each respective dynamic temporal segmentation last update date in the respective set of dynamic temporal segmentation last update dates,
        (1) defining a respective temporal block associated with the respective numerical block identifier and the respective dynamic temporal segmentation last update date, each respective temporal block being associated with a temporal block identifier comprising an indication of the corresponding respective numerical block identifier and an indication of the corresponding respective dynamic temporal segmentation last update date, and
        (2) for each defined respective temporal block, generating a respective bitwise fingerprint for that respective temporal block, each respective bit of the respective bitwise fingerprint indicating whether a record in the first data set having the unique ID associated with that respective bit has a dynamic temporal segmentation last update date matching the respective dynamic temporal segmentation last update date;
  (c) maintaining, at a second data store, for each respective record in a second data set stored at the second data store,
    (i) a respective dynamic temporal segmentation last update date, the respective dynamic temporal segmentation last update date for the respective record being generated based on the last two update dates for the respective record,
    (ii) wherein each respective record is associated with a numerical ID unique to the first data set,
  (d) for records in the second data set,
    (i) determining a block size representing a number of sequential numerical IDs which will be associated with a single block,
    (ii) defining a plurality of numerical block identifiers based on the determined block size and the unique IDs of the records in the first data set, wherein the unique numerical block identifier and the block size determine sequential numerical IDs associated with that unique numerical block identifier, and
    (iii) for each respective numerical block identifier,
      (A) determining a respective set of dynamic temporal segmentation last update dates for records in the second data set having a unique ID associated with the respective numerical block identifier, and
      (B) for each respective dynamic temporal segmentation last update date in the respective set of dynamic temporal segmentation last update dates,
        (1) defining a respective temporal block associated with the respective numerical block identifier and the respective dynamic temporal segmentation last update date, each respective temporal block being associated with a temporal block identifier comprising an indication of the corresponding respective numerical block identifier and an indication of the corresponding respective dynamic temporal segmentation last update date, and
        (2) for each defined respective temporal block, generating a respective bitwise fingerprint for that respective temporal block, each respective bit of the respective bitwise fingerprint indicating whether a record in the first data set having the unique ID associated with that respective bit has a dynamic temporal segmentation last update date matching the respective dynamic temporal segmentation last update date;
  (e) comparing the timeliness of records in the first and second data sets by performing bitwise operations on the generated bitwise fingerprints by, for each respective temporal block identifier for the first data set or the second data set,
    (i) determining, by performing an equality comparison between
      (A) the generated bitwise fingerprint for the temporal block of the first data set corresponding to the respective temporal block identifier, and
      (B) the generated bitwise fingerprint for the temporal block of the second data set corresponding to the respective temporal block identifier, whether any of the records associated with the temporal block corresponding to the respective temporal block identifier have different dynamic temporal segmentation last update date in the first and second data sets, and
    (ii) for cases where the generated bitwise fingerprint for the temporal block of the first data set corresponding to the respective temporal block identifier and the generated bitwise fingerprint for the temporal block of the second data set corresponding to the respective temporal identifier do not match,
- (A) generating an AND fingerprint corresponding to the respective temporal block identifier by performing an AND operation between
  - (I) the generated bitwise fingerprint for the temporal block of the first data set corresponding to the respective temporal block identifier, and
  - (II) the generated bitwise fingerprint for the temporal block of the second data set corresponding to the respective temporal block identifier,
- (B) determining records that have a dynamic temporal segmentation last update date corresponding to the respective temporal block identifier in the first data set but not the second data set by generating a first data set XOR fingerprint for the temporal block of the first data set corresponding to the respective temporal block identifier by performing an XOR operation between
  - (I) the generated bitwise fingerprint for the temporal block of the first data set corresponding to the respective temporal block identifier, and
  - (II) the generated AND fingerprint corresponding to the respective temporal block identifier,
  - (III) wherein each respective bit of the generated first data set XOR fingerprint indicates that a record having the unique ID associated with that respective bit has a dynamic temporal segmentation last update date corresponding to the respective temporal block identifier in the first data set but not the second data set, and
- (C) determining records that have a dynamic temporal segmentation last update date corresponding to the respective temporal block identifier in the second data set but not the first data set by generating a second data set XOR fingerprint for the temporal block of the second data set corresponding to the respective temporal block identifier by performing an XOR operation between
  - (I) the generated bitwise fingerprint for the temporal block of the second data set corresponding to the respective temporal block identifier, and
  - (II) the generated AND fingerprint corresponding to the respective temporal block identifier,
  - (III) wherein each respective bit of the generated second data set XOR fingerprint indicates that a record having the unique ID associated with that respective bit has a dynamic temporal segmentation last update date corresponding to the respective temporal block identifier in the second data set but not the first data set, and
- (f) comparing, for each unique ID indicated by a generated first data set XOR fingerprint for a first respective temporal block and a generated second data set XOR fingerprint for a second respective temporal block to correspond to records in the first and second data sets that have different dynamic temporal segmentation last update dates,
  - (i) the dynamic temporal segmentation last update date corresponding to the first respective temporal block, and
  - (ii) the dynamic temporal segmentation last update date corresponding to the second respective temporal block, and for one or more unique IDs for which it is determined based on the comparison that one of the data sets includes a more recently updated record having that unique ID, transferring the more recently updated record having that unique ID to the other data store.

* * * * *